Oct. 28, 1941.  A. A. KOTTMANN  2,260,324
WRAPPER AND METHOD
Filed April 23, 1938   20 Sheets-Sheet 7
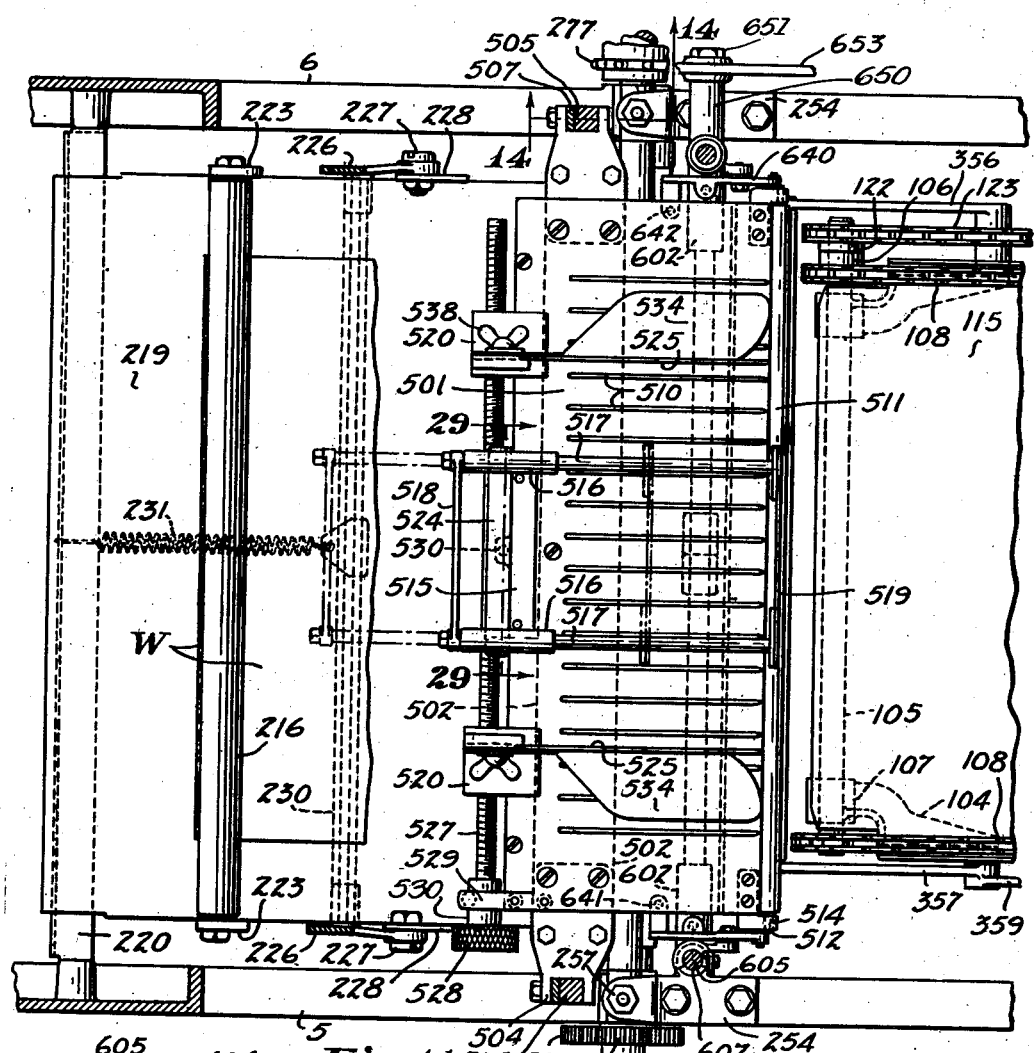
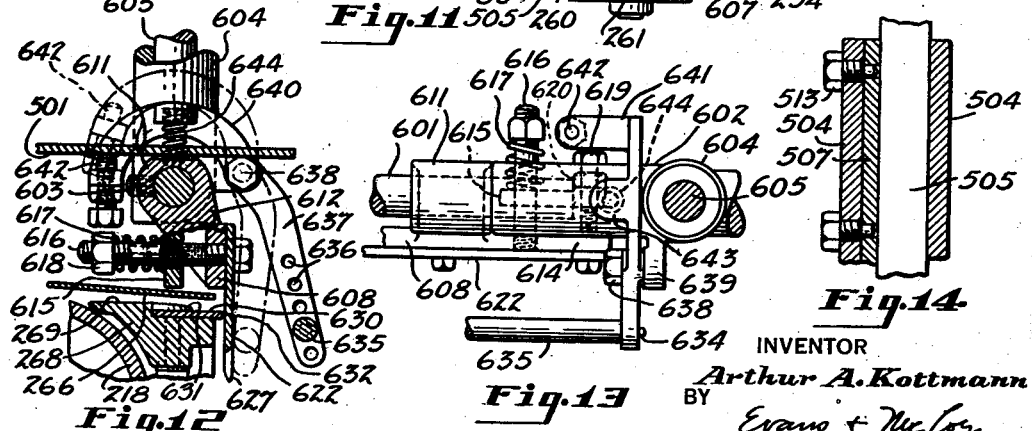
INVENTOR
Arthur A. Kottmann
BY
Evans + McCoy
ATTORNEYS

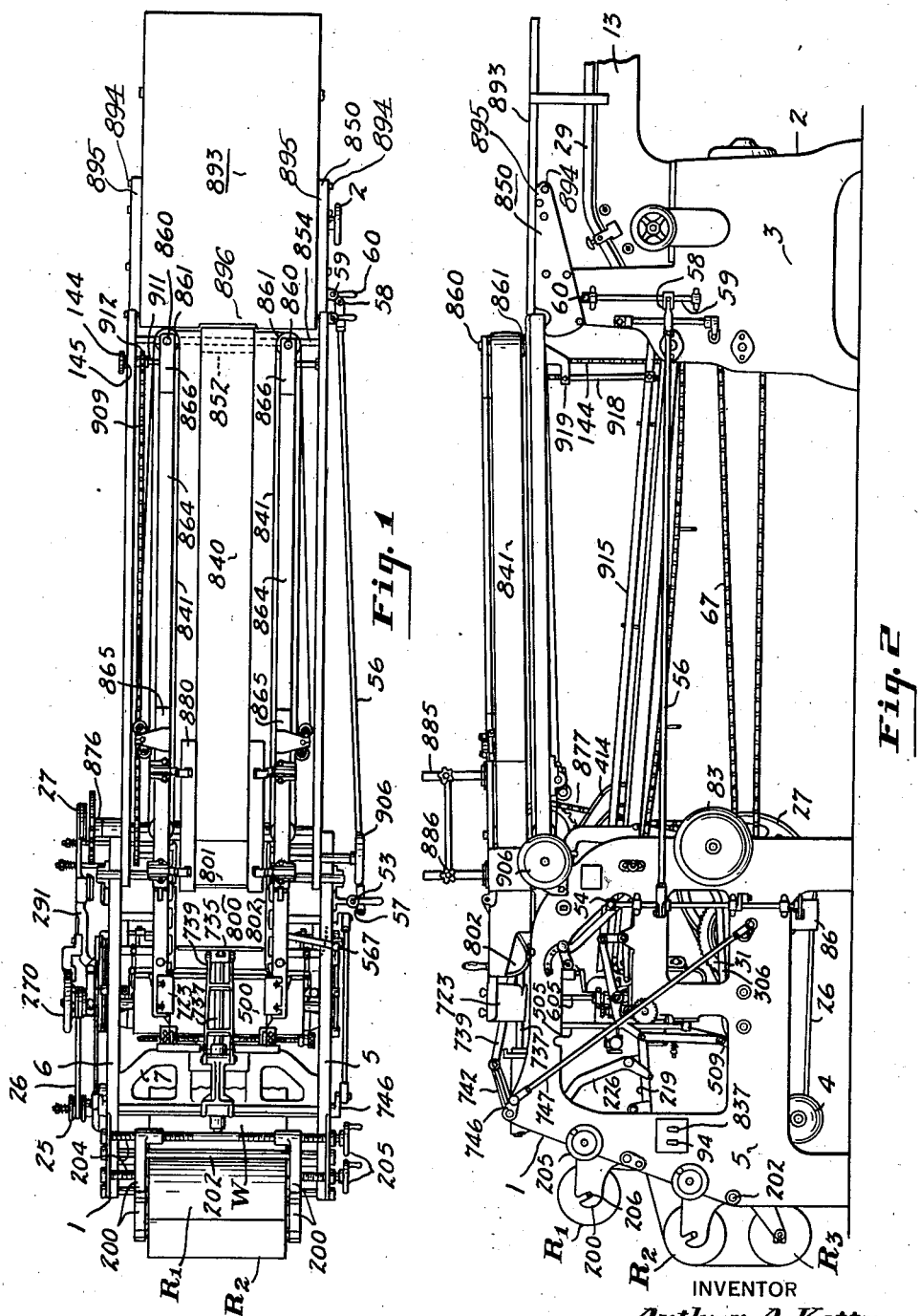

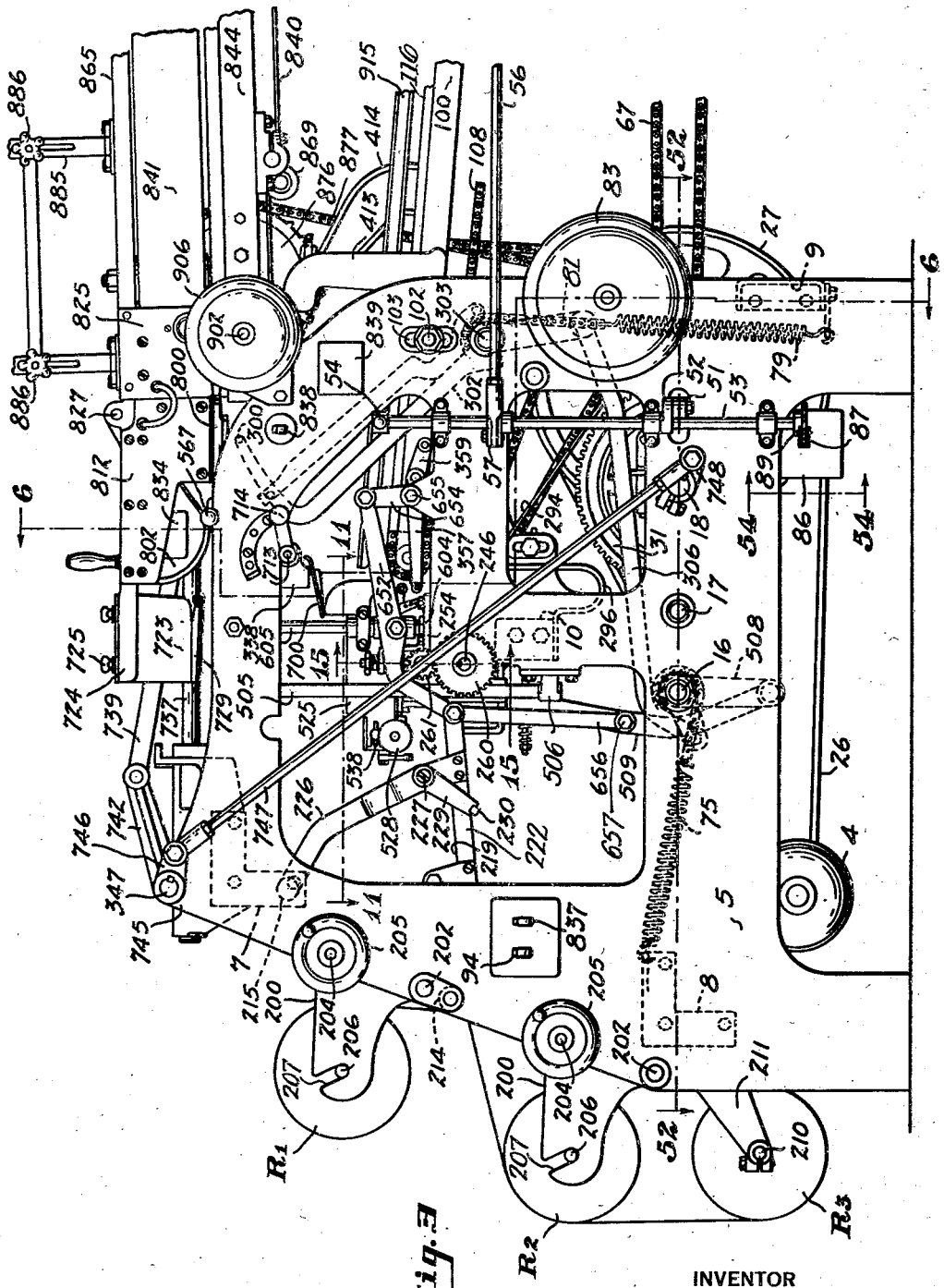

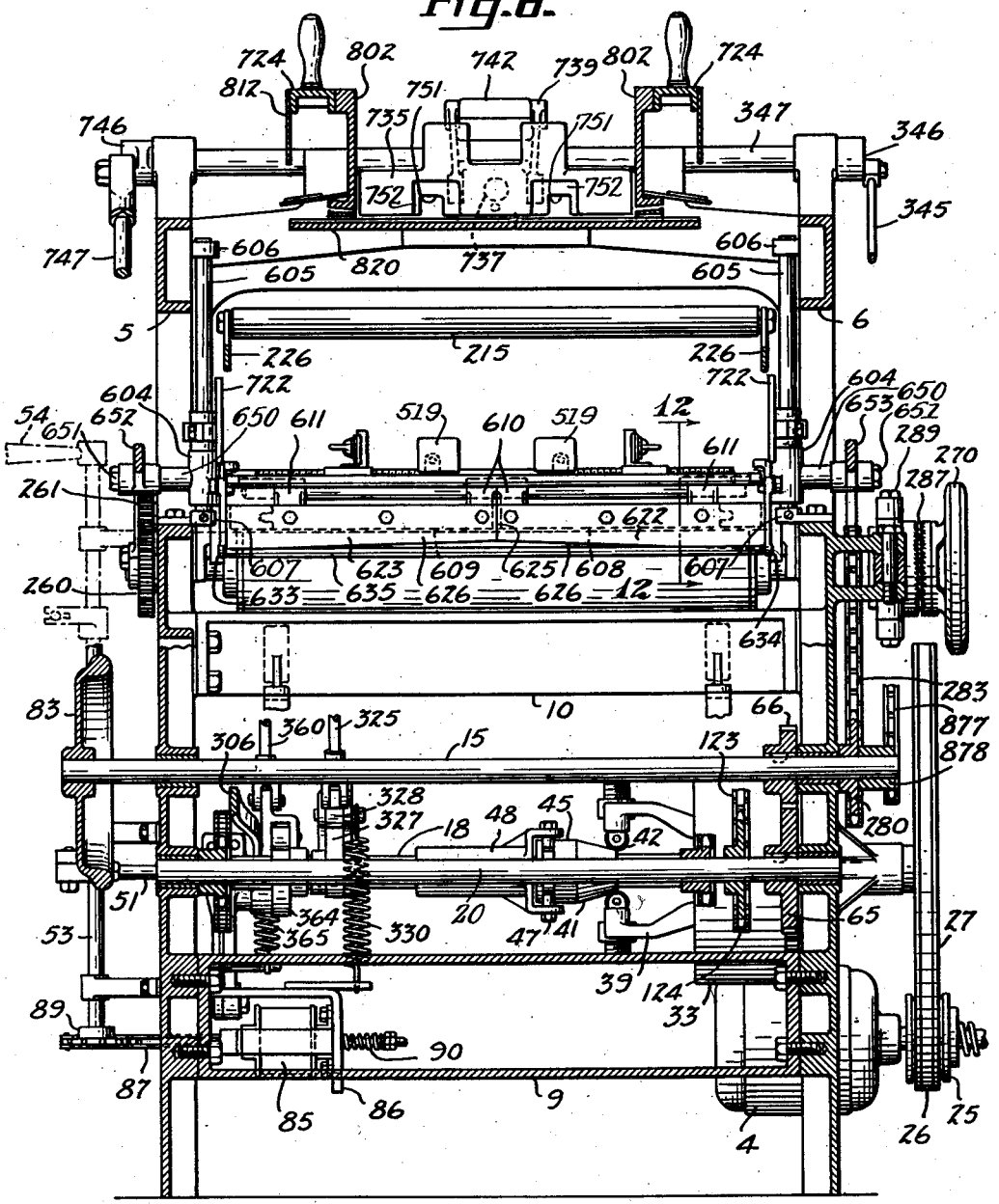

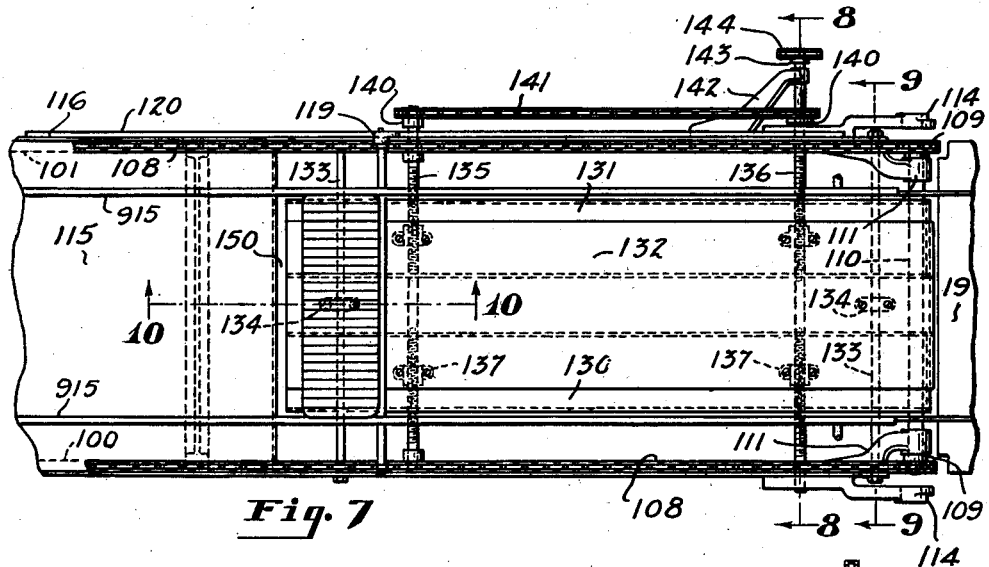
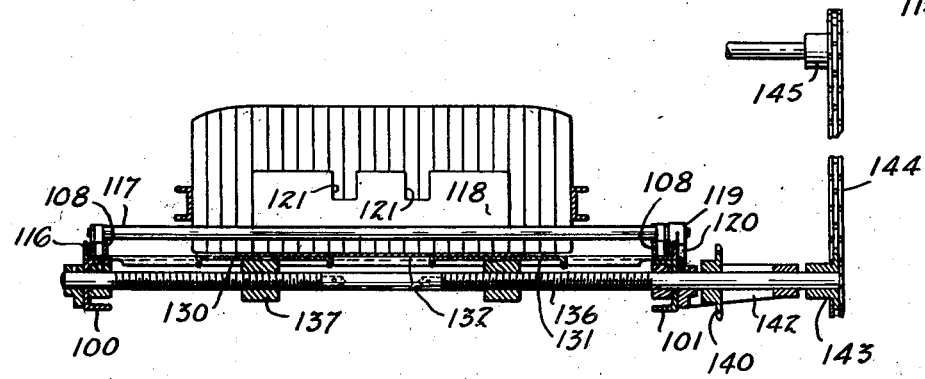
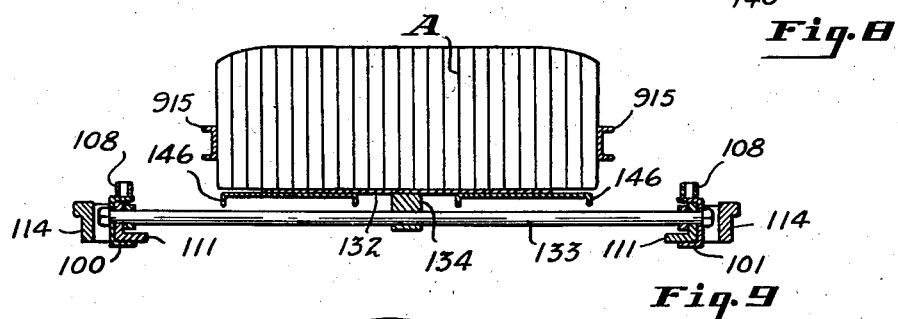
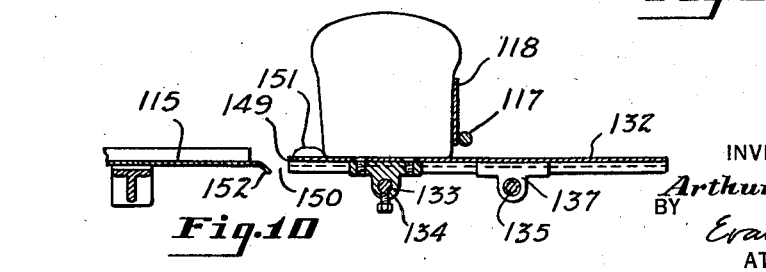

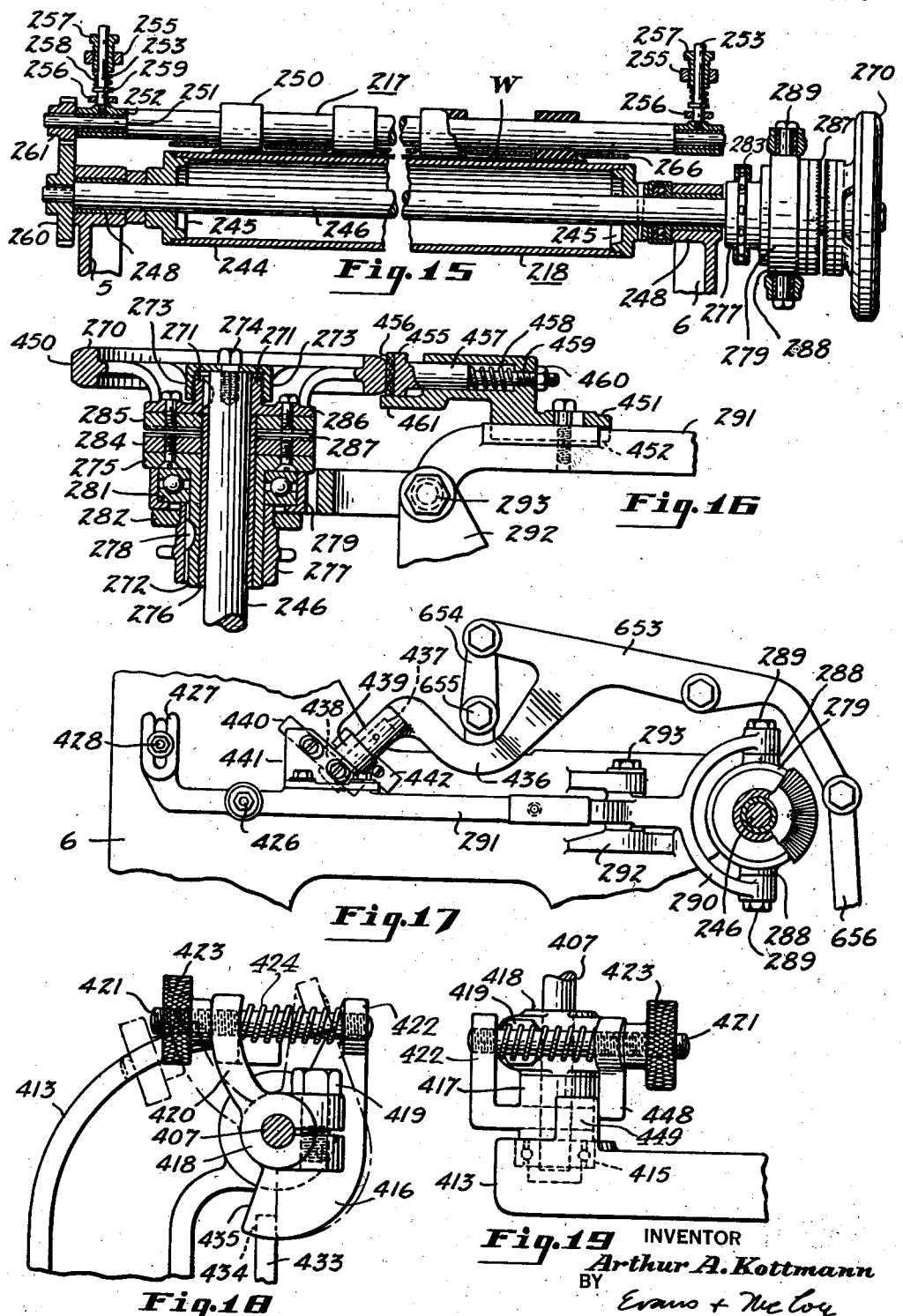

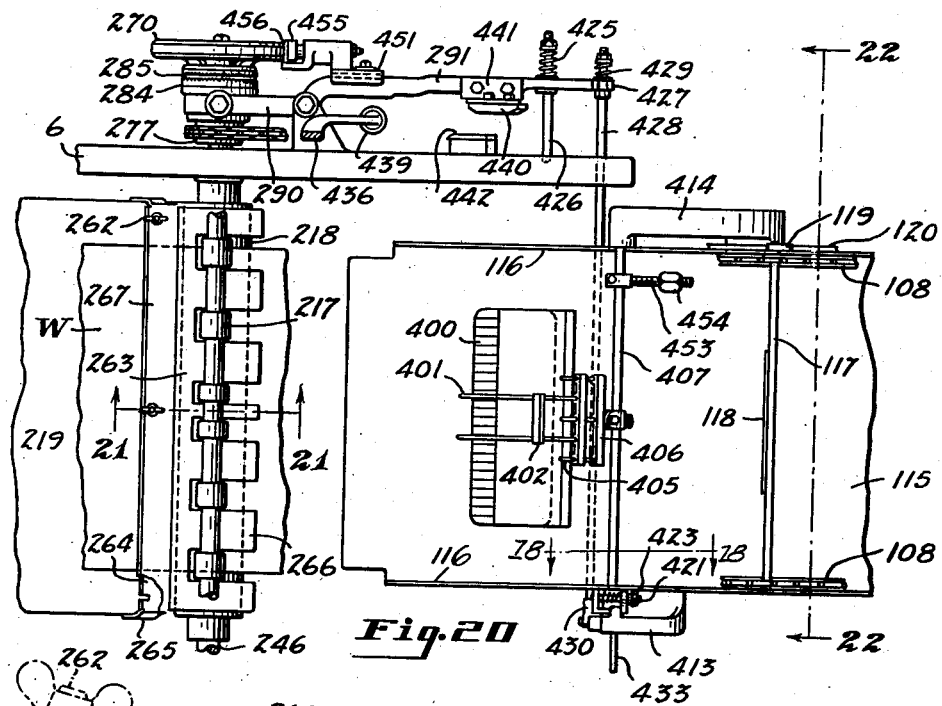
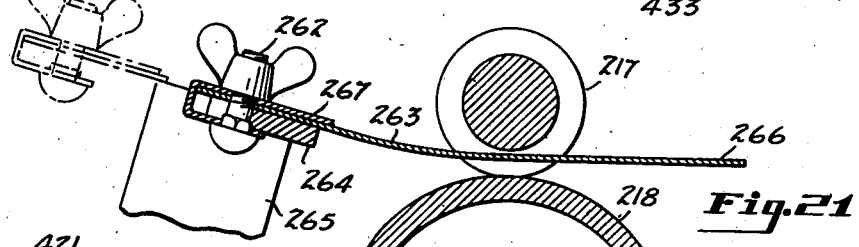
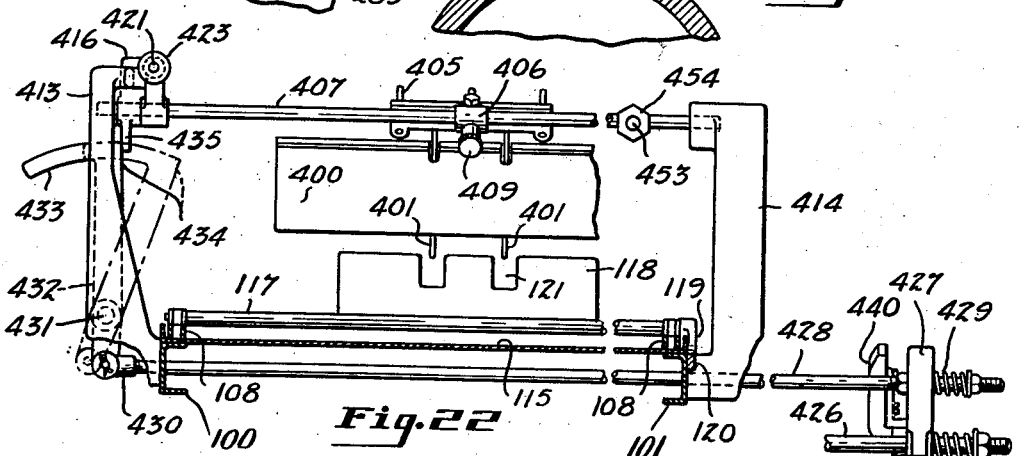

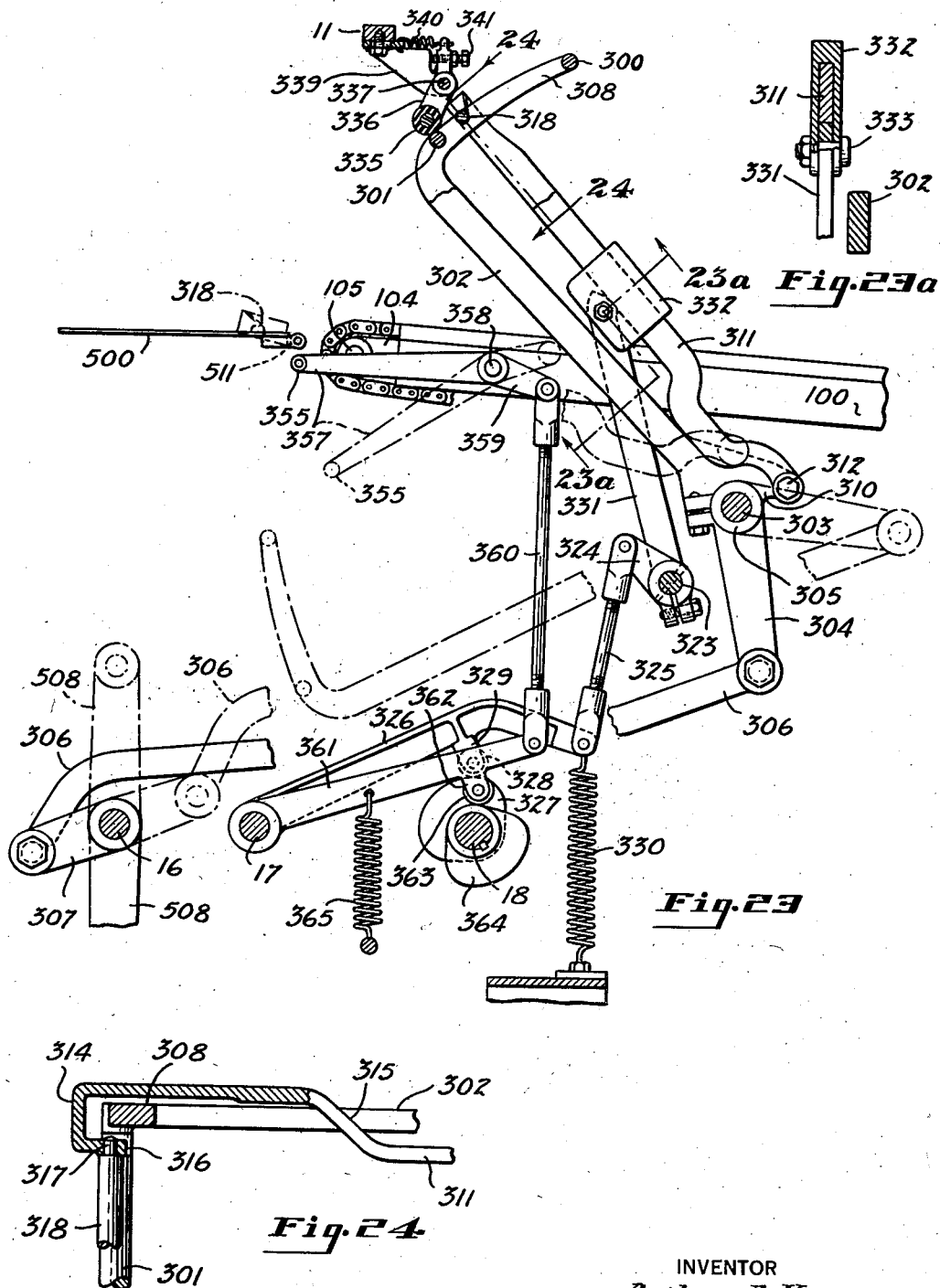

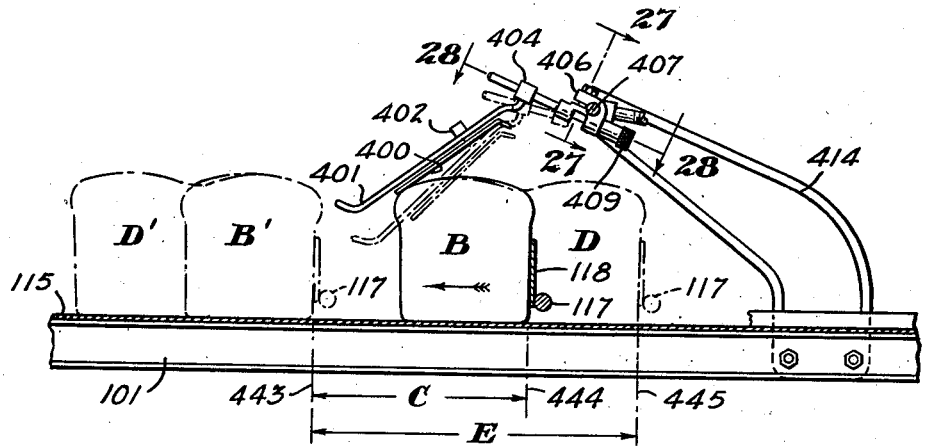
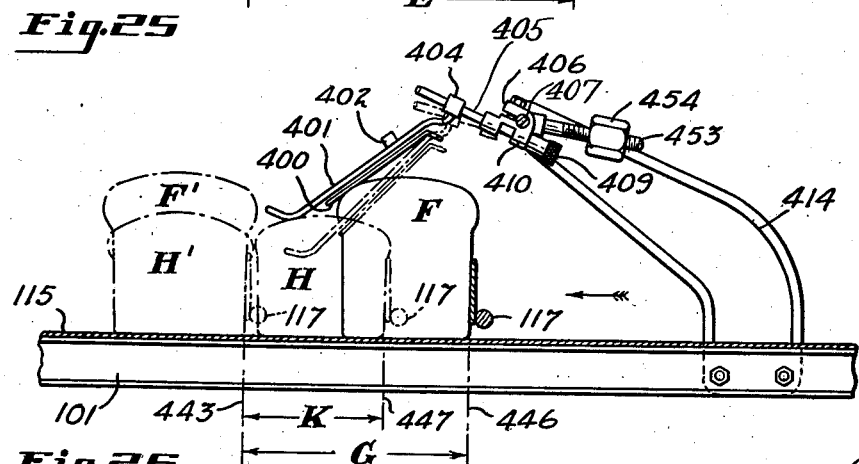
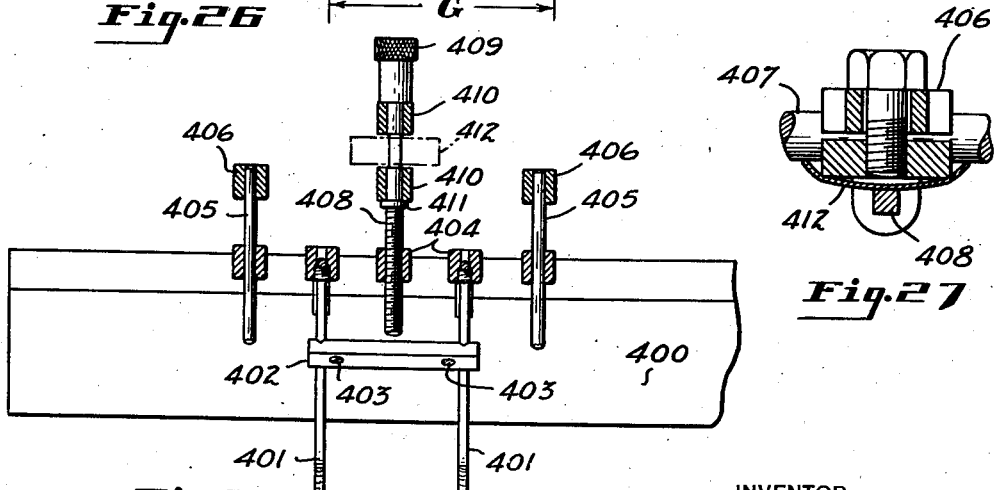

Oct. 28, 1941.  A. A. KOTTMANN  2,260,324
WRAPPER AND METHOD
Filed April 23, 1938  20 Sheets-Sheet 12
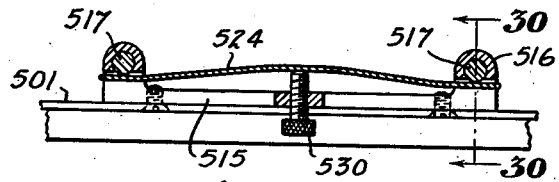
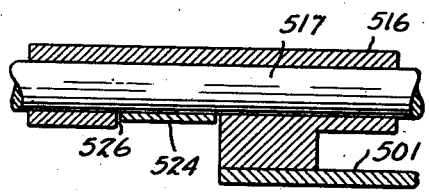
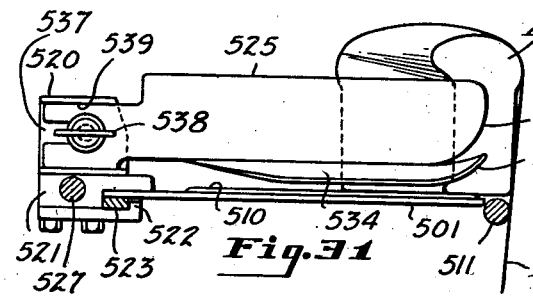
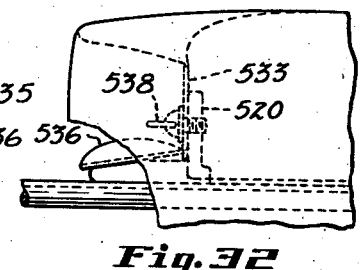
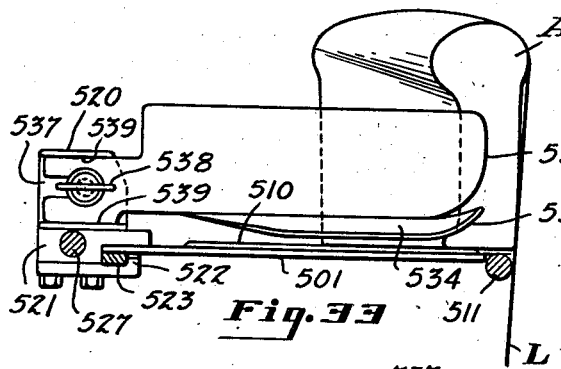
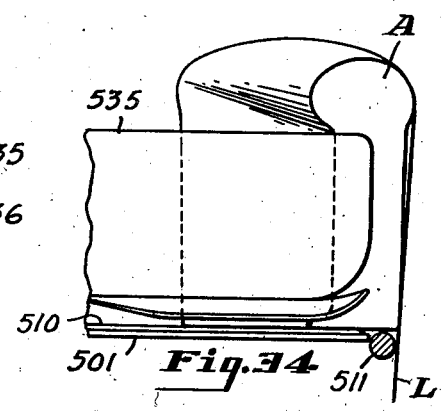
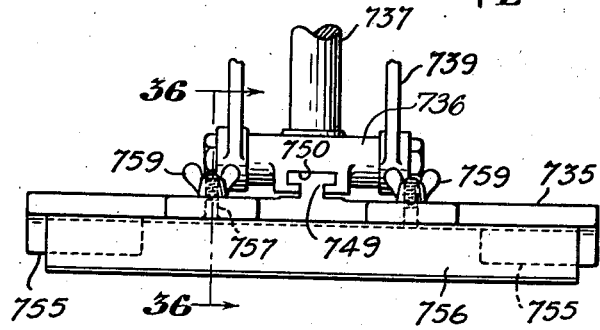
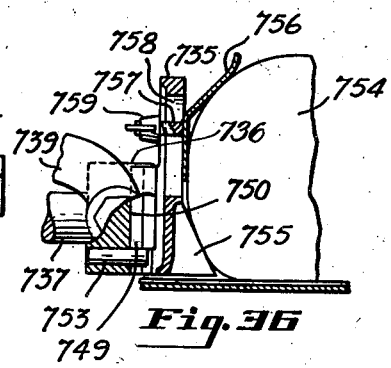
INVENTOR
Arthur A. Kottmann
BY
Evans & Hex Coy
ATTORNEYS

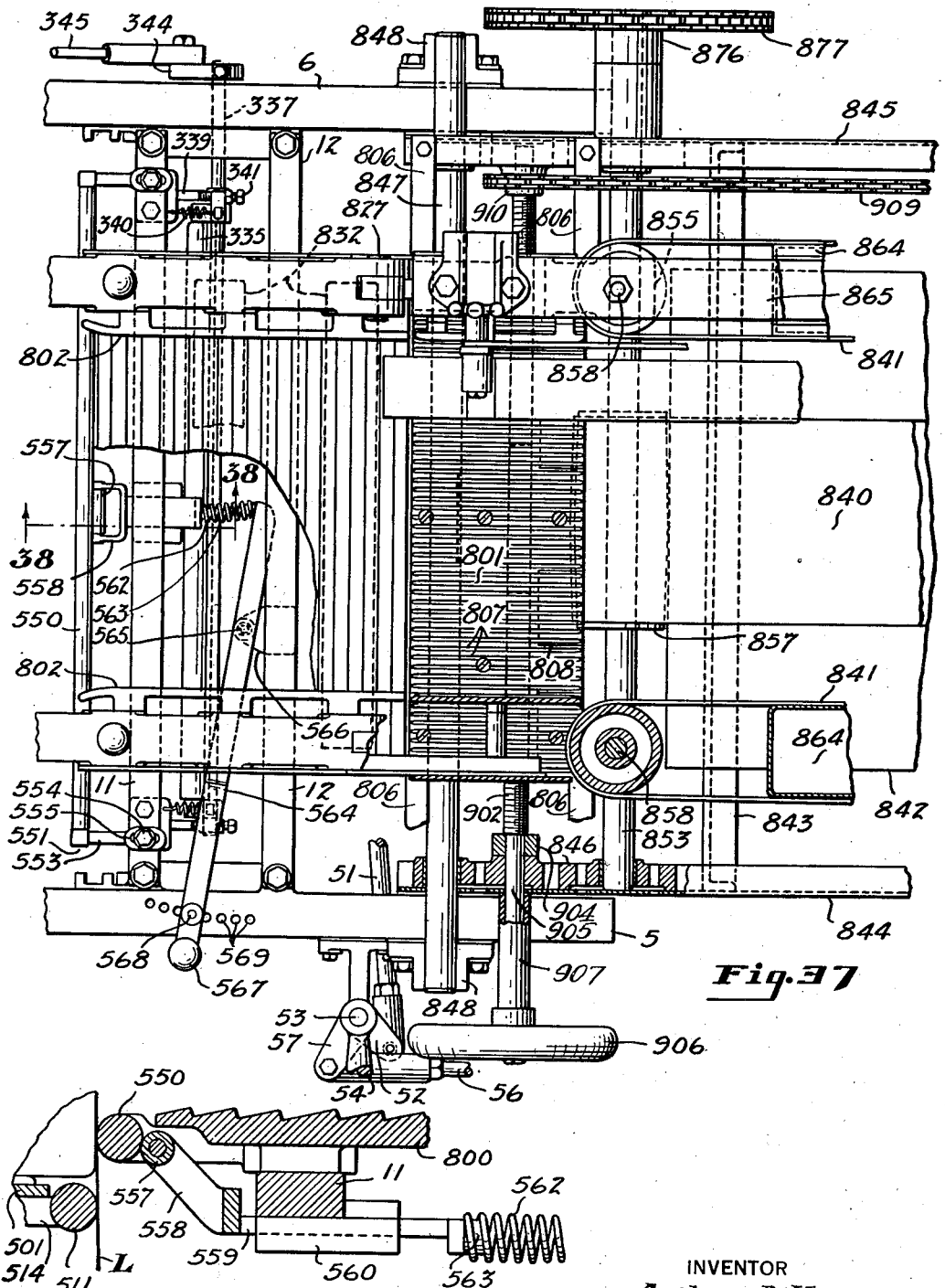

Oct. 28, 1941.  A. A. KOTTMANN  2,260,324
WRAPPER AND METHOD
Filed April 23, 1938  20 Sheets-Sheet 14
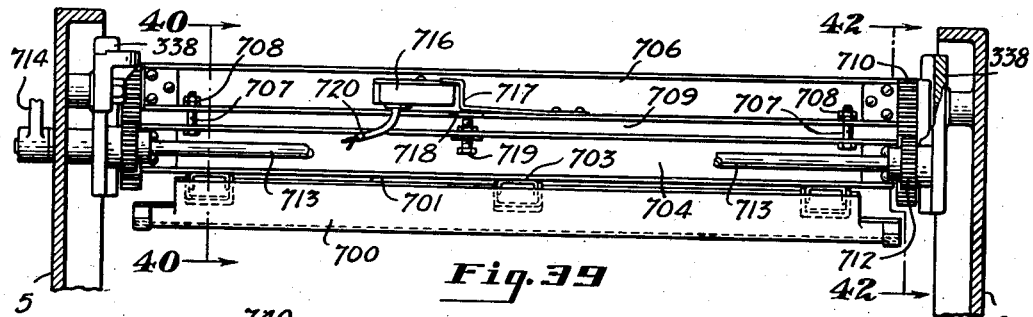
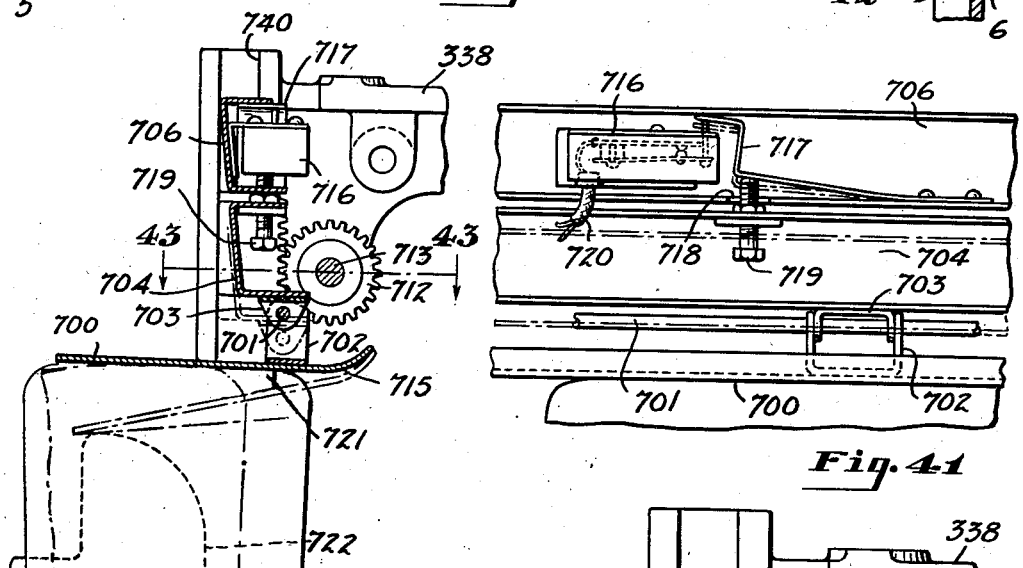
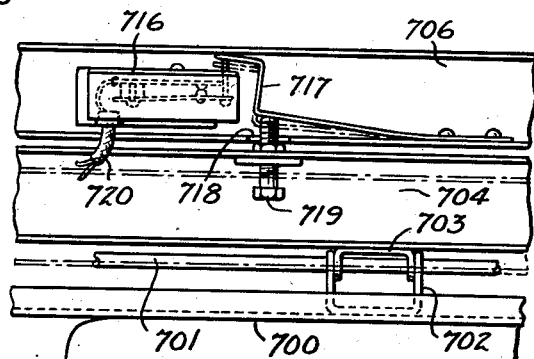
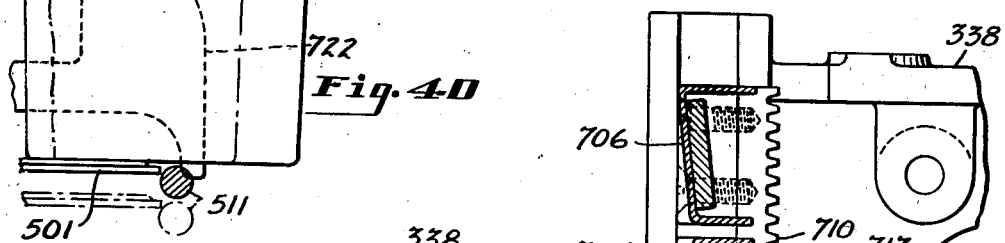
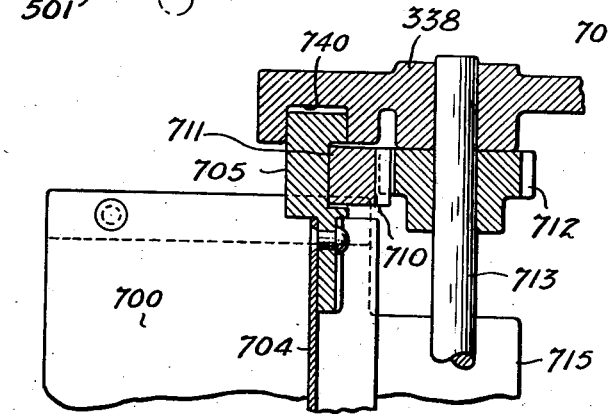
INVENTOR
Arthur A. Kottmann
BY
Evans & McCoy
ATTORNEYS

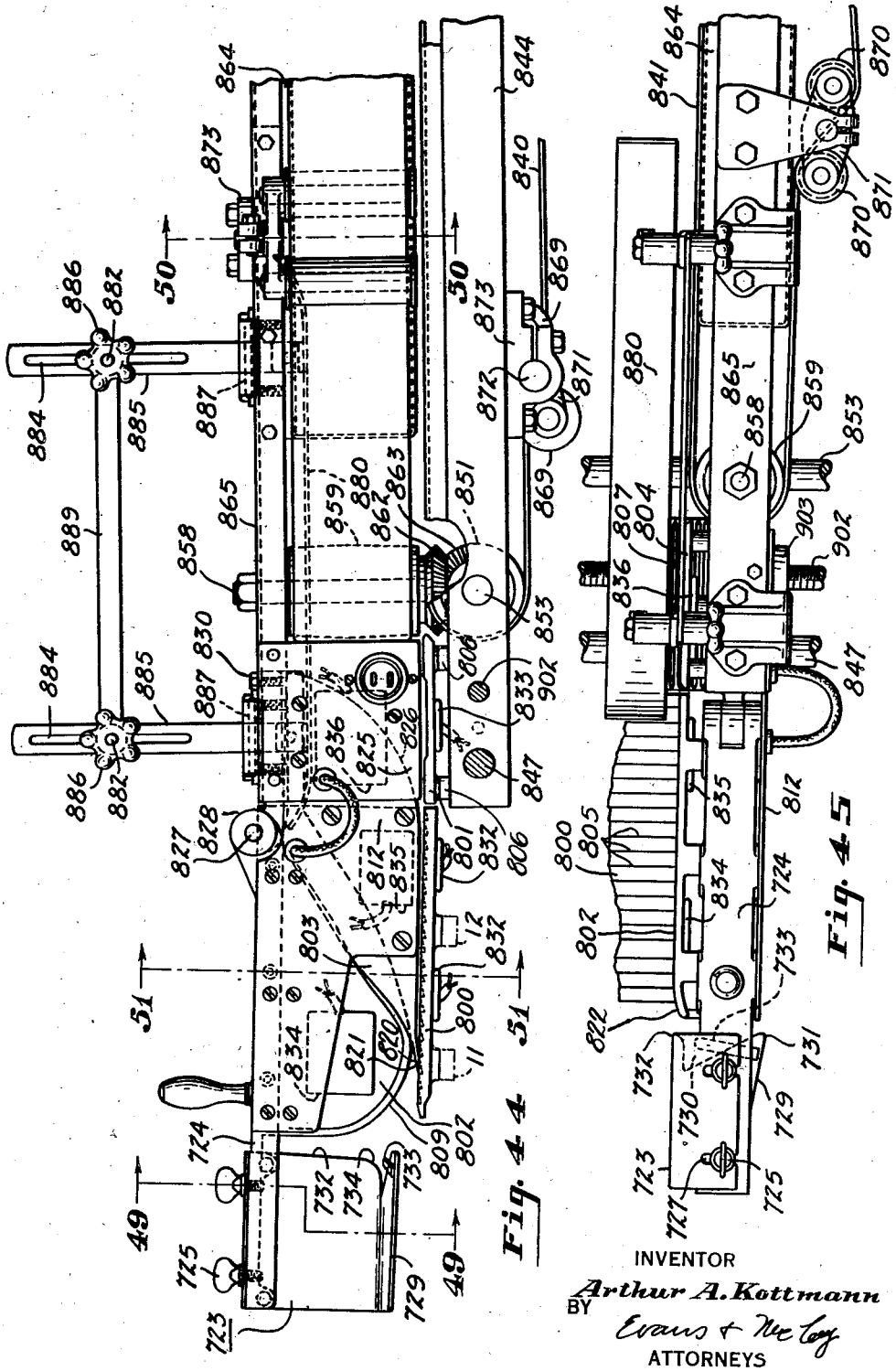

Oct. 28, 1941.  A. A. KOTTMANN  2,260,324
WRAPPER AND METHOD
Filed April 23, 1938  20 Sheets-Sheet 16
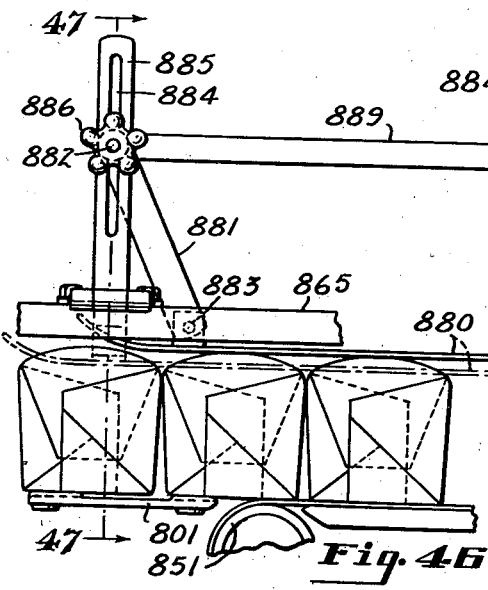
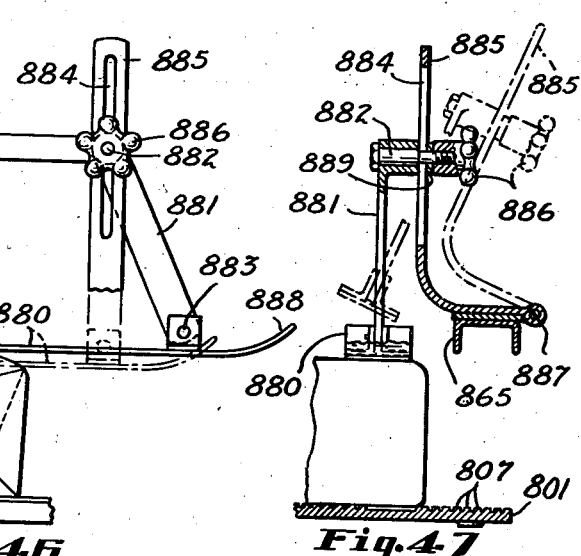
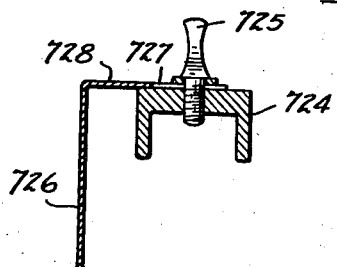
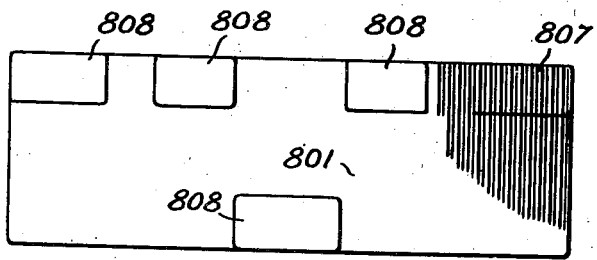
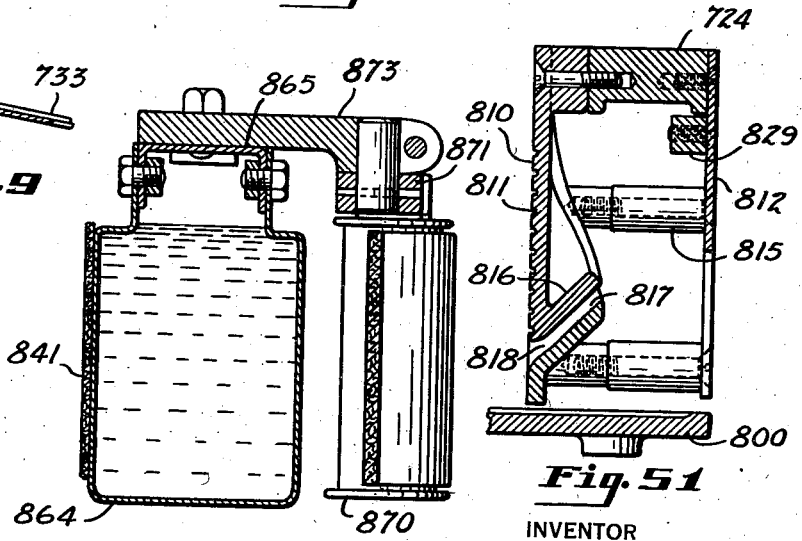
INVENTOR
Arthur A. Kottmann
BY Evans & McCoy
ATTORNEYS Oct. 28, 1941.  A. A. KOTTMANN  2,260,324
WRAPPER AND METHOD
Filed April 23, 1938   20 Sheets-Sheet 17

INVENTOR
Arthur A. Kottmann
BY Evans + McCoy
ATTORNEYS

Oct. 28, 1941.　　A. A. KOTTMANN　　2,260,324
WRAPPER AND METHOD
Filed April 23, 1938　　20 Sheets-Sheet 18

INVENTOR
Arthur A. Kottmann
BY
Evans + McCoy
ATTORNEYS

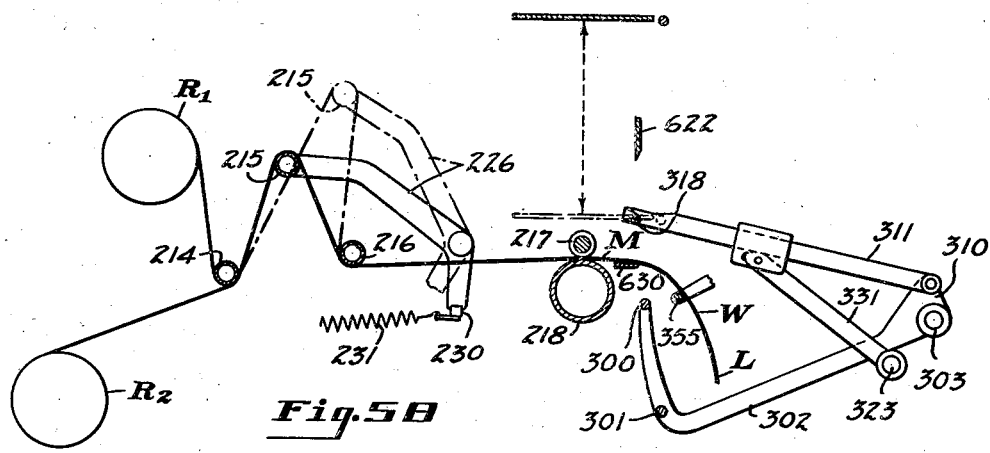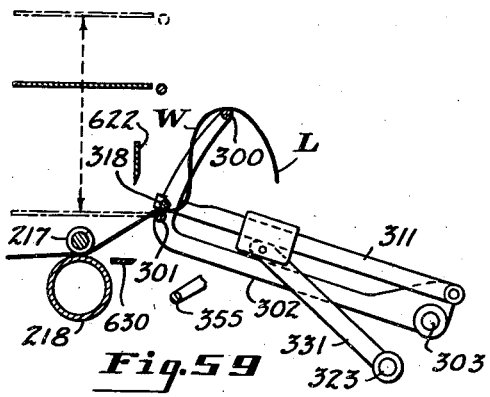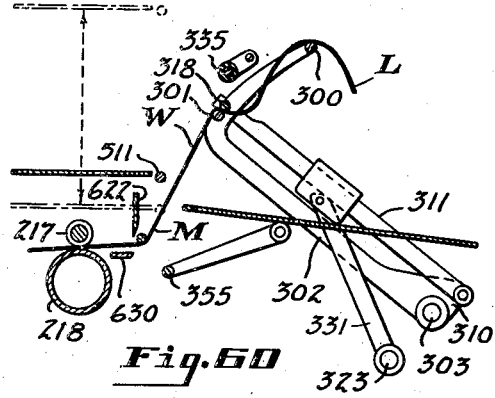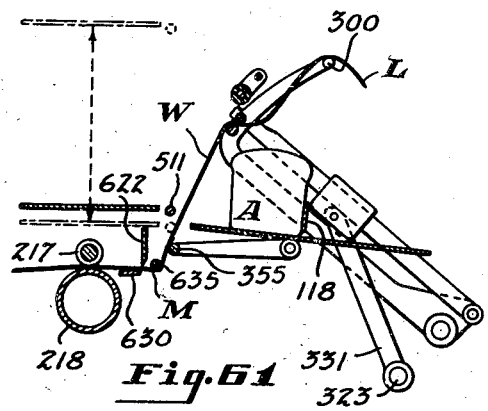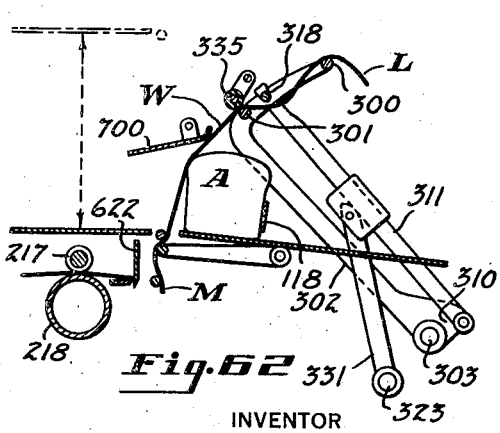

Oct. 28, 1941. A. A. KOTTMANN 2,260,324
WRAPPER AND METHOD
Filed April 23, 1938 20 Sheets-Sheet 20
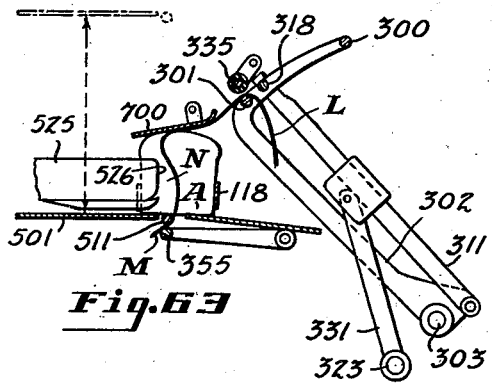
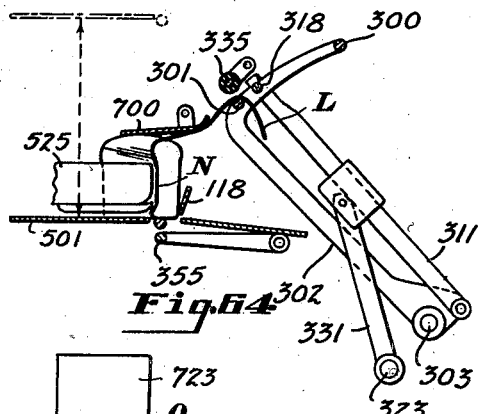
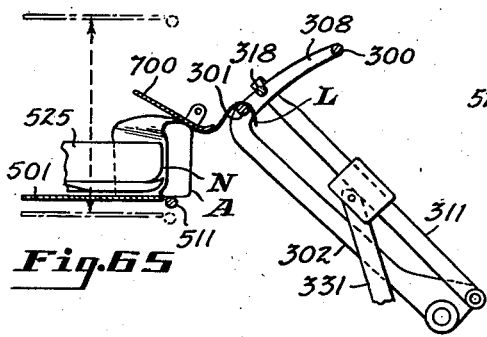
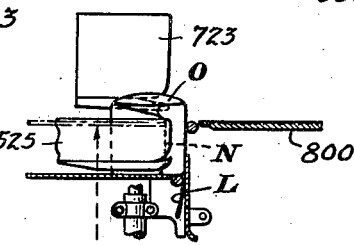
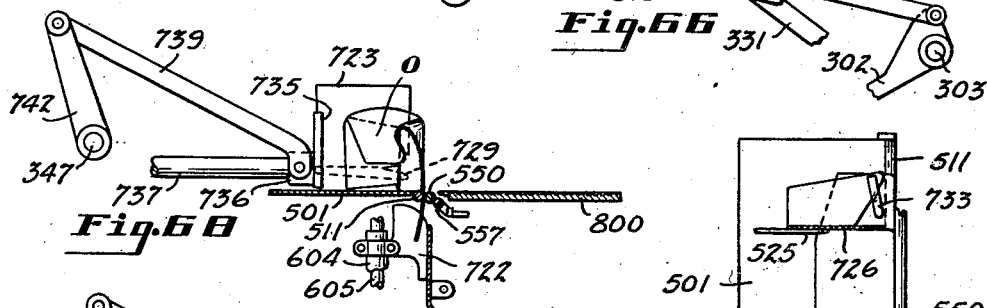
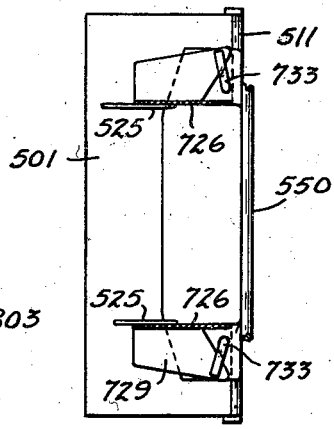
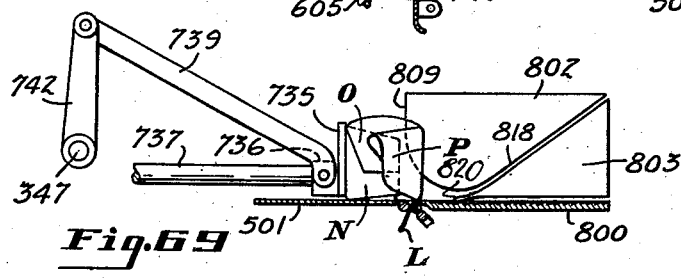
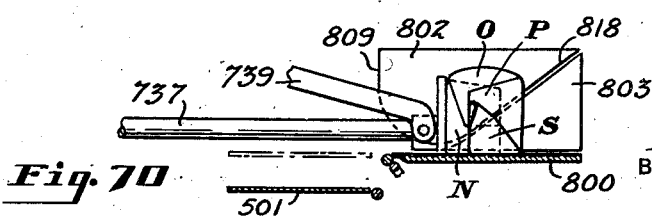
INVENTOR
Arthur A. Kottmann
BY
Evans & McCoy
ATTORNEYS Patented Oct. 28, 1941

2,260,324

UNITED STATES PATENT OFFICE 2,260,324

WRAPPER AND METHOD

Arthur A. Kottmann, Davenport, Iowa, assignor to Micro-Westco, Incorporated, Bettendorf, Iowa, a corporation of Delaware Application April 23, 1938, Serial No. 203,865

37 Claims. (Cl. 93—2)

This invention relates to machines for packaging articles, and more particularly to a method and machine for packaging relatively soft and compressible articles, such as loaves of bread, whether sliced or unsliced.

The invention contemplates the general improvement and simplification of packaging machines of the character disclosed in copending application Serial No. 203,852, filed April 23, 1938, of Charles H. Petskeyes, and aims to present a commercially desirable wrapper which, in addition to being qualified to handle a multiplicity of sizes and shapes of baked goods, such as are ordinarily produced by large bakeries, is simple to operate and adjust, and will not be injured by inadvertent operation with the parts in misadjustment.

One object of the invention is to provide a wrapping machine of the character referred to, which has adjustable means of improved design for individually measuring each article and for feeding a portion of wrapping material thereto from the end of a continuous web in accordance with the size of each measured article.

Another object is to provide a machine of the character mentioned having improved means to alter and regulate, by simple adjustments, the amount of overlap of the wrapping material and the location thereof with respect to the bottom of the package.

Another object is to provide, in combination with a slicing machine and a wrapping machine, means for automatically separating crumbs and sliver heels from sliced articles to be wrapped during the movement of articles from the slicing machine to the wrapping machine.

Another object is to provide means for stopping a wrapping machine having an improperly located article in its mechanism, to prevent injury to both the article and the mechanism.

Another object is to provide a wrapping machine in which a sheet of wrapping material is suspended in the path of an article to be wrapped thereby, the machine being arranged to release the wrapping material as soon as the latter is engaged by the article so that the wrapping material is substantially free to wrap about and conform to the article, and which machine does not grip, but guides the wrapping material during the wrapping of the material about the article.

Another and more specific object is to provide a bread wrapping machine having means for cooling overlapped portions of wrapping material in stages of progressive degrees of chilling to effect a stronger and more desirable seal.

A further object is to provide an improved machine of this character, simple and inexpensive to manufacture and operate, which accommodates different sized articles with a minimum of manual adjustment and which is smooth and quiet in operation and wraps articles by means of uniform and regular folds.

Other objects and advantages will become apparent as the description of the invention proceeds. This description is made in connection with the accompanying drawings in which like parts are identified by the same numerals of reference throughout the several views. Although the machine illustrated and described is primarily intended for wrapping loaves of bread, the features of the invention which are embodied in the particular construction and combination of parts are applicable and advantageous in machines for wrapping other articles.

In the drawings:

Figure 1 is a plan view with parts removed of a wrapping machine-slicing machine combination embodying the present invention;

Fig. 2 is a side elevational view of the combination shown in Fig. 1;

Fig. 3 is a side elevational view showing the operator's side of the wrapping machine of the combination illustrated in Figs. 1 and 2;

Fig. 6 is a vertical sectional view with parts removed and with parts broken away, taken transversely across the side frames of the wrapping machine substantially on the line 6—6 of Fig. 3;

Fig. 6a is an enlarged detailed view in section showing the construction for mounting the compressor bar;

Fig. 7 is a fragmentary plan view with parts removed showing the crumb and sliver heel eliminator at the receiving end of the infeed conveyor;

Fig. 8 is a transverse vertical sectional view taken substantially on the line 8—8 of Fig. 7;

Fig. 9 is a transverse sectional view taken substantially on the line 9—9 of Fig. 7;

Fig. 10 is a fragmentary detail in section taken longitudinally through the conveyor substantially on the line 10—10 of Fig. 7;

Fig. 11 is an enlarged fragmentary plan view partly in section and with parts removed showing the carrier at the infeed station of the wrapping machine;

Fig. 12 is a fragmentary detail in section and with parts removed taken substantially on the line 12—12 of Fig. 6;

Fig. 13 is a fragmentary detail plan view of the structure shown in Fig. 12;

Fig. 14 is a fragmentary detail in section taken substantially on the line 14—14 of Fig. 11;

Fig. 15 is a sectional detail view with parts removed showing the wrapping material feed rollers and taken substantially on the line 15—15 of Fig. 3;

Fig. 16 is a fragmentary detail view showing the clutch and brake construction for the wrapping material feed rollers and taken substantially on the line 16—16 of Fig. 4;

Fig. 17 is a fragmentary elevational detail showing the actuating mechanism for the wrapping material feed roll clutch;

Fig. 18 is a fragmentary detail showing the latch mechanism for the article measuring device taken substantially on the line 18—18 of Fig. 20 and enlarged with respect thereto;

Fig. 19 is a detail plan of the latch mechanism shown in Fig. 18;

Fig. 20 is a plan view with parts removed showing the mechanism for measuring an article and feeding wrapping material;

Fig. 21 is a fragmentary detail showing the stripper member taken substantially on the line 21—21 of Fig. 20 and enlarged with respect thereto;

Fig. 22 is a transverse elevational view across the infeed conveyor showing the latch mechanism for the article-measuring device and taken substantially on the line 22—22 of Fig. 20;

Fig. 23 is a diagrammatic illustration showing the movement of the carrier and clamping bars and the wrapping material guide bar;

Fig. 23a is a fragmentary detail partly in section taken substantially on the line 23a—23a of Fig. 23 and enlarged with respect thereto;

Fig. 24 is a fragmentary detail partly in section and taken substantially on the line 24—24 of Fig. 23;

Figs. 25 and 26 are diagrammatic side views showing the operation of the article-engaging member of the latch mechanism in combination with the movement of the infeed conveyor flights in measuring the size of articles;

Fig. 27 is a fragmentary detail in section taken substantially on the line 27—27 of Fig. 25 and enlarged with respect thereto;

Fig. 28 is a fragmentary detail partly in section and taken substantially on the line 28—28 of Fig. 25;

Fig. 29 is a fragmentary detail showing the brake for the article-engaging member on the carrier or elevator and taken substantially on the line 29—29 of Fig. 11;

Fig. 30 is a fragmentary detail in section taken substantially on the line 30—30 of Fig. 29 and enlarged with respect thereto;

Figure 5:
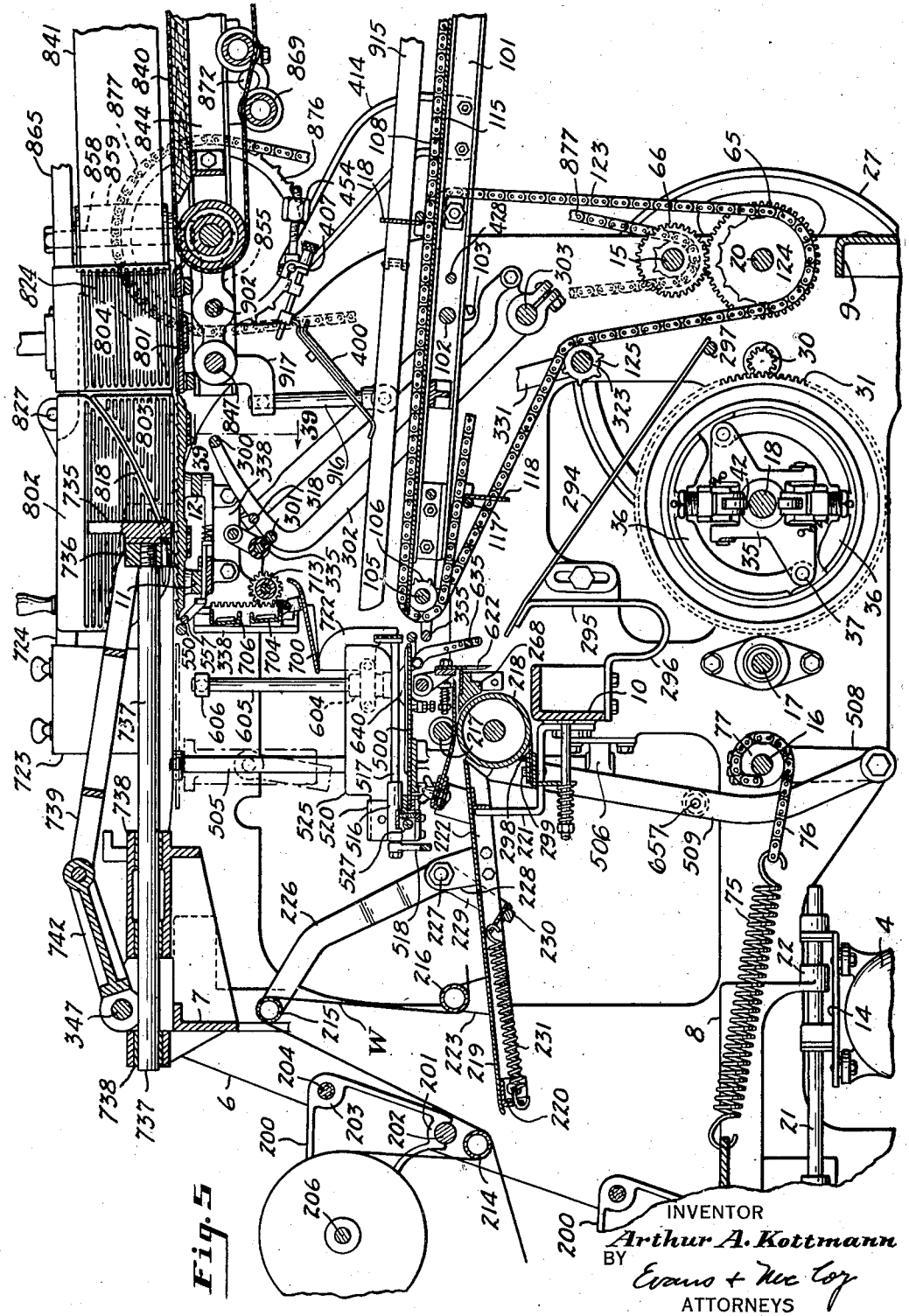
Fig. 5 is a longitudinal sectional view with parts removed and with parts broken away, taken through the central portion of the wrapping machine illustrated in the preceding figures, and enlarged with respect thereto.
Figure 52:
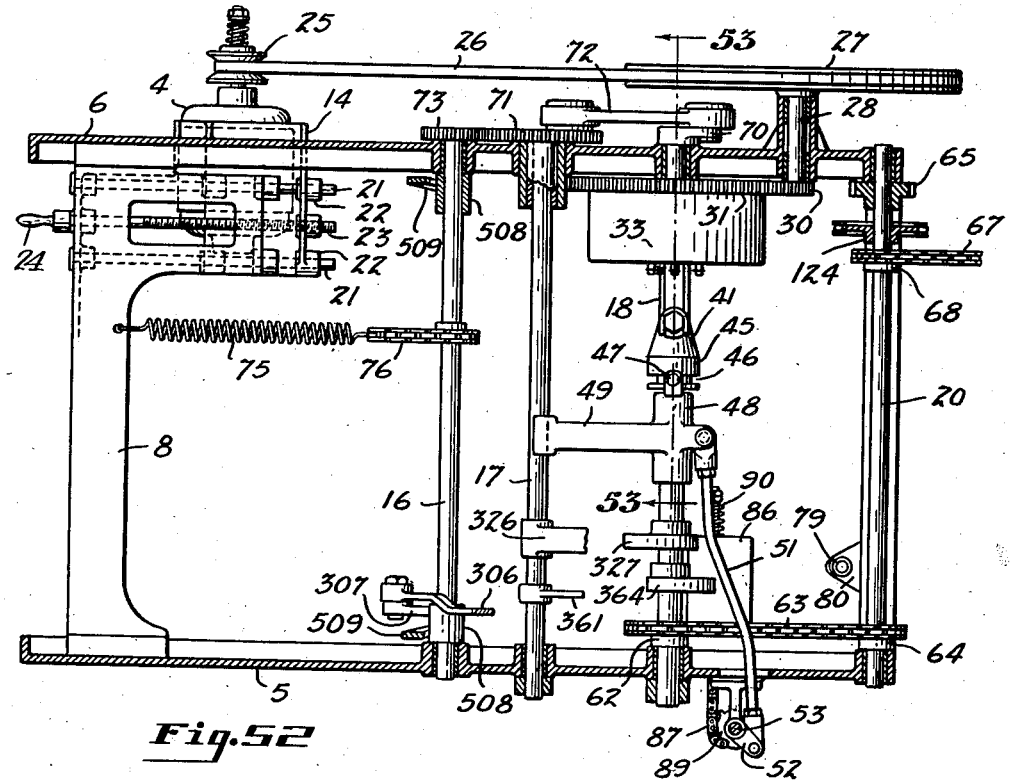
Figure 53:
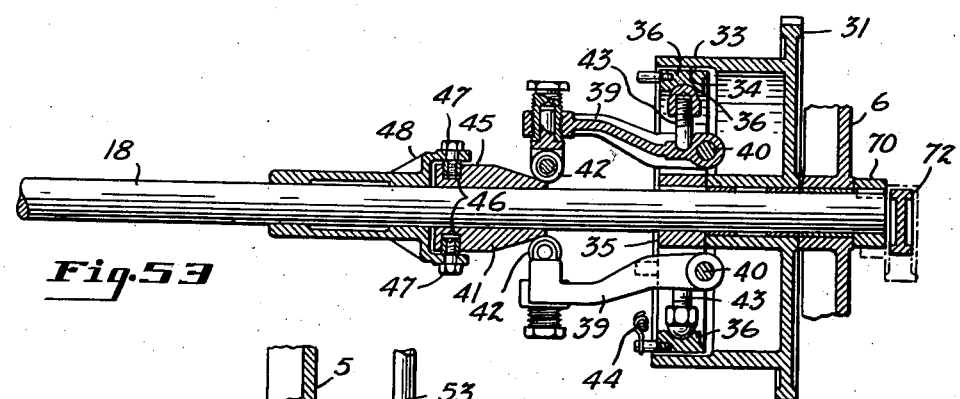
Figure 54:
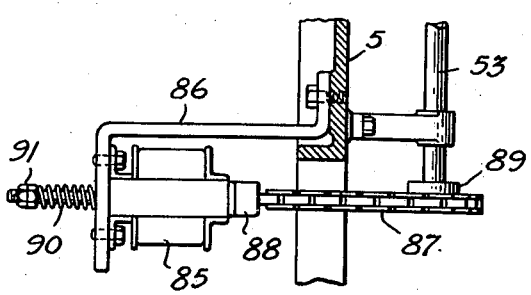
Figure 55:
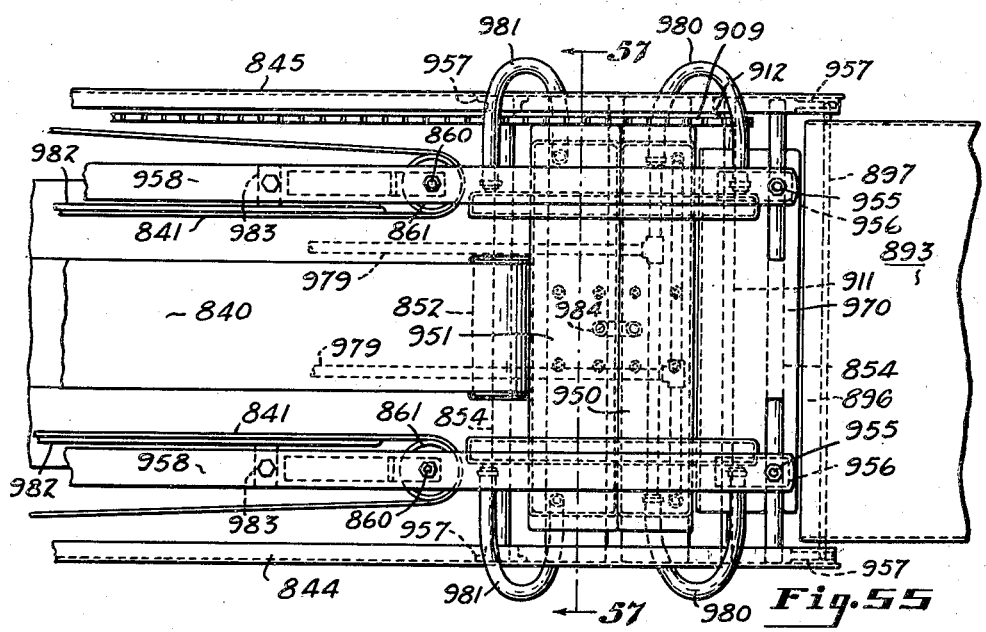
Figures 56, 57:
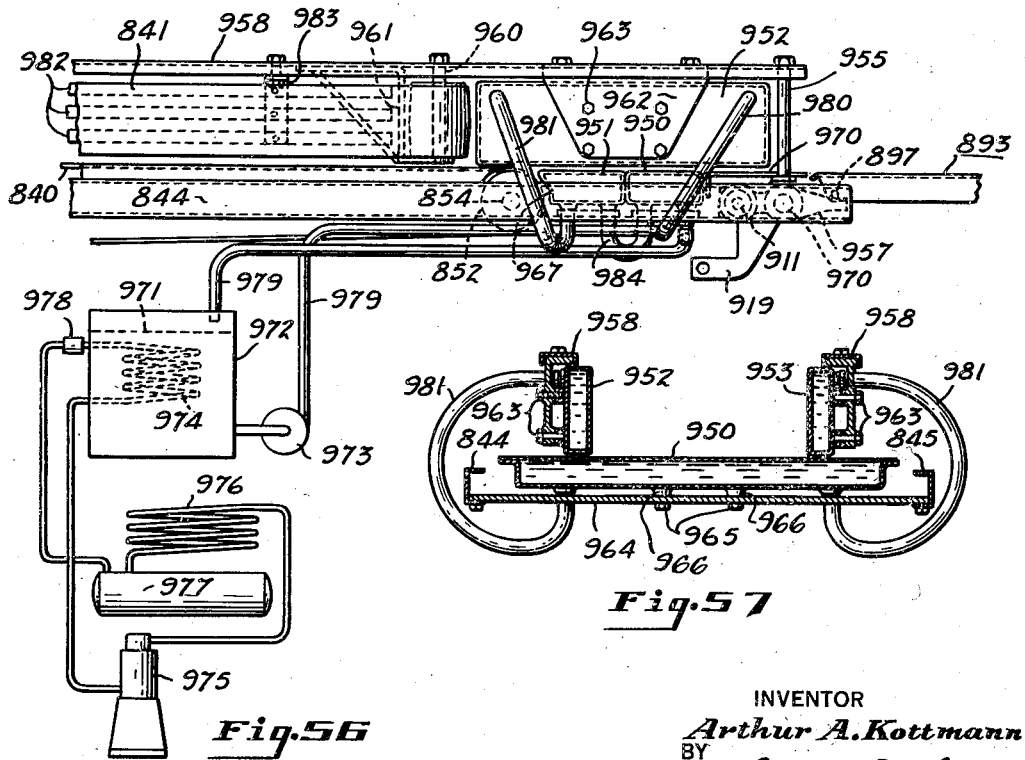

Figs. 31, 33, and 34 are elevational views of articles of different height as positioned on the elevator or carrier by the infeed conveyor flights and showing first end folding members of different size for the respective articles;

Fig. 32 is a fragmentary elevational view of Fig. 31 showing a front end view of the end folding member;

Fig. 35 is a fragmentary plan view showing a modified construction of article pusher secured on the end of the article advancing ram;

Fig. 36 is a sectional view with parts broken away taken substantially on the line 36—36 of Fig. 35;

Fig. 37 is a fragmentary plan view of the folding and sealing channel;

Fig. 38 is a detail view in section taken substantially on the line 38—38 of Fig. 37;

Fig. 39 is an elevational detail partly in section and with parts removed showing the wrapping material smoothing plate and taken substantially on the line 39—39 of Fig. 5;

Fig. 40 is a fragmentary sectional view with parts removed taken substantially on the line 40—40 of Fig. 39 and showing the positions of the article smoothing plate with and without an article on the carrier;

Fig. 41 is an enlarged view of a portion of the structure shown in Fig. 39 to illustrate switch actuated by the article smoothing plate;

Fig. 42 is an enlarged detail in section and with parts removed taken substantially on the line 42—42 of Fig. 39;

Fig. 43 is an enlarged detail in section and with parts removed taken substantially on the line 43—43 of Fig. 40;

Fig. 44 is a longitudinal vertical section, with parts removed, through the folding and sealing channel of the wrapping machine;

Fig. 45 is a plan view with parts removed of the structure shown in Fig. 44;

Fig. 46 is a diagrammatic illustration showing the action of the article hold-downs which extend through the folding and sealing channel and the discharge conveyor channel;

Fig. 47 is a sectional view with parts removed taken substantially on the line 47—47 of Fig. 46;

Fig. 48 is a diagrammatic plan view of the auxiliary bottom heating plate in the folding and sealing channel;

Fig. 49 is a sectional view, with parts removed, through one of the top end folding members and taken substantially on the line 49—49 of Fig. 44;

Fig. 50 is a vertical sectional detail, with parts removed, through one of the side belts and cooling tanks of the discharge conveyor, and taken substantially on the line 50—50 of Fig. 44;

Fig. 51 is a vertical sectional detail, with parts removed, through the folding slot of the side heater plates of the folding and sealing channel, and taken substantially on the line 51—51 of Fig. 44;

Fig. 52 is a horizontal section through the lower portion of the wrapping machine with parts removed showing the drive mechanism, and is taken substantially on the line 52—52 of Fig. 3;

Fig. 53 is a sectional detail, with parts removed, taken substantially on the line 53—53 of Fig. 52;

Fig. 54 is a detail partly in section, with parts removed, showing the electric solenoid associated with the safety device for stopping the wrapping mechanism, and is taken substantially on the line 54—54 of Fig. 3;

Fig. 55 is a diagrammatic plan view of a modified form of discharge conveyor taken at the outlet end thereof;

Fig. 56 is a diagrammatic elevational view of the modified discharge end cooling conveyor of Fig. 55, showing the arrangement of mechanical refrigeration mechanism;

and secured to the supporting side members 100 and 101. Brackets 114 secured on the outside of the members 100 and 101 adjacent the fittings 111 support the slicing machine end of the wrapping machine infeed conveyor. These brackets are secured to the insides of the slicing machine side frames 3.

Extending between and carried by the uppermost flanges of the supporting members 100 and 101 is an article supporting apron 115. The side marginal portions of the apron are disposed upwardly to form rails 116 parallel to the supporting members 100 and 101. The end of the apron 115 at the wrapping machine end of the infeed conveyor is referred to as the infeed station of the wrapping machine since it is here that articles first engage wrapping material and are then moved into the reciprocable carrier. The portion of the apron 115 which forms the infeed station is above the shaft 105 and corner marginal portions are removed (Fig. 11) to provide recesses which accommodate the conveyor belt sprockets 106.

The endless conveyor belts or chains 108 carry between them at uniformly spaced intervals, transverse flights 117 (Fig. 8) having upstanding auxiliary pusher plates 118. The flights are journalled in extensions of special link elements of the chains 108 and are rotatably carried in slightly spaced relation with respect to the apron 115 of the conveyor. As each flight is carried around the sprockets 109 at the slicing machine end of the conveyor the auxiliary pushers 118 trail the main flight 117 so that the latter may pass closely adjacent the underside of the discharge plate 19 of the slicing machine and above the apron 115. The auxiliary pushers 118 remain in this trailing position until the flight has moved away from the discharge plate of the slicing machine when they are elevated to their upright pushing position. The adjacent auxiliary pusher plates 118 of each of the flights are separated by spaces 121 (Fig. 22) to permit the pasage of fingers or bars 401 of the measuring device to be later described.

Secured to one extremity of each of the flights 117 is a cam 119 which rides upon a track 120 (Fig. 4) extending longitudinally of the conveyor over the supporting member 101. The cam and track elevate the flight pusher portion or plate 118 and maintain it in an upright position while it advances an article. Each article discharged from the slicing machine is engaged by a flight 117 and advanced a short distance toward the infeed station of the wrapping machine before the auxiliary pushers 118 are rotated into article contacting position by engagement of the cam 119 with the track 120. This elevation of the auxiliary pushers by rotation of the flights serves to thrust forward articles that may be riding on the top of the flights so that the articles are positively moved along the apron 115 in advance of the flights. The auxiliary pushers 118 remain in engagement with the articles until the latter are received by the carrier of the wrapping mechanism. In this manner the auxiliary pushers, which extend for a substantial distance above the apron 115, provide firm support for the rear sides of the articles being advanced into the wrapping mechanism.

The sprockets 106 secured on the shaft 105 are rotated in synchronous timed relation and maintain the flights in proper transverse position across the conveyor apron. The shaft 105 extends beyond one of the sprockets 106 toward the side frame 6, and has secured thereto a sprocket 122 (Fig. 11) around which runs a driving chain 123 driven by sprocket 124 secured to and carried by driving shaft 20 (Fig. 5), which is driven at substantially uniform rotational velocity and in synchronization with the remainder of the mechanism as will be hereinafter described. The chain 123 passes over idling sprocket 125 carried loosely on an intermediate shaft of the machine and idling sprocket 126 (Fig. 4) carried by supporting member 101 to direct the chain through a circuitous path in order to avoid interference with other parts of the wrapping machine.

*Crumb and sliver heel eliminator*

At the end of the infeed conveyor adjacent the slicing machine is a device for separating or eliminating crumbs and sliver heels from baked articles, such as loaves of bread, to be wrapped by the packaging machine. This device which forms the subject matter of my copending application, Serial No. 356,169, filed September 10, 1940, is shown in Figs. 7 through 10, and comprises a pair of longitudinally extending article-supporting plates 130 and 131, which are laterally adjustable and telescopically arranged beneath a fixed central longitudinally extending apron or plate 132. The plates or members 130, 131 and 132 are a continuation of the apron 115 at the article-receiving end of the feed conveyor and are arranged to support the articles during their movement from the discharge plate 19 of the slicing machine to the apron 115.

The central apron or plate 132 is supported on cross bars 133 (Fig. 9) which extend transversely of the infeed conveyor and have their ends secured in the longitudinal supporting members 100 and 101. Spacing members 134 are mounted on the centers of the bars 133 and are secured to central portions of the underside of the plate 132 so as to carry the latter in elevated spaced relation with respect to the bars 133. The side members or plates 130 and 131 are carried on shafts 135 and 136 having oppositely threaded ends which carry threaded blocks 137 secured to the under side of the plates 130 and 131. The shafts 135 and 136 are journalled in the longitudinal supporting members 100 and 101 and at one side extend through the latter to receive sprockets 140 secured thereon. A chain 141 connects the sprockets 140 so that the shafts 135 and 136 rotate synchronously.

Bracket 142, secured to the supporting member 101, journals an extended portion of the shaft 136, which has a sprocket 143 secured thereto. A chain 144 on the sprocket 143 is actuated by a sprocket 145 secured on a shaft of the discharge conveyor, to be later described. The chain 144 is thus arranged to simultaneously rotate the shafts 135 and 136 to telescopically move the article supporting plates or members 130 and 131 toward or away from one another beneath the central supporting plate 132. Thus, the effective combined article-supporting width of the plates 130, 131 and 132 may be adjusted to articles of different lengths, so that outer marginal edges 146 may be made to underlie the end slices or heels of a loaf A being advanced over the infeed conveyor. Accordingly, crumbs or sliver heels lying beyond the ends of the article when discharged from the plate 19 of the slicing machine will be unsupported and fall into a suitable receptacle (not shown).

Fig. 57 is a transverse sectional view with parts removed, taken substantially on the line 57—57 of Fig. 55;

Figs. 58 through 70 are diagrammatic illustrations showing the steps in the wrapping of a loaf of bread by the wrapping machine.

The general manner of operation of the slicing machine-wrapping machine combination which embodies the various features of the present invention involves the feeding of articles such as loaves of bread through a slicing machine preferably having vertically reciprocable knives and then onto an infeed conveyor of the wrapping machine. The various parts of the machine are indicated by numerals of reference which are applied to the same parts throughout the several views. The infeed conveyor moves continuously and carries the articles individually onto a vertically reciprocable elevator or carrier. In the movement of the articles to the carrier they are measured by a size indicator which controls the wrapping material feeding mechanism which is operated in timed relationship with respect to the infeed conveyor so that a sheet of wrapping material of the proper size is vertically positioned in the path of an article moving toward the elevator or carrier.

As the article moves onto the carrier the leading or first side of the article engages the wrapping material which has previously been severed from the end of a continuous web by a cutting means. The wrapping material is draped over the top of the article and the last portion of the wrapping material to be advanced by the feeding mechanism is tucked underneath the leading edge of the article and held between the article and platform of the carrier. Wrapping material smoothing and controlling means guide the wrapper as the article is received on the carrier and the smoothing means strokes the wrapper over the top of the article. Upon movement of the carrier to the discharge or outfeed station, the wrapping material is draped down the rear or second side of the article and the smoothing means strokes down the side of the article to complete the movement of the article onto the carrier and to smooth the wrapper against the article. Approaching the outfeed station, top end folds are performed on the portions of wrapping material extending over the ends of the article, and at the upper limit of movement of the carrier, the article is pushed therefrom into a folding and sealing channel. From the folding and sealing channel the articles are pushed into a discharge or cooling conveyor which moves them to a receiving platform.

All of the parts and groups of parts are related to one another and classification and grouping other than that outlined above may be made. The wrapping machine functions as a single unit of coordinated movements and mechanisms, all of which contribute to the final results and the consideration of several parts together as a group is for purposes of explanation and description in order to facilitate the location of the several parts in the drawings and their place in the specification.

All portions of the path of the articles through the slicing machine, infeed conveyor, wrapping mechanism, and discharge conveyor are substantially in a common vertical plane, and during their movement the articles are at all times supported from underneath so that there is a minimum of squeezing and deformation thereof. Furthermore, the discharge of the completed packages is directly above the station in which unsliced articles are fed to the slicing machine so that a single attendant may operate the combination.

Referring to Figs. 1 and 2, the wrapping machine is indicated at 1 and the slicing machine at 2. The driving mechanism for the reciprocable blades of the slicing machine is contained within the side frames 3 thereof and powered by an electric motor. The remainder of the mechanism, including all the conveyors for both the wrapping machine and slicing machine, together with the wrapping mechanism and wrapping material feeding mechanism, is preferably driven in synchronous timed relation by means of motor 4.

The wrapping machine comprises a pair of side frames 5 and 6 between which extend a plurality of cross members. Cross member 7 (Figs. 3 and 5) is positioned at the top of the machine at the left end thereof. Cross member 8 is carried between the side frames below the cross member 7. Cross member 9 is positioned at the bottom and right hand end of the machine as viewed in the same figures. Cross member 10 is located centrally of the wrapping machine and cross members 11 and 12 extend between the side frames at the top to carry parts of the folding and sealing channel.

Articles are deposited on infeed conveyor 13 of the slicing machine 2, which operates in timed relation with the wrapping mechanism, and are fed thereby to and through the slicing machine blades (not shown). Emerging from the slicing machine over its discharge plate 19 (Fig. 7) the articles are individually engaged by flights of a conveyor for carrying the articles to the wrapping mechanism.

*Article infeed conveyor mechanism*

The conveyor which extends from the discharge plate of the slicing machine 2 for carrying articles from the latter to the wrapping machine may also be used for the infeed conveyor of the wrapping machine when unsliced articles are to be wrapped. It comprises a pair of spaced parallel supporting members 100 and 101 (Figs. 5 and 8) which may be suitably formed of metal channels disposed in opposed relation with vertical web portions and inwardly disposed flanges so that the channels of the members open toward one another. The wrapping machine end of the conveyor is carried by a transverse rod 102 received in reinforced elongated slots 103 formed in the side frames 5 and 6 and adjustably secured by nuts to provide vertical adjustment of the conveyor. The extremities of the supporting members 100 and 101 extend a substantial distance inwardly of the rod 102, and are provided with fittings 104 (Figs. 5 and 11) which serve as journals for a transverse driven shaft 105. The ends of the shaft 105 carry conveyor chain sprockets 106 on the outside of the fittings 104 and the shaft carrying portions or journals 107 of the fittings 104 (Fig. 11) are formed inwardly of the members 100 and 101 so that the driving sprockets 106 are positioned substantially in alinement with the members 100 and 101.

Conveyor side chains 108 are carried in spaced parallel relation by the sprockets 106 and a similar pair of sprockets 109 (Fig. 7) carried by a transverse shaft 110 at the opposite or slicer end of the conveyor. The shaft 110 is journalled in fittings 111 corresponding to the fittings 104

Discharge ends 149 of the plates 130, 131 and 132 are slightly spaced from the receiving end of the apron 115, as shown in Fig. 10, to provide a slot 150 extending transversely of the conveyor, through which crumbs and sliver heels, such as indicated at 151, may drop into the receptacle previously mentioned, instead of being carried forward over the apron 115 to the wrapping mechanism. Preferably, edge 152 of the apron 115 is rounded or bent downwardly to prevent snagging or catching an article moving thereto from the plates of the crumb eliminator.

As will later appear, guides 915 are provided to confine the article being advanced over the infeed conveyor, including the crumb and sliver heel eliminator. These guides are arranged to position the article so that the end slices thereof are supported by the marginal edges 146 of the plates 130 and 131.

Wrapping material supply and feed

The wrapping material is in the form of one or more continuous sheets or strips which are supplied in the form of rolls (indicated at R1, R2, and R3, Figs. 2 and 3). The operation of the machine is substantially the same whether a single roll such as the roll R1 is employed to feed a single thickness of wrapping material, or whether a plurality of rolls to feed several thicknesses such as an inner and outer wrap and a liner or band. In the usual arrangement having a multiplicity of sheets, wrapping material to form the outside wrapper is positioned at R1, that forming the inner wrap at R2, and the band or liner at R3. The rolls R1 and R2 are carried on cone shaped bushings or collets which frictionally engage the central axial aperture through the roll and are in turn frictionally engaged and rotatably supported in cone shaped sockets formed in movable brackets 200. The brackets are each supported at two corners, the lower corner having a sleeve 201 slidably carried on a smooth rod 202 (Fig. 5) extending between the side frames 5 and 6. The upper corner of each bracket has an elongated, internally threaded sleeve 203 which is carried by a rotatable shaft 204 journalled in the side frames of the wrapping machine above the corresponding smooth shaft 202. The shafts 204 have oppositely threaded ends which engage the threads of the elongated sleeves 203 of the brackets. Upon rotation of the shafts 204, by means of hand wheels 205, the wrapping material roll supporting brackets 200 of each pair may be moved toward or away from each other. The cone shaped journals or sockets thus grip the collets or cones with variable pressure to increase or decrease the force or energy required to rotate the rolls of wrapping material.

To facilitate the positioning of a new roll of wrapping material between the brackets 200 the collets are centrally apertured to receive a bar 206. An upwardly directed reinforced slot 207 is formed in each of the cone shaped journals or sockets 202. When positioning a new roll of wrapping material in the machine the brackets 200 are moved apart by means of the hand wheel 205 and the new roll having the collets inserted in each end of its axial aperture is elevated into position by means of the rod or bar 206 which extends through the axial apertures in the collets and is received in the slots 207. Upon drawing the brackets together the cone sockets frictionally engage the cone shaped ends of the collets to thereby support the roll of wrapping material independently of the bar 206.

The liner or banding roll R3 is carried by a shaft 210 which has one end adjustably carried in a bracket member 211 depending from cross member 8 of the wrapping machine.

The free end of the wrapping material from each of the rolls R2 and R3 is led underneath a guide roll 214 (Fig. 5) journalled between the side frames 5 and 6 immediately below the smooth shaft 202 which supports the brackets 200 for the top wrapping material roll R1.

After passing under the roll 214 the respective sheets of wrapping material from the several supply rolls R1, R2, and R3 are led through the same path and from this point onward the feeding and manipulation of the wrapping material through the various wrapping stages is the same as if but a single roll of wrapping material were employed. It will be referred to as a web or sheet and indicated by the letter W. From the roll 214 the web W passes over a slack take-up roller 215, thence under an idling roller 216 and next between a pair of feed rollers 217 and 218. This path of the web is over a wrapping material tray or apron 219 supported between the side frames 5 and 6. One end is carried by cross member 220 while the opposite end adjacent the wrapping material feed roller 218 is carried by double angle brackets 221 secured to the cross member 10. The tray 219 is substantially tangent to the upper surface of the bottom feed roller 218 adjacent the portion thereof which is engaged by the upper feed roller 217. Marginal portions 222 of the tray 219 are flanged downwardly to give strength and rigidity to the tray and to carry the rollers 215 and 216. The latter roller is journalled to be freely rotatable in brackets 223 secured to the reinforcing flanges 222 and arranged so that the roller is positioned transversely of the tray 219 and spaced from the upper surface thereof.

A pair of bell crank levers carry the wrapping material slack roller 215 at the extremities of their longer arms 226 and are pivoted at 227 in brackets 228 secured to the reinforcing flanges 222 of the tray 219. The short arms 229 of the bell crank levers are joined by a transverse bar 230 so that the pivotal movement of the levers is synchronized to carry the slack roller up and down and maintain it in constant parallel relation with respect to the rolls 214 and 216. Tension spring 231 is connected to a central portion of the transverse bar 230 and extends toward the rear of the machine, being secured to the cross member 220. This spring normally tends to rotate the bell crank levers in a clockwise direction, as viewed in Fig. 5, about the pivots 227. Upward movement of the bell crank levers is limited by engagement of the bar 230 with the tray flanges 222.

The wrapping material smoother or bottom feed roller 218 is of considerably greater diameter than the top feed roller 217. It comprises a tubular member 244 (Fig. 15) of a suitable material such as steel, carried on a pair of end members or hubs 245 secured to a shaft 246 journalled at 246 in the side frames.

The top or small feed roller 217 carries at spaced intervals circumferential bands 250 formed of soft, yieldable and elastic material such as rubber. These bands are of sufficient thickness to space or separate the feed roller 217 from the feed roller 218 and frictionally engage the latter or the wrapping material between the rollers. Reduced diameter end portions 251 of the top feed roller are carried in spring mounted journals 212 threadedly engaged and supported by guide pins 253. These pins are carried in upstanding brackets 254 (Fig. 3) which have upper and lower extensions 255 and 256 respectively. The guide pin 253 has sliding engagement with the lower extension 256 and an adjusting sleeve 257 threadedly engaged in an aperture in the upper extension 255. This sleeve slidingly receives the upper portion of the guide pin 253 and a compression spring 258 retained by the sleeve seats against a collar 259 on the guide pin. Accordingly, by screwing the adjusting sleeve 257 up or down the pressure exerted on the top feed roller 227 by the journal 252 may be regulated so that the frictional engagement between the annular rubber bands 250 and the tubular member 244 or the web W may be adjusted.

One end of the shaft 246 of the bottom feed roller extends beyond the journal 248 in the side frame 5 and has a gear 260 keyed thereto. The reduced diameter portion 251 at the corresponding end of roller 217 extends beyond the bushing 252 and has a gear 261 keyed thereto and meshed with the gear 260. The gears 260 and 261 are provided with the proper number of teeth so that the bands 250 and tubular member 244 may be synchronously rotated at substantially the same peripheral speed in opposite directions by rotation of the shaft 246.

A stripper 263 is positioned above and in spaced relation with the end of the tray 219 and extends into the bight of the feed rolls. This stripper is removably carried by a supporting member 264 extending across the tray 219 and having depending flange portions 265 secured to the reinforcing flanges 222. A plurality of integral finger portions 266 formed on the stripper extend between the top and bottom feed rollers in the spaces between successive bands 250. A U-shaped clamping member 267 (Fig. 21) embraces the stripper 263 and the supporting member 264 to hold the stripper in correct relative position with respect to the tray 219 and wrapping material feed rollers. Preferably, the clamping member is secured, as by welding, to the stripper. Bolts 262 having nuts accessible from the top when the carrier is raised extend through the clamping member 267 and secure the stripper in place. The stripper may be readily removed for cleaning and inspection of the feed rollers by removing the bolts 262 and sliding the clamping member 267 and stripper 263 as a unit off the support member 264.

A bed knife supporting member 268 is positioned adjacent the bottom feed roller 218 on the opposite side thereof from the tangentially disposed end of the tray 219 (Figs. 5 and 12). This knife support is carried between the side frames of the machine and has a concave side corresponding to the contour of the smoothing roll 218 disposed adjacent the latter, so that the upper surface of the supporting member is substantially tangential with the line of intersection of the feed rollers. The support 264 is angularly disposed with respect to the plane of the tray 219 so that the tray and stripper 263 converge toward the bight of the feed rollers, thus facilitating the initial feeding of an end of a web W between the rollers when introducing a new supply of wrapping material. The fingers 266 of the stripper extend a substantial distance beyond the feed rollers after passing through the bight thereof between the rubber bands 250 and overlie upper surface 269 of the knife supporting member 268, and in close proximity thereto so that the leading edge of the wrapping material is closely guided therebetween.

At the side frame 6 the shaft 246 of the bottom feed roller extends a substantial distance beyond the journal 248 and at its extreme end carries a hand wheel 270 (Fig. 15). This wheel has a hub 271 (Fig. 16) longitudinally slidable on the shaft 246 and secured against rotation by a key. A hub cap 273 seats against the end of the shaft 246 and is retained in fixed relation with respect thereto by a shoulder bolt 274 which threadedly engages the shaft. By rotation of the hub cap 273, rotatable on the shoulder bolt 274 and threadedly engaging the hub 271, the hand wheel 270 may be advanced or retracted with respect to the shaft 246 thus providing for accurate longitudinal adjustment for a purpose to be later described.

The hand wheel 270 is spaced from the side frame 6 to provide room on the shaft 246 for a clutch sleeve 272 having a radially disposed flange 275 on the end thereof adjacent the hand wheel hub. This sleeve is freely rotatable on the shaft 246 and rides on an anti-friction bushing 276. A sprocket 277 having an elongated hub portion is carried by the clutch sleeve and is longitudinally slidable thereon being secured against relative rotation by a key 278. A ball thrust bearing assembly 281 is mounted on the clutch sleeve 272 between the radial flange 275 and an annular collar 282 carried by the elongated hub portion of the sprocket 277. The bearing assembly is enclosed in a collar 279 having an inwardly directed annular flange engaged by the collar 282. The sprocket 277 is connected by a chain belt 283 (Fig. 4) to a driving sprocket 280 (Fig. 6) secured on a continuously rotating driving shaft 15. The clutch sleeve flange 275 is provided with a toothed clutch disc element 284 and a mating toothed clutch disc element 285 is carried by a radial flange 286 formed on the hub 271 of the hand wheel 270. These clutch elements have opposing faces provided with fine radially extending teeth 287. The direction of rotation of the sprocket 277 and the configuration or slope of the faces of the teeth 287 are such that when the clutch elements are brought into engagement a driving connection is established between the driving shaft 15 and the wrapping material feeding rollers 217 and 218 so that the latter are rotated to feed wrapping material from left to right as viewed in Fig. 5.

Internally threaded, radially directed top and bottom bosses 288 diametrically opposed to one another are formed on the annular collar 279 (Figs. 15 and 17) to receive bolts 289 positioned in apertures formed in the ends of a yoke 290 carried on one end of a clutch actuating lever 291. This lever is pivoted on stud 293 between top and bottom portions of bracket 292 formed on the side frame 6 of the machine adjacent the shaft 246. The oscillation in a horizontal plane of the clutch actuating lever 291 is controlled in a manner to be hereinafter described, and brings the clutch element 284, driven at a constant rotational velocity by the sprocket 277, into and out of engagement with the clutch element 285 having a driving connection with the shaft 246, thus starting and stopping the wrapping material feed rolls 217 and 218.

When the clutch elements 284 and 285 are disengaged, the feed rolls 217 and 218 may be freely rotated in either direction by the hand wheel 270. This feature aids in initially threading a web of wrapping material into the machine and in changing wrapping material supply since the clutch is normally disengaged and the operator can release the grip of the feed rolls on the old web and introduce the new web between them with a minimum of effort and time.

For supporting wrapping material advanced by the feed rolls 217 and 218 an apron 294 (Fig. 5) is provided. This apron, preferably constructed of a material such as sheet steel or aluminum, is positioned between the side frames of the machine and, from a position slightly below and spaced from the edge of the bed knife supporting member 268, slopes downwardly and away therefrom in the direction of web feed. The upper end thereof adjacent the supporting member 268 is carried on a pair of brackets 295 secured to the cross member 10. Depending stirrup portions 296 of the brackets accommodate a wrapping material carrier bar at the lower end of its path, as will be hereinafter described. The opposite or lower end of the apron 294 is carried on a rod 297 extending between and supported by the side frames 5 and 6.

A spring pressed pivoted scraper plate 298 (Fig. 5) is secured to an angle member apertured to receive upwardly extending pin 299 held in horizontal portions of the double angle brackets 221. The angle member has downwardly directed knife edges bearing on the brackets 221 adjacent the pins 299 and the edge of the scraper 298 is thus urged upwardly against the bottom of the large feed roll 218 to remove foreign particles such as wax.

*Wrapping material positioning*

At the instant the clutch actuating lever 291 causes engagement between the clutch elements 284 and 285 to commence the feeding of wrapping material, upper and lower carrier bars 300 and 301, respectively, are in approximately the position indicated by the broken lines in Fig. 23. These wrapping material carrier bars are thus below the line of feed of the wrapping material over the tray 219, between the feed rollers 217 and 218, and over the wrapping material supporting apron 294, so that the leading edge of the wrapping material web W passes over the carrier bars and is initially supported by the apron 294. The bars 300 and 301 are at all times in parallel relation with one another and with the web W, transversely of the direction of feed of the wrapping material and parallel with the plane of the apron 294. They are carried by a pair of spaced parallel pivoted arms 302 clamped by hubs 305 on an oscillating shaft 303 journalled in the side frames. Oscillating motion is imparted to the shaft 303 and bars 302 by a depending lever 304 formed as an extension from the hub 305 of one of the arms 302. An L-shaped link 306 connects the lever 304 to an oscillating lever 307 secured on an oscillating driving shaft 16. One limit of movement of the shaft 16 and lever arm 307 is indicated in Fig. 23 by the full lines, in which position the arms 302 are in their uppermost position. The other limit of movement indicated by the broken lines of Fig. 23 carries the arms 302 to their lower position. The L-shaped form of the lever 306 avoids contact between this lever and the shaft 16 during movement of the lever.

The pivoted arms 302 are formed with end portions 308 set at an acute angle with respect to the main portion and the lower carrier bar 301 is journalled adjacent the bend of the arms where the end portions 308 are joined to the main portions of the levers. The upper carrier bar 300 is journalled in the extremities of the end portions 308. Because of the acute angle between the end portions 308 and the main portion of the lever, the radii of oscillation of both the upper carrier bar 300 and the lower carrier bar 301 about the shaft 303 are substantially equal.

Extending from the hubs 305 of the carrier bar arms 302 are upwardly directed ears 310 each having an arm 311 pivoted thereto at 312. Stirrups 314 (Fig. 24) are formed on the ends of arms 311, the latter being positioned on the inside of the carrier bar arms 302. At 315 the arms 311 cross the arms 302 and the stirrups are positioned about the angularly disposed end portions 308. Accordingly, free ends 316 of the arms 311 are disposed adjacent and inside the end portions 308 of the arms 302. Pins 317 in the free ends 316 carry a clamping bar 318 which extends between the arms 311 and is in parallel relation with respect to the carrier bars 300 and 301.

The oscillatory movement of the clamping bar arms 311 about the shaft 303, is supplemented by an oscillatory movement about the pivots 312. The position of the pivots 312, carried by the ears 310 of the lever arms 302, is such, with respect to the axis of the lever 302 and the axis of the shaft 303, that the clamping bar 318 is maintained in parallel relationship with the carrier bars 300 and 301. At the lower limit of movement of the arms 311 with respect to the arms 302 and the pivots 312 the clamping bar 318 engages the carrier bar 301, so that, as will later appear, the two may cooperate to grip a sheet of wrapping material positioned across the carrier bar 301. Upward pivotal movement of the arms 311 about the pivots 312 causes the clamping bar 318 to move away from the carrier bar 301, thus releasing wrapping material gripped between the two. Furthermore, this upward oscillation of the arms 311 about the pivots 312 carries the gripper bar 318 outwardly beyond and past the carrier bar 300 without engaging the latter, so that there is no gripping action between the upper carrier bar 300 and the clamping bar 318.

Clockwise rotation of the lever 307 about the shaft 16 moves the carrier bar supporting arms 302 downward to the broken line position shown in Fig. 23. The clamping bar 318 is finally brought to rest by the cam 327 above the plane of wrapping material feed, and parallel therewith as shown by the broken lines of Fig. 23. The clamping bar 318 remains in this position until it is engaged by the lower carrier bar 301 upon upward movement of the latter occurring after the wrapping material feed has been commenced by the rollers 217 and 218 so that the underside of the advanced wrapping material is engaged by the carrier bar and carried upwardly, and the gripper bar 318 serves to clamp the wrapping material in cooperation with the carrier bar 301.

Positioned slightly below and to the left of the oscillating shaft 303, as viewed in Figs. 5 and 23, and in parallel relation therewith, is a second or auxiliary oscillating shaft 323 which carries the previously mentioned idling sprocket 125 freely rotatable thereon. Oscillatory movement is imparted to the shaft 323 by a lever 324 secured thereon and extending to the left. An adjustable length link 325 connects the lever 324 to the free end of lever 326 supported on oscillating drive shaft 17, which is journalled in the side frames. A cam 327 is secured on main drive shaft 18 for rotation therewith and engages a cam follower or roller 328 journalled in an extension 329 intermediate the ends of the lever 326. Tension spring 330, fastened to the free end of the lever 326 and anchored to a bracket 86 mounted on the side frame 5, retains the follower 328 in rolling engagement with the surface of the cam 327. In this manner the lever 326 is made to rise and fall and the shaft 323 is oscillated in timed relation with respect to the wrapping mechanism and the shaft 303 carrying the arms 302 and 311. Cam levers 331 are secured to the shaft 323 for synchronous oscillation in spaced parallel relation with one another and through arcuate paths. The cam levers move in the same planes as the gripper bar arms 311 and have their extremities in engagement with the underside edges of the latter. The oscillation of the shaft 323 under the influence of the cam 327 is of sufficient degree and timed with respect to the oscillation of the shaft 303 so that upon the carrier bar lever arms 302 reaching their upper limit of movement (carrying the clamping bar arms 311 because of the engagement between the clamping bar 318 and carrier bar 301) the cam lever 331 move the clamping bar arms 311 in a slight additional upward oscillatory movement about the pivots 312, thus disengaging the clamping bar 318 from the carrier bar 301 for a purpose to be hereinafter pointed out. Desirably, saddles 332 are provided to straddle the arms 311 and are made slidable thereover. These saddles embrace the free ends of the cam levers 331 and are pivotally connected thereto by pins 333. Thus the levers 331 are substantially retained in engagement with the arms 311 for quiet and efficient operation.

*Wrapping material folding guides*

At the upper limit of its movement the carrier bar 301 engages a resilient member 335 (Fig. 23), preferably in the form of a roller covered with a yielding material, such as relatively soft rubber. This member or roller is journalled in bell crank levers 336, secured on a rod 337 extending between the side frames 5 and 6 and journalled in brackets 338 (Fig. 5), secured to the side frames. Adjacent the bell crank levers 336 the rod 337 passes through brackets 339 secured to the under side of cross member 11. Tension springs 340 connect one end of the bell crank levers 337 to the brackets 339 to pivot the bell crank lever in a counterclockwise direction, as viewed in Fig. 23, and normally moves the rubber covered roller 335 into the path of the carrier bar 301. Adjusting bolts 341, threaded through the spring securing end of each of the levers 336, engages an abutment on the bracket 339 to limit the pivotal movement of the rubber covered roller 335 toward the carrier bar 301 and the spring 340 is arranged to normally hold the bolt 341 against the abutment.

Figure 4:
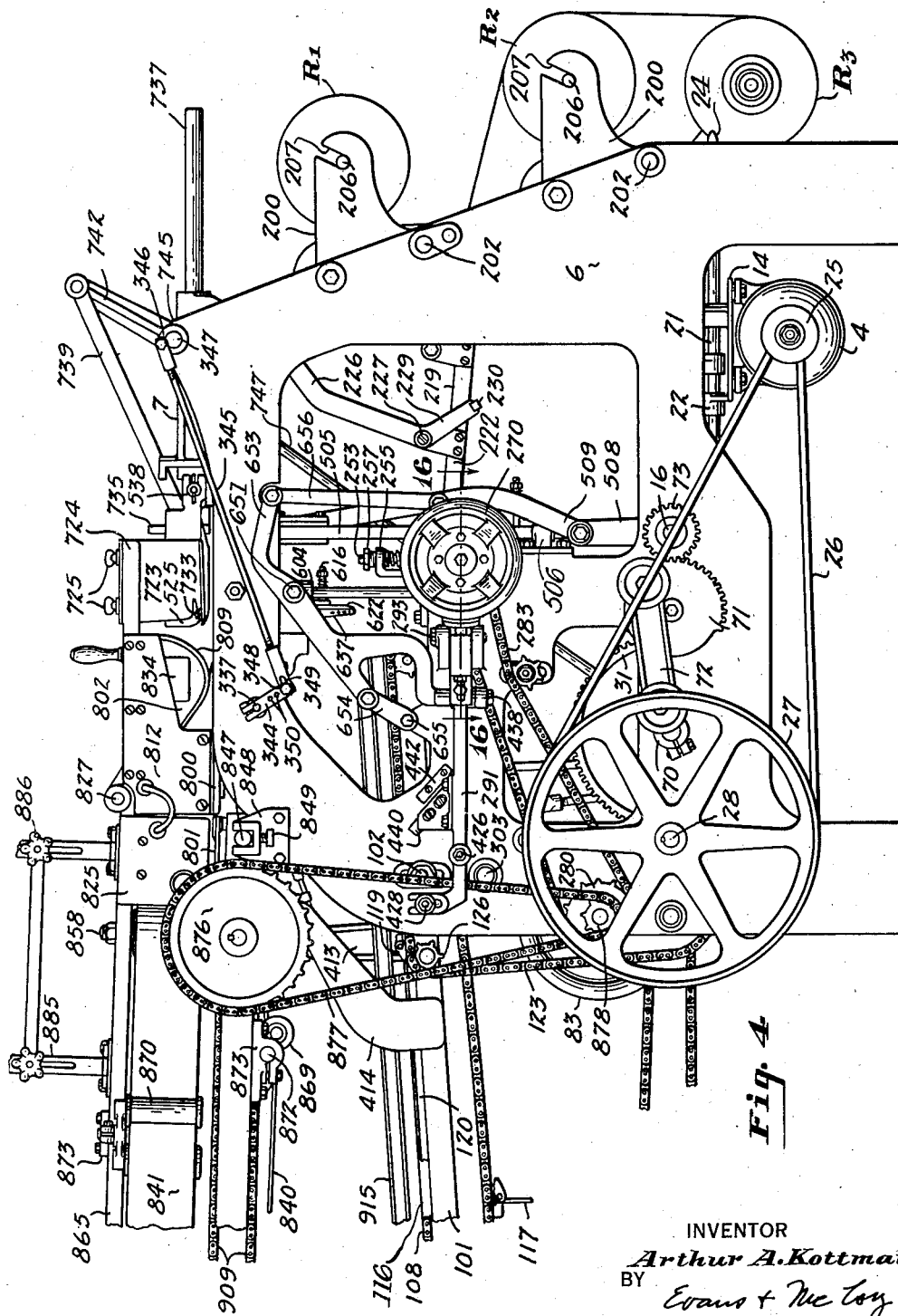
Fig. 4 is a side elevational view of the wrapping machine of the preceding figures, showing the side thereof opposite that illustrated in Fig. 3.

One end of the rod 337 extends beyond the side frame 6 and has secured thereon a lever 344 (Fig. 4). An adjustable length link 345 connects the free end of the lever 344 to the free end of lever 346 secured on a projecting end of a reciprocating shaft 347 journalled in the side frames of the machine and actuated in a manner to be later described. The lever 344 is pivotally connected to the link 345 by means of a bolt 348 which rides in an elongated slot 349 formed in the end of the adjustable length link 345. A plurality of holes 350 are formed along the lever 344 so that the bolt 348 may be located at various distances from the rod 337 to vary the movement of the resilient roller 335. The elongated slot 349 permits a period of lost motion of the link 345, during which the roller 335 is stationary or is moved by the carrier bar 301, being held thereagainst by the spring 340.

The movement of the carrier bars is arranged so that the resilient roller 335 is engaged by the carrier bar 301 to hold the wrapping material prior to the movement of the clamping bar 318 away from the carrier bar. Accordingly, when the clamping bar moves away from the carrier bar to substantially the position shown by the full lines in Fig. 23, the wrapping material is not immediately released, but is yieldingly held between the carrier bar 301 and the resilient roller 335. Upon an article moving into the suspended sheet of wrapping material, as will be later described, the roller 335 is pivoted by means of the lever 346 and adjustable length link 345 out of engagement with the carrier bar 301 to release the wrapping material. The roller 335, however, does not move a great distance away from the carrier bar 301 and remains closely adjacent thereto so as to cooperate therewith in guiding the movement of the wrapping material, as it is withdrawn from the carrier bar in enveloping the article. This guiding is effected without gripping the wrapping material so that there is not any considerable frictional drag on the wrapping material as it is withdrawn from between the guiding members 301 and 335.

While the upper end of the sheet of wrapping material is being guided by the carrier bar 301 and rubber covered roller 335 during the movement of the article onto the carrier, the lower end of the sheet of wrapping material is similarly guided between an abutment member or roller 511, to be later described, extending along the receiving edge of the carrier and a guide bar 355 (Fig. 23). The guide bar 355 is journalled in the ends of pivoted arms 356 and 357 (Fig. 11) secured on a rod 358 journalled in the conveyor supporting members 100 and 101. Oscillation of the rod 358 pivots the arms 356 and 357 in a parallel movement to carry the guide bar 355 in an arcuate path toward and away from the member 511 on the article carrier. The hub portion of the arm 357 has an extension lever 359 (Fig. 23) connected by an adjustable length link 360 to the free end of an arm 361 pivoted on the driving shaft 17.

A downwardly directed extension 362 formed intermediate the ends of the arm 361 journals a cam roller 363 which rides on a rotating cam 364 secured on the main driving shaft 18. A tension spring 365 is connected to the pivoted arm 361 to draw the latter downwardly and to hold the cam roller 363 in engagement with the surface of the cam 364. This cam is arranged to oscillate the guide bar 355 from substantially the dotted line position to the full line position, indicated in Fig. 23. The upward movement of the bar 355 toward the member 511 on the carrier is effected by the spring 365. Thus if an obstructing object should fall between the carrier and the guide bar 355 the latter would merely resiliently press thereagainst without injuring the object or the mechanism of the wrapping machine. The cam 367 is secured on the driveshaft 18 so that its crest is substantially diametrically opposite the crest of the cam 327 which actuates the cam levers 331 for separating the clamping bar 318 from the carrier bar 301. Accordingly, the guide bar 355 is lowered during a portion of the wrapping machine cycle when the carrier bars 300 and 301 are lowered and while the article carrier is moving to and returning from the outfeed station of the wrapping machine. While the carrier bars 300 and 301 are at their uppermost position the guide bar 355 is swung upwardly to a position adjacent and parallel with the carrier member 511 so as to cooperate therewith in guiding the trailing or bottom end of a sheet of wrapping material as an article is advanced into the wrapping machine and onto the carrier.

Article measuring mechanism

As an article is advanced over the apron 115 toward the infeed station of the wrapping machine it engages a depending member 400 of an article size indicator. The member 400 is preferably in the form of a substantially flat sheet or plate which extends across the major portion of the width of the apron 115. A pair of parallel fingers or rods 401 (Fig. 28) carry the member 400, extending across the side thereof opposite the article engaging face and being clamped against the member by a bar 402 which threadedly receives screws 403 extending through the member 400 and has transverse notches at opposite ends to guide the rods 401. By loosening the screws 403 and sliding the bar 402 on the rods 401, the height of the member 400 with respect to the article supporting apron of the infeed conveyor can be adjusted for articles of different form and size.

Upper ends of the rods 401 are secured in an adjustable bracket 404, the ends of which are slidingly received on spaced parallel supporting rods 405 secured in a bracket member 406 clamped on a pivot bar 407 in parallel relation with the adjustable bracket. A threaded rod 408, having a knurled knob 409, is rotatably mounted in spaced journal bosses 410 formed on the bracket member 406 and has threaded engagement in the adjustable bracket 404.

This rod is disposed transversely of the bracket 406, between and parallel to the supporting rods 405. It is held in the journals 410 against longitudinal movement by a collar 411 and the knob 409. Rotation of the rod 408 moves the adjustable bracket toward or away from the bracket member 406. The rods 401 are secured in the adjustable bracket 404 at an angle with respect to the supporting rods 405 and threaded rod 408 so that the movement of the adjustable bracket 404 by the threaded rod regulates the relative position of the article contacting member 400 longitudinally with respect to the path of articles over the conveyor apron 115.

Between the journal bosses 410, the adjusting rod 408 has a square or non-circular section and is exposed to the action of a leaf spring 412 (Fig. 27) which is locked in place by the bosses 410. In this manner inadvertent rotation of the rod 408 is avoided and the device is maintained in adjusted relation during continued operation of the machine.

Lower or bottom ends of the rods 401 are curved in the direction of article movement to ride smoothly over the tops of articles, and extend below the tops of the auxiliary pushers 118, when the latter are upright, to be engaged by low articles. As the flights move past the rods 401, the latter pass between adjacent auxiliary pusher plates 118 through the spaces 121 (Fig. 22). The pivot bar 407 is supported by brackets 413 and 414 secured respectively to the supporting member 100 on the operator's side of the machine and the supporting member 101 on the opposite or drive side. Preferably each of these brackets has a ball bearing journal, indicated at 415 in Fig. 19, to receive an end of the pivot bar 407 in order that the latter may rotate with a minimum of friction. The pivot bar 407 is supported with its axis at substantially a right angle with respect to the direction of movement of articles over the infeed conveyor and a sufficient distance above the apron 115 so that the largest articles intended to be packaged by the combination will have adequate clearance thereunder.

A latch mechanism illustrated in detail in Figs. 18 and 19 is carried by the pivot bar 407. This latch comprises a quadrant 416 positioned transversely of the axis of the pivot bar and rotatably carried on the latter by a hub 417. The hub 417 is positioned on the end of the pivot bar 407 adjacent the ball bearing journal 415 of the bracket 413 and is held against longitudinal sliding movement on the pivot bar by a clamping hub member 418 which is secured to the pivot bar 407 by means of a tightening bolt 419. Extending radially from the hub 418 is an arm 420 having an aperture in its extremity to slidably receive the threaded end of an adjusting bolt 421. The opposite end of the bolt 421 is threadedly secured in an extension 422 on the quadrant member 416. A knurled thumb nut 423 carried on the threaded end of the adjusting bolt 421 enables the quadrant 416 to be rotated slight amounts about the axis of the pivot bar 407 and a compression spring 424 positioned between the arm 420 and extension 422 urges the arm against the thumb nut so that the quadrant 416 is retained in adjusted position with respect to the pivot bar 407.

Referring to Fig. 20 the clutch actuating lever 291 is urged toward side frame 6 by a compression spring 425 carried on a rod 426 extending through an aperture in the lever 291 and screwed into the side frame. The free end of the clutch actuating lever 291 extends upwardly and is bifurcated at 427 (Fig. 17) to receive a tie rod 428. This end of the tie rod is threaded to receive a pair of nuts which are disposed on opposite sides of the lever 291. A compression spring 429 is carried by the tie rod 428 between the outer nut and the lever 291. The tie rod extends through apertures in the side frame 6 and supporting members 100 and 101, and terminates in a clevis 430 (Fig. 22) adjacent the bottom portion of the bracket 413 secured to the supporting member 100.

Pivoted at 431 to the bracket 413 is a latch lever 432 having an angularly disposed arcuate shaped foot 433 with its center of curvature at the pivot. Heel 434 of the lever normally engages a marginal portion of the quadrant 416 and retains the latch 432 in an upright position as indicated by the full lines of Fig. 22. The end of the latch opposite the foot 433 is pivoted in the clevis 430, and the end of the clutch actuating lever 291 engaged by the end of the tie rod 428 is held outwardly away from the side frame 6 against the compression of the spring 425. In this position the clutch elements 284 and 285 are disengaged so that there is no driving engagement between the sprocket 277 and the wrapping material feed rolls 217 and 218. The position of the quadrant 416 on the pivot bar 407 is arranged so that when the wrapping material advancing clutch is thus held in disengaged position the member 400 is suspended in article engaging position over the infeed conveyor apron 115. Preferably the adjustment of the pivot bar is such that the member 400 has its article contacting surface set at about 45° with respect to the conveyor apron 115, as described in the co-pending patent application of Harold H. Mohl, Serial No. 284,519, filed July 14, 1939.

Upon being engaged by an article moving over the conveyor apron the member 400 is rotated in a clockwise direction as viewed from the operator's side of the machine (see Fig. 5). This movement of the member 400 rotates the pivot bar 407 in a counter-clockwise direction as viewed in Fig. 18. Upon sufficient movement in this manner radial or latch releasing edge 435 of the quadrant 416 moves beyond the heel 434 of the latch lever 432 so that the latter is released and moves to the broken line position indicated in Fig. 22. This movement of the latch lever is energized by the compression spring 425 through the clutch actuating lever 291 and tie rod 428. Movement of an article past the member 400 releases the latter to fall or rotate downwardly by gravity. The foot 433 of the latch lever 432 engages the edge 435 of the quadrant to prevent the latter from moving past the latch lever in the event that the latter has not been returned to its vertical position, as will be hereinafter described. Release of the latch lever by the quadrant 416 permits the clutch actuating lever 291 to pivot at 293 under the influence of spring 425 and slide the clutch sleeve 272 along the shaft 246 thus engaging the clutch elements 284 and 285 to energize the feed rolls through the sprocket 277 and chain belt 283.

The feed rolls 217 and 218 advance wrapping material over the bed knife supporting member 268 until the long arm of the clutch actuating lever 291 is moved outwardly away from the side frame 6 to disengage the clutch elements 284 and 285. This disengagement of the clutch is accomplished by a lever arm 436 (Fig. 17) which moves in an arcuate path and carries on its extremity by means of a pin 437 a pair of coaxial rollers 438 and 439. As the lever 436 moves to the position shown in Fig. 17 the roller 438 engages a cam member 440 adjustably mounted on bracket 441 secured to the clutch actuating lever 291 adjacent the compression spring rod 419 and arranged so that the cam member 440 faces toward the side frame 6. On the frame opposite the cam member 440 is formed a cam roller guide or pad 442 (Fig. 17) which is engaged by the roller 429. The cam member 440 and the cam roller guide 442 are arranged so that upon movement of the clutch release arm 436 into the position illustrated in Fig. 17 the clutch actuating arm 291 is kicked outwardly away from the side frame 6 sufficiently to disengage the clutch elements 284 and 285 and move the tie rod 428 to the right as viewed in Fig. 22, so that the latch lever 432 is raised from the broken line position to the solid line position. This pivotal movement of the latch lever carries the foot 433 and heel 434 thereof beyond the latch releasing edge 435 of the quadrant 416, thus permitting the pivot bar 407 to rotate to its normal position as the member 400, previously released by the article, falls by gravity to a substantially vertical position. Upon movement of the clutch release arm 436 from between the cam member 440 and cam roller guide 442, the clutch actuating arm 291 is retained in its outer position by the tie rod 428 which is held to the right as viewed in Fig. 21 against the compression of spring 425 by the latch lever 432 which is held in its vertical solid line position by the quadrant 416 again positioned in front of the heel 434 of the latch lever.

The reciprocable arcuate movement of the clutch arm 436 is timed with respect to the remainder of the wrapping machine mechanism so that it disengages the feed roller clutch prior to the severing of the wrapping material web. This release arm is carried by a pivoted lever which is associated with the wrapping material severing mechanism and the movement will be described in connection therewith. Since the movement of the arm 436 is synchronized with the remainder of the wrapping machine mechanism it operates to stop the wrapping material feed at a definite point in the wrapping cycle and a flight advancing an article on the infeed conveyor past the member 400 is in a definite position with respect to the infeed station and said member. Referring to Figs. 25 and 26, the numeral 443 indicates the position of a flight 117 when the clutch release arm 436 engages the cam member 440 to disengage the clutch elements 284 and 285. The manner in which the loaf measuring mechanism is arranged to control the wrapping material feed to advance a length of wrapping material proportioned in accordance with both the height and width of the article will now be described.

The quadrant 416 is adjusted on the pivot bar 407 so that the latch lever 432 is released when the member 400 is engaged by an article advancing over the apron 115. Preferably, the member 400 is normally disposed in a position such as indicated by the broken lines of Figs. 25 and 26 and the latch lever 432 is released upon the member 400 being moved to a position such as indicated by the full lines of Figs. 25 and 26. A laterally extending arm 453 is secured on the pivot bar 407 and adjustably carries a counterweight 454 which is arranged to substantially balance the weight of the article-contacting member 400 and its related parts. Accordingly, the article-contacting member does not exert an objectionable retarding force on articles engaged thereby. Assuming a loaf "B", indicated by the solid line in Fig. 25, is being advanced over the infeed conveyor apron 115 by the infeed conveyor flight 117 toward the infeed station of the wrapping machine and in the direction indicated by the arrow, the article "B" first engages the member 400 in substantially the position indicated by the broken lines. Upon further movement of the article the member is rotated to the solid line position, at which instant the latch releasing edge 435 of the quadrant 416 moves beyond the heel 434 of the latch lever 432, releasing the latch and enabling the compression spring 425 to move the clutch actuating lever 291 so that the clutch elements 284 and 285 are substantially instantaneously engaged to commence the feed of wrapping material between the rolls 217 and 218. Since the clutch elements are toothed the driving action is positive and the feed rolls are started at substantially full speed.

Longitudinal movement of the handwheel 270 on the shaft 246 adjusts the relative positions of the clutch elements. This is accomplished by relative rotation of the hub cap 273 and insures the making and releasing of the driving connection upon movement of the lever 291. The clutch elements remain in engagement to advance the free edge of the wrapping material as the flight 117 moves the article B over the infeed conveyor apron 115 to the broken line position B' at which instant the wrapping material feed stops because the clutch release arm 436 engages the cam member 440, swinging the clutch release lever 291 on its pivot 293 and disengaging the feed roll driving clutch. Meanwhile the member 400, released by the article, swings by gravity to its vertical position, and, upon movement of the clutch release arm 436 away from the cam member 440, the feed roll clutch is held disengaged.

As previously mentioned, the movement of the clutch release arm 436 is timed with relation to the infeed conveyor flights 117 so that it operates to disengage the feed roll clutch each time a flight reaches the position indicated at 443. Accordingly, the leading edge of the wrapping material web W has been advanced by the feed rollers 217 and 218 during the interval of movement represented by "C," since the flight 117 was in the position 444 at the instant the latch lever 432 was released and in position 443 at the instant the clutch release arm 436 disengaged the clutch. If an article "D," represented by the broken lines in Fig. 25, is being advanced to the infeed station of the wrapping machine by a flight 117, the latch lever 432 is released by the quadrant 416 to permit engagement of the clutch in the start of wrapping material feed when the flight is in the position indicated at 445. The article "D" is of substantially greater width than the article "B," and accordingly, the member 400 is moved to latch-releasing position before the flight advancing the article has moved as close to the wrapping material feed-arresting position 443 as in the case of a narrow article. Thus the sheet of wrapping material advanced by the feed rollers to wrap the article "D" is continuously fed while the flight 117 moves the distance "E". By comparing the distances "C" and "E", it is seen that the comparative wrapping material feeding times for the articles "B" and "D" are in proportion in relation to their respective sizes so that the sheet of wrapping material intended for the article "D" is fed for a longer period of time than the sheet of wrapping material for the article "B". Since the rate of wrapping material feed is substantially uniform and in timed relation with the remainder of the wrapping machine mechanism, including the infeed conveyor, the length of wrapping material fed is likewise proportioned in accordance with the size of article being advanced to the wrapping mechanism.

Similarly, the length of wrapping material advanced by the feed rollers is proportioned in accordance with the height of the article, as diagrammatically illustrated in Fig. 26. For the tall article "F", shown in solid lines, the flight 117 advancing the article is at the position 446 at the instant the member 400 releases the latch lever 432 and the feed roll clutch remains in engagement to advance the wrapping material while the flight moves the distance "G" from the position 446 to the position 443. The short article "H" is advanced by the flight 117 only the distance "K" from the point 447 at which the member 400 is moved to its latch-releasing position to the point 443, which is the clutch disengaging position. By comparison it is seen that the distance "K" is less than the distance "G" and the corresponding wrapping material advancing period is less for the small, short article "H" than for the tall article "F".

Thus the invention provides a mechanism for measuring the size of articles both as to height and width and is arranged to advance a sheet of wrapping material proportioned in length in accordance with these measurements. It is apparent that this measuring mechanism is responsive to changes in either the height or width alone or height and width together. The diagrammatic representation of Fig. 25 shows articles "B" and "D" which are of substantially the same height, and Fig. 26 diagrammatically illustrates the difference in the wrapping material feed periods for articles "F" and "H" of different height but of substantially the same width.

A dog 448 carried by the arm 420 is arranged to engage an inwardly extending lug 449 on the bracket 413 which is formed adjacent the journal 415 to prevent overswinging of its normal position by the member 400 after being released by an article.

The adjustment between the relative position of the article engaging member 400 and the latch-releasing edge 435 of the quadrant 416 afforded by the adjusting bolt 421 and knurled thumb nut 423 provides a convenient means for adjusting the amount of the overlap of the ends of the wrapping material underneath the article. Drawing the extension 422 of the quadrant 416 toward the arm 420 causes the quadrant to release the latch lever 432 sooner after the member 400 is engaged by an article so that the feed of wrapping material is commenced earlier. Conversely, adjustment of the thumb wheel 423 to cause divergent movement between the arm 420 and extension 422 of the quadrant causes the quadrant to withhold the latch lever 432 from clutch-engaging movement until the member 400 has been rotated to a greater angular position with respect to the vertical, thus delaying the start of wrapping material feed. Hence a sheet of wrapping material fed in response to the article measuring controls with the delayed release of the latch lever 432 is relatively shorter in length than the wrapping material advanced for an article in response to the controls which are adjusted for a relatively earlier release of the latch lever 432. A relatively short length of wrapping material will have less overlap of its ends than a relatively long sheet. Furthermore, this adjustment of the overlap can be accomplished while the wrapping machine is in continuous operation, without interrupting the succession of articles being packaged. An operator merely gives a slight twist to the thumb nut 423 in the desired direction and visually observes the resultant change in overlap.

Another method of regulating the amount of overlap of the ends of the wrapping material underneath the article is by means of the threaded rod 408 which moves the article-engaging member 400 of the measuring device longitudinally with respect to the infeed conveyor. Movement of the adjustable bracket 404 to the left as viewed in Figs. 25 and 26 advances the article-engaging plate 400 in the direction of article movement, thus delaying the start of wrapping material feed to effect a reduction in the length of the sheet of wrapping material fed and decreasing the overlap. Movement of the adjustable bracket 404 to the right as viewed in the same figures carries the plate 400 so as to be engaged earlier by the articles advancing to the wrapping mechanism to effect a feed of a proportionately longer sheet of wrapping material and to increase the overlap.

Since the movement of the clutch actuating lever 291 caused by the engagement of the cam member 440 by the release arm 436 serves only to disengage the clutch elements 284 and 285, the feed rolls are likely to continue to advance a short and variable amount of wrapping material on account of overrunning caused by their inertia. It is desirable that this overrunning be minimized so that the feed of wrapping material is positively arrested at the instant the clutch release arm 436 engages the cam member 440. In the present machine this is accomplished by a brake which engages a flattened peripheral portion 450 on the hand wheel 270. This brake comprises an adjustable supporting bracket 451 (Fig. 16) having a foot 452 slidingly received in a longitudinal channel formed in the clutch release lever 291 adjacent the pivot 293. A brake shoe 455 provided with a suitable lining 456 of asbestos or other suitable friction material is carried by a cylindrical plunger 457 received within a cylindrical aperture formed in the bracket 451 and having an axis in the rotational plane of the hand wheel 270. The cylindrical aperture in the bracket 451 is of sufficient depth to accommodate a compression spring 458 carried by a rod 459 formed as an extension of the plunger 457 and coaxial therewith. This rod extends through an aperture in the bracket and has an external end threaded to receive a holding nut 460. The plunger 457 and rod 459 are thus movably secured by the bracket 451 and resiliently urged toward the flat friction face 450 of the hand wheel 270 by the spring 458. An extension 461 of the bracket has a flat face which engages a side of the shoe 455 to prevent rotational movement of the plunger and shoe with respect to the bracket. By adjustment of the nut 460 on the threaded end of the rod 459 the brake shoe 455 can be moved toward and away from the friction surface 450 of the hand wheel. This adjustment is regulated so that just prior to engagement of the teeth of the clutch elements 284 and 285 effected by the pivotal movement of the clutch actuating lever 291, the brake releases the hand wheel 270. Reverse pivotal movement of the lever 291 brings the brake into engagement with the hand wheel immediately after disengagement of the clutch elements 284 and 285. Thus there is a substantially positive control of the feed rollers so that the wrapping material is accurately advanced during an interval which is determined in accordance with the size of the article for which the particular sheet being advanced is intended.

Article carrier

At the infeed station adjacent the end of the infeed conveyor the articles are successively moved onto a reciprocable carrier or elevator indicated generally by the numeral 500. This elevator comprises a platform 501 (Figs 6 and 11) carried by a cross member 502 which extends transversely of the wrapping machine and at each end is secured to vertically sliding sleeve members or brackets 504 carried on square or rectangular guides 505. Tops of guides 505 are positioned in apertured bosses on the frames 5 and 6, and the bottoms thereof are supported in sockets of brackets 506 bolted to the side frames. These guides are arranged in parallel relation with one another so that the slides 504 are free to move up and down thereon in guiding the carrier 500 between the infeed and outfeed stations of the wrapping machine. Carried in the slide grooves of the members 504 are replaceable anti-friction elements of bushings 507 (Fig. 14) which have sliding engagement with substantially flat bearing faces of the guides 505. In this manner, the thrust exerted on the carrier by crank levers 508, to be later described, which occurs as the carrier moves to the outfeed station, is resisted by the elements 507. These bushing elements are retained in the slides 504 by studs or bolts 513 (Fig. 14) and may be replaced when wear occurs. Accordingly, the carrier 500 can be maintained free from lateral play or wobbling so that it is in correct relative position with respect to the infeed and outfeed stations.

Vertical reciprocatory movement is imparted to the carrier by the oscillating movement of crank levers 508 (Fig. 5) secured inside the side frames on the oscillating drive shaft 16, previously mentioned. The crank levers 508 are each connected to one of the slide members 504 by curved links 509.

Oscillating movement is imparted to the shaft 16 in a manner to be hereinafter described and the levers 508 are secured thereon so that at the limit of the counterclockwise oscillation, as viewed in Fig. 5, the elevator 500 is in its lowermost position and the platform 501 thereof is substantially even with or slightly below the infeed station end of the conveyor apron 115. In this position of the carrier the levers 508 extend downwardly from the shaft 16 in a substantially vertical position. Since the shaft 16 is positioned substantially directly beneath the guides 505 the links 509 are curved to avoid engagement with the shaft. From the position of the mechanism illustrated in Fig. 5, clockwise rotation of the shaft 16 carries the levers 508 to a substantially vertical position extending upwardly from the shaft as illustrated in Fig. 5, by the broken lines. This moves the carrier 500 to its uppermost position at the outfeed station of the wrapping machine and the platform 501 of the carrier is substantially level with the bottom plate of the folding and heat sealing channel to be later described.

A plurality of ribs 510 facilitate the movement of an article onto and off the carrier. These ribs may be suitably formed of wires or rods which are arranged in parallel relation to one another and extend in the direction of movement of the articles. The ends of the ribs are bent downwardly and secured in apertures in the platform 501 to retain the ribs in position.

Along the edge of the platform 501 over which articles are moved onto and off the carrier is positioned a roller 511, the top of which is substantially level with the top surface of the platform 501. The ends of this roller threadedly receive axially alined pins 512 which are carried in journals 514 secured to the ends of the platform 501.

At a central portion of the platform 501 at the edge thereof opposite the roller 511 is secured a bracket 515 (Fig. 11) having elongated tubular sleeves 516 arranged in parallel relation. The sleeves 516 carry rods 517 longitudinally slidable in the direction of movement of articles onto and off the carrier and the rods are secured together for simultaneous movement by a tie 518. The ends of the rods opposite the tie carry article engaging member 519. Upon movement of an article onto the carrier this member engages the side thereof and moves with the article, the rods 517 meanwhile sliding in the sleeves 516 to a position which may be represented by the broken lines in Fig. 11, depending upon the width of the particular article.

A brake member 524 (Fig. 29) is arranged to frictionally bear against the under side of the rods 517 to resist the sliding movement of the rods in the sleeves 516. The brake member 524 may be in the form of a strip of spring metal which extends into cut-away portions 526 (Fig. 30) of the sleeves 516 where it is in contact with the rods 517. The pressure of the brake member 524 on the rods 517 may be regulated by adjusting means 530 so that the frictional drag may be varied as desired. In this manner the article engaging member 519 may be made to bear against the leading side of an article to press the wrapping material thereagainst with suitable force during the movement of the article onto the carrier.

Intermediate each end of the platform 501 and the bracket 515 is a movable support 520 (Figs. 5 and 11). These supports each have a portion which slides along the surface of the platform and a portion 521 (Fig. 31) which overhangs the rear edge of the platform. Portions 521 each have secured thereto a gib 522 which underlies the edge of the platform 501 and is formed around a key guide 523 secured along the under side thereof. Engagement between the guide and gib retains the support 520 on the platform 501 while permitting transverse movement thereof along the rear edge. Each of the supports 520 has secured thereto a first end folding member 525 to be later described and which extends over the platform 501 toward the edge thereof over which articles are received.

*First end folding members*

The end folders 525 are supplied in a multiplicity of pairs which are interchangeable with one another. The several pairs have different heights, so that the wrapping machine may be used to package articles of different heights, the tall end folders (Fig. 34) being used with tall articles and the low end folders (Fig. 31) being used with low articles. Intermediate sized end folders (Fig. 33) are supplied in as many heights as desired for particular applications. Each of the end folders may be suitably formed of substantially flat metal plates to provide a relatively smooth article-contacting surface 533 (Fig. 32) to have sliding engagement with the end of an article.

The folders are positioned so that the surfaces 533 are substantially vertical, or normal to the plane of the carrier platform, and the bottom edges of the folders are parallel with and in spaced relation to the platform 501. Along the bottom edge of each of the end folders is formed or secured a laterally extending flange 534 which is positioned in spaced relation above the carrier platform and slopes downwardly away from the bottom edge of the article-engaging surface of the end folder.

Initial article-engaging edges 535 of the end folders are rounded toward the bottom, and the leading ends of the flanges 534 are upturned, as indicated at 536.

An elongated open end slot 537, formed in one end of each of the end folders, is received over the shank of a wing bolt 538, threadedly secured in one of the supports 520, so that the end folders are removably secured to the supports and may be simultaneously adjusted toward and away from one another by means of the adjusting screw 527. Preferably, the end folders have top and bottom edges adjacent the slots 537 which engage shoulders 539 formed on the supports 520 to hold the end folders rigidly in place in cooperation with the wing bolts 538.

Wrapping material projecting beyond the ends from the leading or front side of an article is folded against the ends as the article is moved onto the carrier by the end folders 525. The flanges 534 roll the bottom portion of the wrapping material over the portion thereof which projects from underneath the article to hold the latter against the carrier platform 501 and effect a neat fold of the bottom end flap.

An adjusting shaft 527 has opposite ends threadedly engaged in apertures through the overhanging portions 521 of the movable supports 520. Rotation of a knurled hand wheel 528 secured on one end of the shaft 527 simultaneously moves the brackets toward and away from one another to adjust the distance between the first end folding members 525. The shaft 527 is retained against endwise movement by a bracket 529 secured to the platform 501 at one end thereof and having a yoke which engages a circumferential groove in the hub 530 of the hand wheel 528.

At the outfeed station of the wrapping machine the roller 511 and a roller 550 (Fig. 37) engage between them a portion of wrapping material depending from the side of an article on the carrier, as will later appear. The roller 550 has pins 551 threadedly secured in its extremities and journalled in elongated slots in the ends of bracket members 553. These brackets extend from the cross member 11 supported between the side frames of the machine and are adjustably secured thereto by screw bolts 554 which pass through elongated openings 555 in the brackets 553.

A pressure roller 557 positioned centrally of the path of articles moving past the roller 550 is journalled in a yoke 558 (Fig. 38) formed on the end of a member 559 slidably carried by a guide bracket 560 secured to the under side of the cross member 11. One end of a compression spring 562 (Fig. 37) engages an end 563 of the member 559 opposite the yoke 558. The opposite end of the compression spring is carried by a lever 564 pivoted at 565 on a bracket 566 carried by cross member 12. The free end of the lever 564 which extends over the side frame 5 to the operator's station is formed into a ball knob 567. By manually moving the lever 564 to various positions, the compressive force in the spring 562 may be regulated as desired and pin 568 secured in the lever arm 564 is arranged to be selectively introduced into any one of a plurality of holes 569 formed in the side frame 5 to retain the lever 564 in adjusted position.

The spring 562 urges the yoke carried roller 557 against the central portion of the wrapping material engaging roller 550 so that this roller is resiliently forced against its mating roller 511 journalled on the carrier. The pressure roller 557 is of relatively short length with respect to the wrapping material engaging roller 550 to urge the central portion of the latter against the roller 511 with a greater force than end portions. In this manner (the roller 550 being slightly yieldable along its longitudinal axis) the roller 511 of the carrier and roller 550 at the outfeed station are arranged to resiliently engage wrapping material positioned between the two with the greatest frictional engagement occurring at the central portions of the rollers. Accordingly, the rotation of the rollers in their journals is governed primarily by the movement of wrapping material passing between them at their central portions. Moving the lever 564 to the right as viewed in Fig. 37 increases the frictional engagement of wrapping material, while movement of the lever to the left decreases the frictional engagement.

*Wrapping material cutting mechanism*

A reciprocable cutter carriage, indicated generally by the numeral 600, moves in a vertical path and comprises a bar or shaft 601 (Figs. 11 to 13) extending transversely of the machine and having ends secured in supporting members 602. One suitable means to secure the bar 601 is by means of a set screw 603 (Fig. 12) which is received in a threaded aperture in the supporting member 602 and engages the bar 601. These supporting members have elongated sleeves 604 slidably carried by vertically arranged guides 605 which have their upper ends secured in apertures in inwardly extending boss portions 606 (Fig. 6) of each of the side frames and lower extremities secured in sockets 607 (Figs. 6 and 11) formed as inward extensions on each of the brackets 254. The guides 605 are parallel with one another and with the guides 505 for the article carrier 500. As shown in Fig. 11 the guides 605 are slightly closer together than the guides 505 to permit the cutter carriage 600 to move through the lower portion of its path without interfering with other parts of the machine.

Knife carrier 608 on the right and knife carrier 609 on the left, as viewed in Fig. 6, are each suspended from the bar 601 by extensions 612 of collars 610 and 611 freely rotatable on the bar. The collars 610 which are at the center of the bar 601 preferably have their extensions 612 secured to the extremities of the knife carriers 608 and 609 which abut one another at this point. The collars 611 which are positioned adjacent the supporting members 602 have their extensions 612 secured to intermediate portions of the car-carriers 608 and 609 so that end portions 614 of the carriers overlap the supporting members 602 and extend substantially to the sleeves 604. Depending flanges 615 (Fig. 12) formed along the under side of the supporting members 602 are thus positioned behind the portions 614 of the knife carriers. A bolt 616 is threadedly secured in the portion 614 of each of the knife carriers and extends through an enlarged aperture in the depending flange 615. This bolt is freely movable through the flange and a compression spring 617 carried on the bolt and retained between the flange 615 and an adjusting nut 618 draws the knife carrier toward the flange 615 in a clockwise rotational movement about the bar 601 as viewed in Fig. 12. This movement is limited by an adjusting bolt 619 (Fig. 13) extending through the flange 615 and having threaded engagement therewith. This bolt seats against the knife carrier and is provided with a lock nut 620 which secures the bolt in adjusted position.

Movable knife blades 622 and 623 secured to the knife carriers 608 and 609 respectively, abut at the line 625 and the cutting edge 626 of each blade slopes downwardly from the line or edges 625. Each blade, adjacent the supporting members 602, is formed into a depending lip 627 which is curved so as to be offset with respect to the plane of the knife blade.

Stationary cutting blade 630 (Fig. 12) supported in a horizontal manner on a depressed marginal portion of the bed knife supporting member 268, previously described in connection with the wrapping material feed mechanism, is secured thereto by a plurality of bolts having wedge shaped heads 631. These bolt heads have the highest portion flush with the wrapping material supporting surface 269 of the member 268 and sloped downwardly toward the cutting edge 632 of the bed knife 630. This edge of the knife is beveled in the usual manner and overhangs the supporting member 268. The guides 605 are arranged so that sliding movement of the sleeves 603 of the supporting members 602 carries the movable cutting blades 622 and 623 vertically downward past the bed knife 630 in a wrapping material severing movement.

As previously mentioned, the cutting edge 626 of each of the movable cutters slopes downwardly away from the central end 625 of each cutter so that the portion of each cutting edge adjacent the lip 627 first passes the cutting edge 632 of the bed knife and upon further downward movement of the movable cutter the cutting edges 626 progressively move past the cutting edge 632 toward the central portion thereof in a scissorlike shearing action. The bolt 619 is adjusted so that the cutting edge 632 of the bed knife first engages the curved depending lip 627 and the movement of the reciprocating cutter blades 622 and 623 past the stationary cutter tends to rotate the collars 610 and 611 in a slight counterclockwise movement about the bar 601 as viewed in Fig. 12, thus urging the cutting edges 626 and 632 of the respective knives against each other by the compression of springs 617.

A wrapping material straightening bar and bottom lap adjuster 635 (Fig. 12) is positioned adjacent and longitudinally of the cutting edges 626 of the movable knife blades 622 and 623. This bar extends substantially from end to end of the cutter carriage 600 and has end pins 633 and 634 (Figs. 6 and 13) carried in aligned holes 636 formed in the extremities of crook shaped levers 637. The levers 637 are pivoted by bolts 638 to laterally extending ears 639 formed on the supporting members 602. Crook portions 640 of the levers 637 extend above the pivot bolts 638 and over the tops of the supporting members 602, terminating in horizontally arranged fingers 641 (Fig. 13) which threadedly receive vertical adjusting bolts 642. Above the supporting members 602 each of the crooks 640 has a laterally extending boss 643 provided with a downwardly directed socket to receive one end of a compression spring 644. The other end of this spring is received in a depression formed in the upper side of the supporting member 602 and the spring urges the lever 637 in a clockwise pivoting motion around the bolt 638 as viewed in Fig. 12 which serves to normally press the lap adjuster or compensator 635 against the knife blades 622 and 623.

The amount of wrapping material withdrawn from the carrier bars by the lap adjusting and compensator bar 635 may be varied by changing the position of the bar with respect to the pivot 638. Each of the levers 637 has a plurality of holes 636 formed in its depending portion to receive the pins 633 and 634 of the lap adjusting bar 635. Thus, journalling the bar 635 in such of the holes 636 as are relatively close to the pivot 638 decreases the amount of wrapping material withdrawn from the carrier bars, while journalling the bar 635 in such of the holes 636 as are toward the free ends of the levers 637 increases the amount of wrapping material withdrawn (and accordingly advances the edge of the wrapping material towards the rear side of the article in the completed package).

The changing of the lap adjusting bar 635 from one pair of the holes 636 to another is facilitated by a telescopic mounting of the pin 634 in a bore 645 (Fig. 13) formed in one end of the bar 635. A compression spring 646 is received in the bore 645 to urge the pin 634 outwardly and retain the pins 633 and 634 in the holes 636 of the arms 637. A collar 647 formed on the pin 634 bears against one of the arms 637 while at the opposite end of the compensator or lap adjusting bar 635 a shoulder formed on the latter abuts against the other of the levers 637. A pin 648 extends through the bar 635 and the bore 645. This pin rides in a cut-away portion 649 of the pin 634 and limits the longitudinal movement of the pin in the bore.

By moving the bar 635 a short distance to the right as viewed in Fig. 13, the spring 646 is slightly compressed and the pin 633 is released from the journal 636 in one of the levers 637, so that the bar 635 may be removed. The bar is replaced in another set of journal holes by first inserting the pin 634 then moving the bar 635 so as to compress the spring 646 and provide enough clearance for the pin 633 to be swung into position in alignment with the desired journal hole therefor.

The cutter carriage 600 is actuated in synchronism with the carrier 500. Outwardly extending bosses 650 (Fig. 6) formed on the sleeves 603 receive pivot bolts 651, having horizontal axes parallel with the bar 601, which are carried in actuating levers 652 (Fig. 3) and 653 (Fig. 4). One end of each of the levers 652 and 653 is carried by a short link 654 pivoted at 655 on a support extending upwardly from an intermediate member of one of the side frames. The opposite ends of the levers are carried by long links 656 pivoted at 657 to intermediate portions of the curved links 509 previously described in connection with the carrier. Accordingly, reciprocable movement of the curved links 509, which moves the carrier back and forth between infeed and outfeed stations of the wrapping machine, simultaneously moves the cutter carriage 600 up and down on the guides 605. The arrangement of the actuating levers 652 and 653 is such that the amplitude of movement of the cutter carriage is less than that of the article carrier 500.

The actuating lever 653, which is on the drive side of the machine, has formed thereon the clutch release arm 436 previously mentioned in connection with the article measuring mechanism. Thus at each downward movement of the reciprocable curved link 509 which carries the cutter carriage downward, the actuating lever 653 is pivoted in a clockwise movement about the pivot 655 from the uppermost position shown in Fig. 4 to the lower position shown in Fig. 17. Thus the clutch actuating lever 291 is kicked outward by the cam member 440 and roller 438 to disengage the feed roll clutch just prior to the severing of the wrapping material by the cutter blades 622, 623 and 630.

The movement of the article carrier 500 with respect to that of the cutter carriage 600 is arranged so that just prior to the engagement of the marginal portions of the cutting blades at the commencement of a wrapping material severing operation, the article platform 501 engages the end of the adjusting bolt 642 to pivot the lever 637 in a counterclockwise direction as viewed in Fig. 12 so that the compensator or lap adjusting bar 635 moves to the solid line position indicated in Figs. 12 and 13. This movement of the bar 635 prior to and during the severing operation of the wrapping material serves to locate that portion of the wrapping material which is adjacent the cutting edges of the knives in a substantially horizontal position so that a clean cutting shearing action is obtained. Furthermore, this movement of the compensator bar tends to maintain a slight tension in the wrapping material during the severing so that the cutting is facilitated and the probability of wrapping material sliding between the cutting blades without being severed is minimized.

An additional feature of the compensator bar is its capacity to withdraw a short length of wrapping material from between the carrier bar 501 and gripper or clamping bar 318. This is in effect a reverse movement of the wrapping material previously carried upwardly in the path of the article to be wrapped thereby and occurs before the web is severed. Accordingly, by regulation of the amount of wrapping material thus withdrawn from the carrier bars the relative position of a sheet of wrapping material with respect to the article may be regulated. This longitudinal adjustment of the wrapping material serves to position the last fed or trailing edge of the sheet with respect to the bottom of the article. In this manner the relative position of the overlapped portions of wrapping material underneath the article is adjusted with respect to the bottom of the article.

It is usually desirable to have this bottom overlap centered longitudinally of the bottom of the article. Hence in the event that the amount of overlap is altered by the article measuring and feeding mechanism, it may be desirable to also adjust the amount of wrapping material withdrawn from the carrier bars by the compensator 635 to center the bottom lap. This adjustment of the compensator bar may be accomplished by altering the position of the adjusting bolt 642. Movement of this bolt so that it is engaged at an earlier position of the carrier movement by the carrier platform 501 causes a greater pivotal movement of the crook lever 637 and a correspondingly greater movement of the compensator bar away from the cutters 622 and 623.

The greater the movement of the compensator bar away from the cutting edge 626 of the knives the greater is the amount of wrapping material withdrawn from the carrier bars, so that the last portion of wrapping material advanced by the feed rolls and which is folded upwardly against the bottom of the article upon movement of the latter onto the carrier has its edge advanced toward the rear side of the article. Conversely, adjustment so that the movement of the compensator bar 635 is diminished, moves the edge of the wrapping material first folded under the article away from the rear side of the article and advances the center line of the overlap toward the front side of the article.

*Wrapping material smoothing plate and safety stop*

As an article is advanced onto the carrier 500 at the infeed station, it engages the wrapping material and the latter is draped about the article. During this movement the wrapping material is smoothed and guided over the top of the article by a member or plate 700 which is pivoted on a bar 701 (Fig. 40) by means of brackets 702 secured to the top or rear side of the plate. The bar 701 is carried in brackets 703 secured to the under side or bottom flange of a horizontal holding or channel member 704 which extends transversely across the machine between the side frames 5 and 6 and has its ends secured to bearing elements 705 (Fig. 43) guided for vertical movement in rabbets 740 formed in the brackets 338. The holding member 704 is suspended from the bottom flange by a vertically adjustable supporting member or channel 706 by adjustable bolts 707 having lock nuts 708 so that space 709 between the member separating the holding member from the supporting member may be increased or decreased as desired.

The supporting member 706 has its ends secured to rack members 710 which are guided for vertical movement in the rabbets 740 similarly to the manner in which holding members 704 are guided. The rack members 710 are also slidingly received in and guided by rabbets 711 (Fig. 43) formed in the bearing elements 705. Pinions 712 secured on shaft 713 journalled in the brackets 338 mesh with teeth of the rack members 710 so that by rotation of the shaft 713 the supporting member 706 carrying the holding member 704 may be raised or lowered with respect to the infeed station of the wrapping machine. One end of the shaft 713 extends beyond the side frame 5 and has secured thereon a hand lever 714 (Fig. 3) by means of which the operator can rotate the shaft to adjust the height of the smoothing plate 700 as desired. Preferably the hand lever 714 has locking means in the form of a pin engageable in one of a series of holes in the frame 5 by means of which it may be held in adjusted position.

When the carrier 500 is at the infeed station the smoothing plate 700 normally hangs suspended from the bar 701 in substantially the position indicated in Fig. 62 and by the broken lines of Fig. 40. As the article is advanced onto the carrier it normally engages the smooth under side of the plate which has a stroking action on the top of the article to smooth the wrapping material thereagainst. Preferably marginal edge portion 715 of the member 700 is curved upwardly to insure a smooth unhampered movement of the article onto the carrier.

After an article has been moved onto the carrier 500 by one of the flights 117 and the carrier starts its upward movement toward the outfeed station, the smoothing plate 700 (which has remained continuously in contact with the wrapping material draped over the article substantially from the time that the wrapping material was first engaged by the article) is normally pivoted in a clockwise direction, as viewed in Figs. 62 through 66, by the upward movement of the article until it engages the holding member 704 or the supporting member 706 or both. In this position the article contacting surface of the member 700 is tilted toward the path of the article in the direction of relative article movement so that during the movement of the article past the smoothing member the article is advanced further or completely onto the carrier 500 against the resistance of the brake 524.

An electric switch 716 (Figs. 39 and 41) is mounted in the channel of the supporting member 706 and has associated therewith a spring element or strip 717 which extends over an aperture 718 in the bottom flange of the supporting member. A bolt 719 is adjustably secured in the top flange of the holding member 704 beneath the aperture 718 and is arranged to displace the spring element 717 upon upward movement of the holding member 704 relative to the supporting member 706 from the broken line position to the full line position of Fig. 41. The displacement of the spring element 717 is arranged to close the switch 716 to complete an electrical circuit through the wires 720 which operates to stop the wrapping machine, as will be later described.

An article which is misplaced on the carrier 500, so as to project beneath the pivot bar 701 as shown by the full lines of Fig. 40, raises the holding member 704 relative to the supporting member 706 when the carrier starts toward the outfeed station causing the bolt 719 to close the switch 716 and stop the wrapping mechanism. Thus an article which would otherwise be crushed or demolished by the mechanism is saved, and injury to the machine is avoided. This safety feature is of particular advantage in wrapping articles such as sliced loaves of bread which are apt to become misplaced on the carrier because of their irregularities as to size, texture, and shape.

At each side of the smoothing plate 700 is a bearing member 721 (Fig. 40) which, in the event there is no article on the carrier 500, engages a cam-faced dog 722 mounted on the sleeves 604 of the cutter carriage supporting members. During the upward movement of the carrier 500 and the cutter carriage 600 these dogs pivot the smoothing plate 700 upward in a manner similar to an article. Also, the bearing members 721 and the dogs 722 hold the plate member 700 in a substantially vertical position so that the smoothing member does not drop beneath the carrier while the latter is at the outfeed station.

*Top end folders*

Movement of the carrier 500 to the outfeed station carries the article positioned thereon between a pair of top end folders 723 (Figs. 3 and 4). These folders, one of which is shown in Figs. 44, 45 and 49, are removably secured to pivotally mounted horizontal beam members 724 by wing studs 725. The folders 723 may be formed of sheet metal and have substantially flat article-engaging portions 726 (Fig. 49) disposed in parallel relation with respect to the relative direction of article movement and arranged to have sliding engagement with the end of an article. The wing studs 725 extend through elongated slots 727 formed in horizontally disposed flange portions 728 of the folders, extending laterally from the top edge of the flat article-engaging portions 726. The slots 727 permit the adjustment of the folders 723 to various angular positions and to different relative positions with respect to the side heater and folding plates 802 of the sealing channel, to be later described. Along the bottom edge of the flat article-engaging portion 726 of each of the folders 723 is formed a laterally extending fold starting flange or element 729 which is substantially normal to the portion 726 but which slopes downwardly and away slightly from the surface of the article-engaging portion of the folder to commence or break the top end fold prior to the engagement of the projecting portion of wrapping material by the vertical folding portion 726. One edge of the fold starting element 729 is cut away as shown in Fig. 45 to provide a recess 730 (Fig. 45) between outer extremity 731 of the fold starting element and the corresponding vertical edge 732 of the article-engaging portion 726 of the folder. A wrapping material folding finger or guide 733 is secured to the fold starting flange 729 and extends into the recess 730. This finger is relatively long and slender and has its free end directed toward the edge 732 of the flat article engaging portion 726 of the end folder. During the formation of the top end fold on an article moving to the outfeed station, the finger 733 engages a portion of wrapping material which connects the wrapping material forming the top end flap with the portion which projects beyond the rear side of the article and strokes over this connecting portion of wrapping material to effect a folding thereof against the end of the article.

Preferably the bottom corner of the edge 732 of the folder 723 is rounded and curved outwardly as indicated at 734 (Figs. 44 and 49). The top end folders 723 are positioned so that in the movement of an article to the outfeed station the vertical edges 732 are positioned against the end and between the sides of the article. Accordingly, the portions of wrapping material which extend past the ends of an article from the rear side thereof are not engaged by the top end folders and when the carrier comes to rest at the outfeed station these extending portions of wrapping material are in position to be folded against the ends of the article as the latter is advanced into the folding and sealing channel. In this position the top end folding member is against the end of the article to hold the first end fold and top end fold in place, and the wrapping material extending from underneath the article is held against the platform 501 of the carrier by the top end fold starter 717.

Article advancing ram

Upon reaching the outfeed station an article is moved from the carrier 500 into a folding and heat sealing channel by a horizontally reciprocated ram which includes an article engaging pusher 735 mounted on a support 736 secured on the end of sliding bar 737. This bar is carried in elongated sleeves 738 formed on the cross member 7 and arranged so that the rod 737 is positioned longitudinally of the wrapping machine and midway between the side frames 5 and 6. The bar is given a sliding movement by a link 739 pivoted to the support 736. The opposite end of the link is carried by arm 742 which reciprocates in an arcuate path and is secured on a central portion of the reciprocated shaft 347 which extends transversely across the end of the machine and is journalled in upwardly extending portions 745 of the slide frames 5 and 6.

The shaft 347 extends a short distance beyond each of the side frames and the end extending beyond the frame 6 has secured thereon the actuating lever 346, previously described in connection with the rubber covered roller 335. The end of the shaft 347 extending beyond the side frame 5 has secured thereon drive lever 746 (Fig. 3). This lever is connected by an adjustable link 747 to the end of a crank lever 748 secured outside of the frame 5 on the main drive shaft 18 which rotates continuously during the operation of the machine. The drive lever 746 secured on the reciprocated shaft 347 is of greater length than the rotating crank lever 748, so that the amplitude of the movement imparted to the link 747 by the lever 748 is insufficient to move the lever 746 and the shaft 347 through 180°.

The arcuate reciprocatory movements of the arm 742 move the ram back and forth over the outfeed station of the wrapping machine and into and out of the folding and sealing channel. Fig. 4 shows the mechanism with the pusher 735 in retracted position in readiness for an article advancing movement, and Fig. 5 shows the mechanism with the pusher 735 at its extreme article-advancing position.

In moving an article from the carrier 500 into the folding and sealing channel, the pusher 735 passes between the first end folding members 525. Accordingly, in accommodating the packaging combination to articles of various lengths, pushers of different lengths are preferably employed, since it is desirable that the pusher extend across substantially the entire distance between the first end folding members to apply a uniform and firm pressure across the entire length of the front side of the article. Referring to Fig. 35, a central portion of the pusher 735 has formed thereon a dovetail holding element 749 which has sliding engagement in a vertically arranged T-slot 750 in the support 736. Accordingly, the pusher, 735 is readily slidable into and out of the T-slot 750 for replacement by a different pusher having a suitable length. In addition, this vertically sliding arrangement of the pusher 735 is advantageous in the event that the operator inadvertently neglects to change the pusher when adjusting the wrapping machine to articles of shorter length. In such case the first end folding members 525 engage the bottom edge of the pusher 735 and slide the pusher vertically out of the T-slot 750, thus avoiding injury to the machine.

Notches 751 (Fig. 6) extend upwardly from the bottom edge of the pusher 735 to receive the rods 517 and portions of the article-engaging face of the pusher adjacent the notches 751, are removed to provide recesses 752, which accommodate the article-engaging plate members 519. The recesses 752 are preferably of greater depth than the thickness of such plates, so that upon engagement of an article by the pusher 735 to advance the article into the folding and sealing channel the article is disengaged from the member 519, which moves downward upon the commencement of the return of the carrier to the infeed station.

Modified article pusher

A modified construction of article pusher is illustrated in Figs. 35 and 36. This pusher is employed in wrapping articles having rounded sides, such as loaves of rye bread, one of which is indicated at 754 (Fig. 36). Projections 755 are formed at each end of the pusher 735 at the bottom edge thereof and extend forwardly in the direction of article movement. These extensions have an article-engaging surface which slopes downwardly and forwardly from the normal article-engaging surface of the pusher, as shown in Fig. 36, for the purpose of engaging undercut portions of an article at the ends of the latter.

Member 756 is adjustably secured to the upper portion of the normal article-engaging surface of the pusher 735 and arranged to overhang a rounded side of the article, as shown in Fig. 36. This article-engaging member may be formed of a curved or obtuse angled plate which extends across substantially the entire article-engaging side of the pusher 735. Studs 757, secured to the plate 756, extend rearwardly through vertically elongated slots 758 formed in the pusher 735 and receive wing nuts 759 to secure the plate to the pusher 735.

The article-engaging member 756 and the projections 755, in cooperation with the normal, substantially vertical, article-engaging surface of the pusher 735, contact the irregular or curved side of an article for an extended area to prevent rolling or other objectionable movement of the article as the latter is advanced into the folding and sealing channel from the carrier 500.

Folding and sealing channel

At the outfeed station is positioned the entrance to the folding and heat sealing channel which includes bottom folding and sealing plates 800 and 801 and three pairs of spaced parallel side plates 802, 803, and 804 adjustably carried above the bottom plates. The bottom sealing plate 800 is arranged so that its article receiving edge is positioned transversely of the machine adjacent the level of the carrier 500 when the latter is at the outfeed station and immediately behind the roller 550. This plate is carried by cross members 11 and 12 which extend between the side frames of the machine and are secured to the tops of the brackets 338. A plurality of ridges 805 (Figs. 44 and 45) are formed on the plate 800 and extend transversely of the path of articles thereover.

The sealing plate 801 extends as a continuation of the folding and sealing plate 800 and is supported on cross members 806 carried by channel members 844 and 845 of the discharge conveyor, to be later described. The sealing plate 801 has a plurality of ridges 807 extending across the surface thereof substantially parallel to the direction of article movement over the plate and at an angle of about 90° to the ridges 805 on the plate 800.

A number of auxiliary sealing members or plates 808 are secured to the upper surface of the plate 801 and are separated from one another, as shown in Fig. 48, to provide a multiplicity of fixed isolated raised portions for compressing overlapped wrapping material portions into dished parts of an article moving through the sealing channel.

At the entrance to the folding and sealing channel the spaced parallel side plates 802 are suspended above the bottom plate 800 from the beam member 724. Each of these plates has a wrapping material folding edge 809 (Fig. 44) which is directed toward the vertical edge 732 of the corresponding top end folding member 723 and has the lower portion thereof curved in the direction of article movement away from the top end folder.

The spaced parallel side heating and sealing plates 803 are mounted above the bottom plates 800 and are located below the plates 802 being substantially flush with the latter to provide a substantially continuous heated article contacting surface having longitudinally extending ridges 810 formed by a multiplicity of spaced parallel grooves 811 which are substantially parallel with the direction of article movement through the folding and sealing channel.

A cover plate or heat guard 812 (Fig. 51) is secured on each of the beam members 724 on the opposite side thereof from the plates 802 and 803 and in spaced parallel relation thereto. The heating and sealing plates 803 are carried by the cover plates 812, being separated therefrom by insulating and spacing elements 815.

Laterally extending flanges 816 (Fig. 51) are integrally formed along the bottom edges of the plates 802 and the plates 803 have laterally extending flanges 817 formed along their upper edges in spaced, substantially parallel relation with respect to the flanges 816 to provide bottom flap heating and folding slots 818. The entering ends of the slots 818 are at the lowermost portions of the folding edges 809 of the plates 802, which is closely adjacent the article supporting surface of the bottom sealing plate 800. From entering end 820 the folding slot 818 in each end folding assembly unit curves upwardly between the plates 802 and 803 in the direction of article movement. At the entering ends 820 of the folding slots 818 the latter are substantially horizontal (see Fig. 6) to receive without substantial bending a bottom end flap projecting from underneath an article moving into the folding and sealing channel. The plane of each of the folding slots 818 progressively changes in the direction of article movement to a vertical position as shown in Fig. 51 so that the bottom end flaps of articles moving through the sealing channel are folded upwardly against the ends of the article. During this movement the overlapped portions of wrapping material in the bottom end flap are confined by the substantially parallel walls of the flanges 816 and 817 and heated thereby.

The cover plate 812 has a cut-away portion in the region of the entering end of the folding slot 818 to avoid interference with wrapping material flaps extending through the slot. Ends 821 of the side plates 803 are curved downwardly at the end 820 of the slots 818 and are received in one of the grooves between the ridges 805 on the bottom sealing plate 800. The initial article-engaging end or edge 809 of each of the folding plates 802 is outwardly curved at 822 (Fig. 45) to effect a gradual folding against the ends of an article of the wrapping material projecting beyond the ends from the rear side thereof.

The side sealing plates 804 are arranged in spaced parallel relation and positioned above the bottom sealing plate 801 and are secured to top, channel shaped supporting members 865 of the discharge conveyor, to be later described. These plates are arranged as continuations of the plates 802 and 803 to maintain, as desired, a heated surface in contact with overlapped wrapper portions at the ends of articles advancing through the folding and sealing channel onto the discharge conveyor. Preferably the side plates 804 are formed with longitudinally extending ridges 824. Cover plates or heat guards 825 are secured in spaced parallel relation to the heat sealing plates 804 and on the opposite sides of the discharge conveyor top members 865. These cover plates overlie extension portions 826 of the cover plates 812 so that when the latter are elevated in a pivotal movement about 827, as will be later described, there will be no gap or space between the adjoining cover plates.

The beam members 724 which carry the top end folding members 723 and the two sets of spaced parallel folding and sealing plates 802 and 803, together with the cover plates 812, are pivoted at 827 to a bracket 828 secured to the top supporting members 865 of the discharge conveyor. To limit downward pivotal movement of the beam members 724 members 829 are secured to the cover plates 812 underneath the beams 724. The members 829 are disposed between the side sealing plates 804 and the cover plates 825

(Fig. 51), extending past the pivots 827 and beneath the hinge-brackets 828 when the beam members 724 are in their lowermost positions. Adjustment of the beam members (carrying the top end folders and sealing plates cantilever fashion) to proper horizontal position is effected by means of studs 830 which are threaded downwardly through the brackets 828 and engage the top sides of the members 829.

Heating elements 832 and 833 are secured on the under side of the bottom sealing plates 800 and 801 respectively. These heating elements are wired to be heated electrically through master switch 837 (Fig. 3) and are also provided with individual switches (not shown) so that the plate 800 may be either heated without heating the plate 801 or the latter plate may be heated without heating the plate 800 or both plates may be simultaneously heated.

Electric heating elements 834, 835, and 836 are secured to the side sealing plates 802, 803, and 804, respectively and inside the cover plates 812 and 825. These heating elements are wired with separate switches (not shown) as well as the master control switch 837 so that any one or more pairs of the side heating plates may be individually heated independently of the heat applied to the other pairs of sealing plates.

An advantage of providing a multiplicity of independently heated article contacting plates in the sealing channel is that the heat applied to overlapped portions of wrapping material may be regulated in accordance with the requirements of the particular type of wrapping material employed. For example, in wrapping heavy wax paper it may be necessary to apply heat for a material length of time in order that the wax will be sufficiently melted so that a tight seal is produced upon the cooling thereof. For this reason all of the sealing plates are heated and the bottom flap of wrapping material projecting from underneath the article is permitted to dwell in the folding slot 818 where it is confined by the heated flanges 816 and 817 of the side heater plates. During this dwell the wax is sufficiently melted so that upon moving out of the slot and against the end of the article the flap is sealed in place. For relatively lighter weights of wax wrapping material the auxiliary side and bottom heater plates 801 and 804 may not be heated at all. For even still lighter weights of wax wrapping material the heat may be applied solely by one of the bottom plates 800 or 801 together with one pair of the side heater plates 802 or 803. The auxiliary heating plates 801 and 804 are of materially less length and area than the corresponding bottom and side sealing plates of which they are extensions. Accordingly, a multiplicity of heating combinations may be obtained to produce the desired sealing effects.

In employing the packaging combination for wrapping articles in regenerated cellulose or cellulose acetate wrapping material it is contemplated to heat only the bottom plate 801 and the side heater plates 804. Wrapping material of this character is relatively thin and if subjected to heat for an excessive period of time the resulting seal is not as tight as may be desired. Preferably the heat applied to regenerated cellulose and cellulose acetate is at a relatively high temperature but only for a relatively short period of time. Accordingly, by means of switch 838 (Fig. 3) which cuts off the current through the plates 800, 802, and 803, the latter are not heated and all of the heat is applied by the plates 801 and 804 which are heated to a higher temperature than is normally employed when heating wax wrappers. A thermostatic device 839 (Fig. 3) responsive to the bottom heater plate controls the master electric heating circuit in the usual manner.

Discharge conveyor

Articles advanced through the folding and sealing channel are received on a discharge or cooling conveyor which retains the overlapped wrapper portions in place until the seal is set, or, in the event that wax paper is used as a wrapping material, until the heated wax is cooled. This conveyor comprises an endless bottom belt 840 and a pair of spaced parallel endless side belts 841. The upper lap of the bottom belt is carried over the central portion of a longitudinally extending supporting apron 842 which may be suitably formed of wood. The central part of the top surface of the apron 842 is recessed to receive the upper lap of the belt 840 so that the top surface of the belt is substantially flush or level with the top surface of the marginal portions of the apron. Cross members 843 (Fig. 37) carry the apron 842 and have their ends secured to longitudinally extending frame members 844 and 845. The wrapping machine end of each of the framing members is secured to a bracket 846 (Fig. 37) pivoted on a supporting rod 847 adjustably mounted in brackets 848 secured to the side frames 5 and 6. Adjusting bolts 849 (Fig. 4) are threaded upwardly through the bottoms of the brackets 848 and engage the under side of the rod 847 so that the latter may be selectively raised or lowered in the brackets 848 to adjust the height of the discharge conveyor and align the bottom sealing plate 801 with the plate 800.

At the slicing machine end of the discharge conveyor the framing members 844 and 845 are carried on an upstanding portion of brackets 850 (Fig. 2) which are secured to the top portions of the slicing machine side frames 3.

At the ends of the apron 842 the endless bottom belt 840 is carried around rollers 851 and 852 set in cut-away portions of the apron. Roller 851 is secured on a shaft 853 journalled in portions of the brackets 846 received between the flanges of the side framing members 844 and 845. The roller 852 is rotatably carried on a shaft 854 (Fig. 1) journalled in bearing members secured between the flanges of the side framing members at the slicer end of the latter. These bearing members are illustrated in connection with the combination mechanically refrigerated discharge conveyor to be later described.

Brackets 855 (Fig. 5) ride on the shaft and the rod 847. These brackets are slidable on the shaft and rod and have upstanding spindles 858 threadedly secured therein above the shaft 853. Rollers 859 are rotatably mounted on the spindles 858 and carry one end of the endless side belts 841. At the opposite end of the discharge conveyor the side belts are carried by a similar set of spindles 860 and rollers 861 (Figs. 1 and 2). The spindles 860 at the slicer end are threadedly secured in brackets which are slidable on the shaft 854 similar to the brackets 855 previously mentioned. Each of the rollers 859 has secured to its lower end a bevel gear 862 which meshes with a similar bevel gear 863 splined on the shaft 853 so as to maintain a driving connection therewith. The bevel gears 863 are arranged to move with the brackets 855 while maintaining a driving connection with the shaft 853. In this manner the side belts 841 are driven in synchronous timed relation and at the same speed as the endless bottom belt 840.

Between the inner and outer laps of the side belts 841 are tanks 864 which have sliding engagement with both laps of the conveyor belts and are in direct heat exchanging relation therewith. These tanks are preferably constructed of relatively thin sheet metal and desirably extend substantially the entire length of the discharge conveyor. Into the tanks may be placed cracked ice or the like to chill the side belts 841 so that the latter have a more effective cooling action on the overlapped portions of wrapping material at the ends of articles moving through the discharge conveyor. Longitudinally extending supporting members 865 and 866 are carried on the tops of the spindles 858 and 860 respectively, and carry between them the tanks 864. The supporting members 865 extend over the bottom sealing plates 801 and carry the side heater plates 804 and the cover plates 825 as previously described. The hinge-brackets 828 are secured in the projecting portions of the supporting members 865 and pivotally carry the top end folders and folding and sealing plate assemblies previously described.

Preferably the belts 840 and 841 are formed of a suitable flexible material, such as canvas and are tensioned by idling rollers 869 and 870, respectively. The idling rollers are carried on spindles arranged in spaced parallel relation and secured in rocker arms 871. Each of the rocker arms has secured thereto a bar 872 which is clamped in a bracket 873. The brackets 873 for the bottom of the conveyor belt idling rollers 869 are fastened to the under side of the longitudinal framing members 844 and 845.

The spindles which carry the idling rollers 870 for the side belts are supported cantilever fashion in the rocker arms 871 and the brackets 873 therefor are secured to the tops of the longitudinally extending supporting members 865.

A sprocket 876 is secured on an end portion of the shaft 853 which extends through the framing member 845 and beyond the side frame 6. A chain 877 extends around the sprocket 876 and a driving sprocket 878 (Fig. 4) secured on rotating driving shaft 15 previously mentioned in connection with the wrapping material feed sprocket 280. The shaft 853 thus drives the belts of the discharge conveyor in synchronous timed relation with the remainder of the wrapping machine so that the conveyor can receive and conduct articles away from the folding and sealing channel.

*Article hold down in sealing channel and discharge conveyor*

Articles moving through the folding and sealing channel onto the discharge conveyor preferably have their tops engaged by longitudinally extending hold-downs 880 (Fig. 47) which are suspended by links 881 carried by vertically adjustable pivots 882. The links 881 for each of the hold-downs are preferably of the same length and pivoted at 883 to upstanding angles secured to the hold-downs so that the latter have parallel motion and are thus maintained throughout their length in parallel relation with respect to both the bottom heating plates of the folding and sealing channel and the apron 842 of the discharge conveyor. The pivots are readily adjustable in vertically elongated slots 884 of upstanding supports 885 by means of hand wheels 886 threaded on the pivots and arranged to clamp the supports cooperatively with shoulders on the pivots. The pivots 882 may be jointed by a connecting member 889, if desired. Thus the hold-downs may be vertically adjusted for articles of different height so as to be displaced longitudinally in the sealing channel by engagement with the tops of a series of articles and be moved substantially from the broken line position to the full line position indicated in Fig. 46. Each of the upright supporting members 885 is pivoted at 887 to a hinge-member secured to the top of the longitudinal supporting members 865. Accordingly, the hold-downs 880 may be pivoted out of the sealing channel and discharge conveyor, as indicated by the broken lines of Fig. 47.

Preferably, each of the hold-downs 880 is of materially greater length than width and has upturned ends 888. Each of the hold-downs is disposed closely adjacent one of the side heater plates 804 and one of the side conveyor belts 841 so as to press the ends of the article being sealed downwardly against the bottom heater plate of the sealing channel and maintain the downward pressure after the article has moved onto the discharge conveyor and substantially until the seal is established by the cooling of the wax on the overlapped wrapper portions.

At the end of the discharge conveyor removed from the wrapping machine, articles are received by a platform 893. This platform is supported in cantilever fashion by a cross bar 894 (Figs. 1 and 2) carried between the ends of extensions 895 of the brackets 850. The receiving end 896 is anchored at the end of the discharge conveyor in any suitable manner such as by means of a cross rod 897 (Fig. 56) the ends of which are engageable under the top flanges of the longitudinal framing members 844 and 845. Thus articles may be fed into the packaging combination and after being automatically sliced and wrapped are returned to an outfeed or loading platform positioned directly above the infeed conveyor of the slicing machine so that if desired the mechanism can be operated by one person with resultant economy and efficiency.

*Combination air and mechanically cooled discharge conveyor*

In Figs. 55 through 57 is illustrated a modified construction of discharge conveyor in which a short section thereof, adjacent the slicing machine end, comprises a mechanically refrigerated unit having bottom refrigerated tanks 950 and 951 and a pair of spaced parallel side refrigerated tanks 952 and 953. The bottom conveyor belt 840 and the side conveyor belts 841 are shortened to accommodate the refrigerated tanks in the same relative length of discharge conveyor illustrated in Figs. 1 and 2. The roller 852 for the bottom belt 840 and the shaft 854 therefor are mounted ahead of the refrigerated unit between the longitudinal framing members 844 and 845. Unitary top members 958 extend substantially the entire length of the discharge conveyor, including both the air cooled portion (belts 840 and 841) and the refrigerated portion (tanks 950, 951, 952, and 953). At the wrapping machine the ends of the members 958 are mounted on the spindles 858 and carry the beam members 724 and the side heater plates of the folding and sealing channel in a manner similar to the support members 865. At the slicing machine end of the discharge conveyor, the members 958 are secured to the tops of upwardly extending posts 955 threadedly secured in the tops of brackets 956 slidingly received on the transverse shaft 854. The brackets 956 may be the same as those employed to carry the spindles 860 utilized in the air cooled discharge conveyor previously described.

The adjusting shaft 911 has oppositely threaded ends which engage the brackets 956 so that the latter may be simultaneously moved toward or away from one another for adjusting the discharge conveyor to articles of different size. Shafts 854 and 911 have their ends received in journal members 957 (Fig. 56) which are secured in the channels of the longitudinal framing members 844 and 845.

The extensions 919 previously mentioned for carrying the side guide supporting bars 918 of the infeed conveyor are formed on the brackets 956 so that the article guides for the infeed conveyor are adjusted simultaneously with the discharge conveyor.

The rollers 861 for carrying the slicer end of the side conveyor belts 841 are mounted on spindles 960 carried by the top supporting members 958 and brackets 961 which are secured to the latter members.

The side refrigerated tanks 952 and 953 are suspended from the support members 958 by brackets 962 to which the tanks are fastened by studs 963.

Bottom refrigerated tanks 950 and 951 are disposed in side by side relation and extend transversely across the discharge conveyor. These tanks are supported on members 964 which are secured to the bottom flanges of the framing members 844 and 845. Studs 965 extend upwardly through the transverse members 964 and are threadedly secured in bosses 966 formed on the under side of the tanks 950 and 951. Preferably end wall 967 (Fig. 56) of tank 950 adjacent the end of the bottom conveyor belt 840 is curved or rounded in concave form to conform to the curvature of the roller 852 so that the articles advancing onto the refrigerated plates move smoothly from the endless belt onto the refrigerated surface without traversing an intermediate supporting member.

A short apron 970 is carried by the framing members 844 and 845 as a continuation of the bottom refrigerated tanks to support articles moving from the latter onto the discharge platform 893.

A supply of a refrigerating medium, such as brine 971, is maintained in a heat exchanging container 972 and circulated through the refrigerated tanks 950, 951, 952, and 953 by means of a suitable pump 973. A refrigerant coil 974 is immersed in the brine 971 in the container 972 and has a volatile refrigerant circulated therethrough by means of a compressor 975, condenser 976, reservoir 977, and expansion valve 978 in accordance with well known practice. In this manner the brine is maintained at a low temperature so that the refrigerated tanks forming the bottom and side walls of the outlet end of the discharge conveyor are maintained at a sufficiently low temperature so that a thin layer of ice normally forms on the article-contacting surfaces thereof.

The brine 971 is conducted between the tanks of the discharge conveyor and the container 972 and pump 973 through conduits 979. The arrangement of the conduits 979 is preferably such that the brine flows first through the side tanks 952 and 953 and then through the bottom tanks 950 and 951. Desirably the conduits and tanks may be arranged in parallel branches. For example, the fluid conducting connections between the tanks may comprise flexible conduits 980 which connect the refrigerant inlet ends of the side cooling tanks 952 and 953 with the conduit 979 carrying fresh refrigerating liquid from the container or reservoir 972. The ends of the tanks 952 and 953 opposite the inlet ends thereof are preferably disposed adjacent the discharge ends of the side conveyor belts 841 and are connected by flexible conduits 981 to spaced portions of the bottom tank 951. A flexible conduit 984 connects the bottom tank 951, at a portion thereof spaced from the connections of the conduits 981, to the bottom tank 950. Spent refrigerating liquid is withdrawn from portions of the bottom tank 950 which are spaced from one another and from the inlet connection of the conduit 984 by branches of the conduit 979 that carries the cooling liquid back to the container 972.

A number of spaced parallel backing members 982 may be arranged behind the article-contacting lap of the side belts 841 for sliding engagement therewith and to prevent objectionable deflection of the belts by the articles moving through the discharge conveyor. These backing members are secured to brackets 983 suspended from the longitudinally extending top supports 958. Thus, in this modified construction the ice tanks 864 need not be employed and the cooling of the belts 841 may be effected by circulation of air between the laps thereof.

On account of the cold temperature of the end of the discharge conveyor afforded by the refrigerated tanks, the wrapping material around the articles moving from the wrapping machine is positively chilled to insure an effective seal of the overlapped portions. The side belts 841 are of a length even when used in combination with the refrigerated tanks to independently substantially effect a seal of the overlapped wrapper portions so that in the event that the refrigerating system is inoperative the packaging combination may continue in operation and produce satisfactory seals.

A particular advantage of the use of the air cooling conveyor in combination with the refrigerating cooler conveyor is that the latter may be used only at such times as it is necessary to provide an extreme chilling of the overlapped wrapper portions in order to effect a tight seal because of atmospheric or temperature conditions. Mounting the side refrigerated tanks 952 and 953 on the same member that carries the side belts 841 insures that all the side wall portions of the discharge conveyor are moved simultaneously under the influence of the adjusting shafts 902 and 911.

*Article guides and adjustment*

As previously mentioned the brackets 855 are longitudinally slidable on the shaft 853 and the rod 847 and accordingly may be moved toward and away from one another to vary the distance between the side belts 841 thus accommodating the discharge conveyor to articles of different size. Oppositely threaded ends of an adjusting screw shaft 902 (Figs. 5 and 37) are engaged in threaded bosses 903 (Fig. 45) formed on the brackets 855 between the shaft 853 and the rod 847.

The ends of the shaft 902 are journalled in the brackets 846 secured in the channel of the longitudinal framing members 844 and 845. The adjusting shaft 902 is secured against longitudinal movement by a circumferential collar 904 received on a reduced diameter portion 905 of the shaft and bearing against the bracket 846 on the operator's side of the machine. The reduced diameter portion of the shaft 902 extends beyond the framing member 844 and has secured thereon a hand wheel 906. Sleeve 907 is received on the reduced diameter portion of the shaft 902 between the handwheel 906 and the member 844 and cooperates with the collar 904 to prevent longitudinal movement of the adjusting shaft.

A chain belt 909 carried on a sprocket 910 secured on adjusting shaft 902 imparts a rotational movement to an adjusting shaft 911 (Fig. 1) at the opposite end of the discharge conveyor by means of a sprocket 912. The adjusting shaft 911 is arranged to move the rollers 861 toward and away from one another similarly to the manner in which the shaft 902 moves the rollers 859. However, the rotation of the adjusting shaft 911 is controlled by the chain belt 909 so that the two adjusting shafts are rotated in synchronous fashion to simultaneously move both ends of the discharge conveyor side belts 841 toward or away from one another and maintain them in parallel spaced relation. The adjusting shafts having oppositely threaded ends and being individually secured against longitudinal movement maintains each of the side belts 841 the same distance from the bottom belt 850 so that the latter is positioned centrally between the side belts.

The side members of the heat sealing channel and the top end folding members which are pivotally carried by the hinge brackets 828 are synchronously moved with the side belts 841 of the discharge conveyor so as to be simultaneously adjusted therewith by the hand wheel 906.

The above described construction, in which the top end folders 723 and the side plates of the folding and sealing channel are maintained on common pivots, enables them to be raised by an article which, on account of the machine being out of adjustment or the article being misplaced on the carrier, engages the underside of the end folders. This pivotal movement is a safety feature minimizing injury to both the machine and the article. The folders and side plates are retained in position during normal folding operations by their weight and in cleaning the sealing plates, the side plates can be elevated away from the bottom plate.

Article guides 915 are positioned in spaced parallel relation over the infeed conveyor apron 115 to engage the ends of articles moving thereover. These guides may be formed of channel members having the channels facing outwardly so that the flat web portion is engageable with the ends of the articles. Adjacent the infeed station the guides are suspended by bars 916 (Fig. 5) rigidly secured in extensions 917 of the brackets 855 carried on the shaft 853. In a similar manner the ends of the article guides 915 adjacent the discharge plate of the slicing machine are rigidly suspended by bars 918 (Fig. 2) carried on extensions 919 of the brackets supporting the rollers 861 on the shaft 854 and which correspond to the brackets 855. Since, as previously mentioned, the hand wheel 906 adjusts both ends of the side belts 841 simultaneously to maintain the belts in parallel relation, the bars 916 and 918 are also moved in synchronization with the movement of the conveyor belts to maintain the guides 915 in parallel relation. The arrangement of the bars 916 and 918 is such that the distance between the guides 915 is equal to the distance between the side belts 841 so that both the infeed conveyor and outfeed conveyor are automatically and simultaneously maintained in adjustment to receive articles of the same length.

Rotation of the adjusting hand wheel 906 moving the side belts 841 toward or away from one another is in this manner arranged to simultaneously adjust the article guides 915 of the infeed conveyor together with the top end folding members and side plates of the folding and sealing channel.

Drive

As previously mentioned, the wrapping machine mechanism and conveyors are driven by the motor 4. This motor is suspended from a carriage 14 (Fig. 5) which is slidably supported on rods 21 carried in bosses 22 formed on the cross member 8. An adjusting shaft 23 (Fig. 52) positioned parallel with and between the rods 21, extends through the cross member 8 at the rear end of the machine and is rotatably mounted therein and secured against longitudinal movement. This shaft threadedly engages the carriage 14 and upon being rotated by a hand crank 24 secured on the portion which extends from the rear of the machine is arranged to slide the motor carriage 14 back and forth on the bars 21. A V-belt 26, driven by spring pressed split pulley 25 secured on the motor drive shaft, rotates the relatively large pulley wheel 27 which is carried exteriorly of the machine on stub shaft 28 (Fig. 52) journalled in the side frame 6. Movement of the motor carriage 14 back and forth on the bars 21 varies the speed of the mechanism by changing the effective diameter of the split pulley 25.

A pinion 30 secured at the end of the stub shaft 28 opposite the pulley wheel 27 meshes with and rotates main drive gear 31 (Fig. 52) which is rotatably mounted on the main drive shaft 18, previously mentioned. The main drive gear 31 has secured thereon a clutch drum 33 having an internally directed cylindrical clutch face 34 (Fig. 53) concentric with the axis of drive shaft 18. A clutch spider 35 (Fig. 5) is keyed to the main shaft 18 within the clutch drum 33 and carries a pair of clutch shoes 36 pivoted at 37 on extremities of the spider 35 adjacent the friction face 34 of the clutch drum. Clutch actuating levers 39 are pivoted in a plane passing through the axis of shaft 18 on spaced parallel pins 40. These pins are secured in the spider 35 on opposite sides of the main drive shaft 18 and transversely of the axis thereof. A cone 41 having its axis concentric with the axis of the main drive shaft is rotatably and slidably carried by the latter and has its narrow end directed toward the clutch spider 35. Upon movement of the cone 41 toward the spider, rollers 42 adjustably carried at the ends of clutch levers 39 ride up the inclined surface of the cone to spread the levers 39 away from one another in a pivotal movement about the pins 40. Strut pins 43 having rounded ends seated in sockets of the lever arms 39 adjacent the pivot pins 40 have rounded headed adjusting nuts on their outer ends engageable in sockets within the clutch shoes 36. In this manner movement of the cone 41 between the rollers 42 forces the clutch shoes 36 (which may be faced with a suitable lining such as asbestos or hard rubber) into engagement with the friction face 34 of the clutch drum 33 to establish a driving conenction between the main drive gear 31 and the main drive shaft 18.

Tension springs 44 extending between pins secured in the clutch shoes and the spider 35 are arranged to pivot the shoes out of engagement with the friction face 34 upon withdrawal of the cone 41 from between the rollers 42. The cone terminates in a flat cylindrical portion 45 upon which the rollers 42 rest when the clutch parts are in driving engagement. The rollers 42 and toggle pins 43 are adjusted so that upon engagement of the clutch the friction between the shoes and drum is just sufficient to transmit the power required to operate the mechanism. Accordingly a safety feature is provided since the clutch slips if an article gets caught in the mechanism, permitting the arresting of movement of the wrapping machine parts while the motor runs and the clutch is engaged.

To move the cone 41 longitudinally on the main drive shaft 18 in starting and stopping the mechanism an annular channel 46 is formed at one end of the cylindrical portion 45 of the cone and receives for sliding engagement therewith bearing elements carried on the ends of pin bolts 47 which are secured in the ends of a sliding yoke 48 carried on the shaft 18. An arm 49 (Fig. 52) extends laterally from the yoke and has a bifurcated end received on the oscillating drive shaft 17 to prevent rotation of the yoke which is moved longitudinally on the shaft 18 in engaging and disengaging the clutch by an adjustable length link 51 which extends to a crank lever 52 at the lower end of a vertically extending rod 53 (Fig. 3). This rod is rotatably mounted in brackets secured to the side frame 5 and at its upper end has a hand lever 54 convenient to the operator secured thereon for manual operation of the clutch.

An adjustable length tie rod 56 (Figs. 1, 2 and 3) extends horizontally between a lever 57 secured on an intermediate portion of the rod 53, and a lever 58 secured on a vertically positioned rod 59 rotatably mounted in brackets on the side frame of the slicing machine. By means of a handle 60 secured on the rod 59 the clutch mechanism just described which drives all the wrapping and conveying mechanisms may be controlled from adjacent the slicing machine to facilitate one man operation of the packaging combination.

Secured on the main drive shaft 18 adjacent the side frame 5 (Fig. 52) is a sprocket 62 which by means of a chain belt 63 drives a sprocket 64 secured on driving shaft 20. On the end of the shaft 20 adjacent the side frame 6 is a gear 65 (Fig. 5) which meshes with a gear 66 secured on the driving shaft 15 thus actuating the latter in a reverse direction.

As previously mentioned, the infeed conveyor is driven from the driving shaft 20 by the chain belt 123 and the gear 124, the outfeed conveyor is driven from the driving shaft 15 by the chain belt 877. Accordingly, the gears 65 and 66 synchronize the operation of the infeed and outfeed conveyors of the machine with each other and with the main driving shaft 18. Preferably the infeed conveyor 13 of the slicing machine is also driven by a chain belt 67 carried on a sprocket 68 secured to the infeed conveyor driving shaft 20. Thus all of the conveyors of the packaging combination are positively driven in synchronized timed relation with one another and with the wrapping mechanism.

A rotating driving crank 70 (Fig. 52) secured on the main driveshaft 18 outside the frame 6 drives a sector 71 secured on the end of oscillating drive shaft 17 in a pivotal movement by means of a driving link 72. The radius of movement of the pivot on the sector 71 for the driving link 72 is greater than the radius of the driving crank 70. In this manner the rotational movement of the shaft 18 is converted into oscillatory movement in synchronization therewith so that one oscillation of the shaft 17 occurs for each revolution of the main driving shaft 18.

The periphery of the sector 71 is toothed to engage and drive a gear 73 secured on oscillating drive shaft 16, previously mentioned. Synchronous oscillatory movement of the shafts 16 and 17 with respect to the rotation of the main drive shaft 18 actuates the cam levers 331 for separating the clamping bar 318 and carrier bar 301 in timed relation with the movement of the carrier bars, the former being actuated by the cam 327 on the shaft 18 and the latter being actuated by lever arm 307 secured between the side frames on the shaft 16. In addition, the carrier 500 and cutter carriage 600 are synchronously actuated with the remainder of the mechanism by the crank levers 508 secured on the oscillating shaft 16. A dwell is afforded the carrier at each limit of movement by the relatively small longitudinal travel of the curved links 509 adjacent dead center of the crank 508.

A tension spring 75 extends between the cross member 8 and a chain 76 which rides on a sprocket 77 secured to the oscillating shaft 16. This spring balances the weight of the carrier and cutter carriage so that the operation of the mechanism is smooth and regular. Similarly, spring 79 (Figs. 3 and 52) is tensioned between a bracket plate 80 carried by cross member 9, and a chain 81 carried on a sprocket (not shown) secured on the shaft 303, balances the weight of the pivoted arms 302 and clamping bar arms 311. The chain 81 carried around the sprocket on the shaft 303 is secured thereto so that upon oscillation of the shaft 303 the chain winds and unwinds on the sprocket.

As previously mentioned in connection with the smoothing plate 700, a device is provided responsive to the electric switch 716 which disconnects the drive of the wrapping machine so that the mechanisms stop in the event an article is misplaced on the carrier 500. This safety device includes a solenoid coil 85 (Fig. 54) supported by a bracket 86 secured to the side frame 5. A chain 87 is connected to armature 88 of the magnetic solenoid and is carried around a sprocket 89 secured on the bottom of the vertical rod 53. Energization of the magnetic solenoid 85 through the switch 716 draws the armature 88 to the left as viewed in Fig. 54 which rotates the rod 53 in a clockwise direction as viewed in Fig. 52, releasing the clutch in the manner previously described.

A compression spring 90 is carried on an extension of the armature 88 opposite the chain 87. The spring is positioned between the bracket 86 and nuts 91 secured on the extension to normally draw the armature to the left as viewed in Fig. 54 thus preventing complete withdrawal of the armature from the solenoid coil and retaining the chain 87 taut.

A large hand wheel 83, which may also serve as a flywheel to dampen uneven or surging movement of the driving mechanism, is secured on a portion of the driving shaft 15 which extends beyond the side frame 5. Upon disengagement of the main clutch by the hand lever 54 or the lever 60 the mechanism may be actuated by hand through 83 independently of the motor 4 and pulley wheel 27. This feature is of advantage in adjusting the parts in setting up the machine.

Operation

In the preceding description of the wrapping machine combination the several parts have been treated independently in order that the construction and operation of each might be set forth with the greatest clearness. However, the machine operates as a unitary mechanism and all of the parts and movements function simultaneously and in synchronous relation so that each may be said to contribute to the result produced by the whole. So that this cooperative relation of the various elements may be more clearly understood, a description of the operation of the machine combination during the passage of an article therethrough is now made.

With the machine at rest, switches 94 and 837 (Fig. 3) mounted in switch boxes carried on the side frame 5 of the wrapping machine are thrown to start the motor 4 and to close the master electrical circuit for the heating elements 832, 833, 834, 835 and 836 of the sealing channel. Article guides 29 (Fig. 2) of the slicing machine infeed conveyor 13 are adjusted to accommodate articles of the length to be packaged and the adjusting hand wheel 906 is rotated to simultaneously adjust the wrapping machine infeed conveyor article guides 915, top end folders 723, side plates 802, 803 and 804 of the folding and sealing channel, and side belts 841 of the discharge conveyor, for the same article size. A pusher 735 of suitable length is placed in the T-slot 750 of the ram and the first end folding members 525 on the carrier are adjusted for the particular article length by the hand wheel 528. A driving connection is established between the motor 4 and the conveyors and wrapping machine mechanism by either of the main clutch hand levers 54 or 60. Articles are then placed on the infeed conveyor 13 (Fig. 2) of the slicing machine (after starting the slicing mechanism) or the infeed conveyor apron 115 of the wrapping machine according to whether the articles are to be packaged sliced or unsliced.

Sliced articles moving from the slicer discharge plate 19 are received on the crumb and sliver heel dispenser which has been adjusted through the sprocket 143 simultaneously with the side guides 915, so that longitudinal edge portions 146 of the supporting plates 130 and 131 are substantially flush with the article guides and support end slices or heels of the sliced loaf "A." Crumbs or sliver heels located beyond the ends of an article when on the discharge plate of the slicer drop into a suitable receptacle when the article moves over the crumb eliminator. Such crumbs or sliver heels as may be carried along in advance of the article drop through the transverse slot 150 into a receptacle so that only the compacted slices of an article are advanced over the conveyor apron 115.

An article being advanced over the infeed conveyor apron 115 by one of the flights 117 engages the member 400 of the article measuring mechanism and causes the latch lever 432 to be released by the quadrant 416 (Fig. 22) permitting the compression spring 425 to pivot the clutch actuating arm 291 (Fig. 20) thus engaging the clutch elements 284 and 285 and establishing a driving connection between the driving shaft 15 and the feed rolls 217 and 218. These feed rolls (Figs. 5 and 58) instantaneously commence the feeding of the leading edge of the wrapping material draws the slack roller 215 downward against the tensional resistance of the spring 231. The operator regulates the frictional engagement between the wrapping material rolls and their mountings so that at each feeding of a sheet of wrapping material the slack roller 215 reciprocates in a path of maximum length.

During the feeding of the web W by the feed rolls 217 and 218 the carrier bars 300 and 301 commence their upward movement, engaging the under side of the web and carrying it upwardly past the end of the infeed conveyor of the wrapping machine in the path of an article advancing to the infeed station. Upon movement of the carrier bar 301 above the level of the infeed conveyor apron 115, the clamper or gripper bar 318, which has meanwhile been positioned as shown in Fig. 58, engages the opposite side of the wrapping material (Fig. 59) and moves upward in an arcuate path, carried by the bar 301. This movement of the carrier and clamping bars to pull the web W up in front and over the top of the article occurs while the article carrier 500 and cutter carriage 600 are descending and while they are removed from the infeed station.

The engagement of the wrapping material web W by the carrier bar 301 and gripper bar 318 is sufficient to maintain the web taut as it is advanced by the feed rollers (Fig. 60), but with insufficient force to advance the wrapping material independently of the feed rollers. Accordingly, the web W is not advanced after the feed rollers stop, nor faster than the rollers operate to advance the web so that the latter slips between the carrier bar 301 and gripper bar 318 when the bars move faster than the web is advanced by the feed rollers and when the feed rollers stop. Thus a portion "L" of wrapping material which is draped over the carrier bar 300 may progressively diminish as the carrier bars move to their upper position. For exceptionally small articles the wrapping material web may be so short as to be withdrawn completely from the upper carrier bar 300.

In the accompanying drawings the web W has been shown in the approximate positions it would assume if the mechanism were stationary at the successive stages illustrated. In commercial operation of the machine the position of the web might be different, caused, for example, by the resistance to movement of the web through the air. The movement of the carrier bars through a common path enables the web to take a streamlined form, with the portion "L" trailing the bar 300 in parallel relation with the portion extending between the two carrier bars.

During the dwell of the bars at their upper limit of movement, the air pressure holding the wrapping material in streamlined form is relieved and the web portion "L" moves to the position shown in Figs. 61 and 62. The carrier bars are no longer one above the other, but positioned to suspend the web over the top of an article with the last portion of web advanced by the feed rolls across the front side of the article.

During the movement of the carrier bars to their upper position the guide bar 355 is carried upward in pivotal movement to engage the wrapping material on the opposite side thereof from the lap adjusting bar 635 and the carrier abutment roller 511, as shown in Fig. 61. This movement occurs before the outward movement of the lap adjusting bar 635 to avoid engagement between the latter and the guide 355.

As the carrier bars approach their upper limit of movement the carrier 500 and cutter carriage 600 approach their lower limit of movement and the lap adjusting bar 635 engages the wrapping material to move it away from the upper cutters 622 and 623 (Fig. 61). This movement of the lap bar tensions the wrapping material and may withdraw an additional amount from between the carrier bar 301 and gripper bar 318. Before the cutters commence severing the web W the movement of the clutch actuating lever 291 caused by the clutch release arm 436 disengages the clutch elements 284 and 285 and stops the feed rolls 217 and 218, the brake 455 engaging the hand wheel 270. The web W, positioned horizontally over the bed knife 630 and held taut by the bar 635, is then severed (Fig. 62).

The cam levers 331 move the clamping bar arms 311 so that the web W is released by the clamping bar 318 and held against the carrier bar 301 by the soft rubber covered roller 335 which is pivotally moved to engage the lower carrier bar just prior to the release of the web by the clamping bar. Meanwhile the article A which caused the feeding of this particular sheet of wrapping material has moved to the end of the infeed conveyor apron 115 and is positioned underneath the wrapping material suspended over the top and down the front side thereof (Fig. 62). The carrier 500 is now at the infeed station at its lower limit of movement and the flight 117 which has been advancing the article A moves the latter onto the carrier platform 501 over the roller 511 which thus folds the portion "M" (Fig. 63) of wrapping material last fed by the feed rollers upwardly against the bottom of the article.

During the movement of an article onto the carrier the portion "M" of wrapping material slips between the carrier member 511 and the guide bar 355, which are closely adjacent one another but do not grip the wrapping material. In this manner the trailing edge of the wrapper is guided by slightly spaced parallel members as it is folded underneath the article.

Shortly after the engagement of the wrapping material by an article the rubber covered roller 335 is moved away from the carrier bar 301, so that the wrapping material, although guided by these members, is not gripped thereby. Accordingly, during the movement of the article onto the carrier both of the opposite ends of the wrapping material are guided between parallel, closely spaced members which do not exert objectionable dragging or retarding force on the article but control the wrapping material to produce a smooth and regular placement of the latter about the article.

In wrapping articles according to the method of the present invention the positioning of the wrapping material about the article is largely effected by dynamic forces, since the wrapping material is not positively gripped by the wrapping machine during part of the initial movement of the article onto the carrier. For example, if the mechanism should be suddenly arrested just prior to the movement of an article over the bar 511 on the elevator, it is possible that the wrapping material would be released and slip out of position. However, during the continuous forward motion of the article from the infeed conveyor onto the platform of the carrier, the wrapping material is maintained in motion by being wrapped about the article, so that slipping thereof from the mechanism is avoided.

Shortly after the initial engagement of one side of the wrapping material by the article the opposite side of the wrapping material is engaged by the smoothing member 700 which guides the wrapping material across the top of the article as the latter is received by the carrier (Fig. 63). During this smoothing action on the wrapping material the member or plate 700 may be pivoted upwardly slightly in a clockwise direction, as viewed in Fig. 64, so as to rest by gravity on the top of the article.

In addition to folding the last fed portion "M" of wrapping material upwardly against the bottom of the article, the movement of the latter onto the carrier performs the first end folding operation on portions "N" of the wrapping material which project beyond the ends of the article from the front or leading side thereof. This folding is effected by the first end folders 525 and the flanges 534 fold portions of the wrapping material which are included in the bottom end flap downwardly against the carrier platform.

The movement of the article onto the carrier is guided by the plate member 519 which engages the wrapping material and holds the latter firmly against the front side of the article. Upon release of the flight 117 by the track 120 so that the former is ineffective to further advance the article onto the carrier, the article "A" has been only incompletely moved onto the carrier and the latter commences its upward movement to the outfeed station of the machine. Simultaneously with the elevating of the article by the carrier the arms 311 and 302 oscillate downward, carrying the bars 301 and 318 in an arcuate path past the rear side of the article and into their lowered position to receive the next sheet of wrapping material. During the downward movement of the bars 300 and 301, the cam levers 331 continue to support the clamping bar 318 and to hold it away from the bar 301. Meanwhile, the smoothing plate or member 700 smooths the wrapping material over the top and top rear corner of the article (see Figs. 64 and 65). As the smoothing plate moves over the top rear corner of the article the supporting plate 700 is moved to its upright position and presses against the rear side of the article to move the latter completely onto the carrier as shown in Fig. 65. Continued movement of the article past the upright smoothing plate 700 strokes the wrapping material downward over the rear side of the article, eliminating wrinkles and making a smooth package. In the event that it is a sliced article, such as a baked loaf, this action of the smoothing plate tends to straighten any slices which may be misplaced and moves them into proper position.

As previously mentioned, the smoothing plate 700 is arranged to actuate a switch 716 to stop the wrapping machine mechanism in the event that an article is not properly moved onto the carrier by the infeed conveyor flight.

Approaching the outfeed station, the top end fold starters 729 engage portions "O" (Figs. 66 and 67) of wrapping material extending beyond the ends of the article at the top thereof, folding them downward against the ends of the article to form top end flaps. Meanwhile the carrier bars have moved below the level of the infeed conveyor apron and the gripper bar 318 is positioned above the plane of wrapping material feed in readiness for wrapping material to be advanced by the feed rollers upon actuation of the measuring mechanism by the next article. While the carrier is at the outfeed station and above the smoothing plate 700, the latter is held upright by the cam faced dogs 722 (Fig. 68) so that the carrier platform clears the smoothing member upon the return movement of the carrier to the infeed station.

The top end folding operation is improved by the action of the folding fingers 733, which engage the portions of the wrapping material which connect the top end flaps "O" with the portions of wrapping material projecting beyond the rear side of the article at the ends thereof. The fingers move these connecting portions of wrapping material toward the intersections of the rear side and ends of the article. Thus the projecting portions of wrapping material to form the rear end flaps are maintained substantially parallel with the wrapping material draped over the rear side of the article, so that when the rear end flaps are formed a neat package is made, with an attractive and effective end seal.

The top end folds are started by the laterally projecting flanges 729 (Fig. 67) which slope downwardly and away from the flat article-engaging portions 726 of the top end folders 723. These flanges start or break the top end folds along the top edges at the ends of the article, so that the folding action of the vertical portion 726 of the end folders is a completion of the fold started by the flanges 729.

When the carrier is at the outfeed station, the flanges 729 of the top end folders 723 closely overlie the flanges 534 of the first end folders 525 and are substantially parallel therewith.

As the pusher 735 moves the article into the folding and sealing channel the first fed portion "L" of the web W depends from the rear side of the article (Fig. 68) and is engaged between the carrier roller 511 and roller 550 at the outfeed station, the latter being under the pressure of the spring pressed roller 557. This spring pressure can be adjusted during the operation of the wrapping machine to draw the wrapping material around the article to produce the desired tightness of wrap.

As the pusher 735, carried by the ram, advances an article into the folding and sealing channel, the edges 809 of the side plates 802 fold portions "P" of the wrapping material, which project from the rear side of the article, against the ends of the article to form the rear side or third end folds (Fig. 69).

The initial movement of the article into the sealing channel positions bottom end flaps "S" in the folding slot 818 (Fig. 70) to absorb heat from the side plates and flanges 816 and 817 until moved further into the channel. The next article moved into the folding and sealing channel by the pusher 735 advances the previous article one article space in the channel and this progressive movement continues until the articles are received one by one in the discharge conveyor channel formed by the side belts 841 and the bottom belt 840, which hold the overlapped wrapper portions in position until the seal is completed.

During the elevation of an article from the infeed station to the outfeed station the ram is retracted across the infeed station out of the path of the article and in readiness to advance the article into the sealing channel. Also the next article advancing over the infeed conveyor engages the member 400 of the measuring mechanism so that a measured sheet of wrapping material is advanced by the feed rollers. This sheet of wrapping material is carried upwardly to a suspended position during the downward movement of the carrier from the outfeed station so that the article can be moved on the carrier when the latter reaches its lower limit of movement at the infeed station. Accordingly, an article is measured and a sheet of wrapping material fed in accordance with the size thereof at each oscillation of the carrier and the carrier thus elevates an article to the outfeed station at each upward movement.

In packaging the products of a commercial bakery a combination of machines embodying the present invention is particularly efficient and economical. The simplicity of operation and adjustment, and the ease with which the wrapping machine can be changed for different article lengths as well as the automatic control of wrapping material length are features attractive to operators and promote economy of time. Safety features to protect the operator, machines, and product have been uniquely combined into a compact structure economical to manufacture and repair.

Furthermore, it is to be undertsood that the particular form of apparatus shown and described, and the particular procedure set forth, are presented for purposes of explanation and illustration and that various modifications of said apparatus and procedure can be made without departing from my invention.

What I claim is:

1. In a wrapping machine having a conveyor to advance articles to an infeed station, a carrier movable to receive the articles at said station and advance them in the machine, said conveyor arranged to individually move each article incompletely onto the carrier, means to feed wrapping material to an article-receiving position adjacent the station while the carrier is removed from the station, whereby, upon movement of an article onto the carrier at the station, the article is partially enveloped by the positioned wrapping material, and a pivotally mounted member having a curved surface portion along one side for smoothing the wrapping material against the article as the article is advanced onto the carrier by the conveyor, said smoothing means arranged to remain in contact with the article as the latter is moved away from the infeed station by the carrier and to be rotated by the article and to frictionally engage the outer surface of the wrapper and bear against the article with sufficient force to move the article completely onto the carrier.

2. In a wrapping machine having a conveyor to advance articles to an infeed station, a carrier movable to receive the articles at said station and advance them in the machine, said conveyor arranged to individually move each article incompletely onto the carrier, means to feed wrapping material to an article-receiving position adjacent the station while the carrier is removed from the station, whereby, upon movement of an article onto the carrier at the station, the article is partially enveloped by the positioned wrapping material, and a pivotally mounted member having a curved surface portion along one side for smoothing the wrapping material against the article as the latter is advanced onto the carrier by the infeed conveyor, said smoothing means arranged to remain in contact with the article as the latter is moved away from the infeed station by the carrier and to be rotated by the article and to first engage the outer surface of the wrapper on the top of the article and progressively and frictionally move over the top and down a side of the article in a continuous movement, said smoothing means arranged to bear against the article with sufficient force to move the article completely onto the carrier.

3. In a wrapping machine, a wrapping mechanism, an article-advancing mechanism, a shaft operable in constant timed relation to the wrapping mechanism, means disconnectably associated with said shaft for advancing wrapping material at a substantially uniform linear speed, means for positioning the fed wrapping material adjacent the wrapping mechanism and in advance of an article advancing thereto, means responsive to variations in both the height and width of an article being advanced to the wrapping mechanism by the article-advancing mechanism for controlling the connection between the shaft and the wrapping material advancing means so as to advance wrapping material proportioned in length according to the size of the article to be wrapped, said height and width responsive means including a member extending into the path of articles forwarded by said advancing mechanism, said member disposed at an angle with respect to the article path and adjustable longitudinally with respect to said path, and means operating in timed relation with the wrapping mechanism to sever the fed wrapping material.

4. A wrapping machine, comprising wrapping mechanism, means for advancing an article to an infeed station adjacent said mechanism, a continuously rotating wrapping material feed roller shaft, a wrapping material feed roller, means to connect the wrapping material feed roller and the continuously rotating shaft to advance the leading edge of a web of wrapping material in timed relation with the continuously rotating shaft, means for carrying said leading edge upwardly across the infeed station, means for disconnecting the feed roller and continuously rotating shaft to arrest the feeding with the wrapping material web extending upwardly from the feed roller and across the path of an article advancing to the infeed station, means responsive to the height and width of said article to vary the length of wrapping material fed, said height and width responsive means including a member extending into the path of articles forwarded by said advancing mechanism, said member disposed at an angle with respect to the article path and adjustable longitudinally with respect to said path, and a cutter for severing the wrapping material adjacent the feed roller after the wrapping material is suspended in a position extending upwardly from the feed roller.

5. In a wrapping machine, wrapping mechanism, wrapping material feeding mechanism, means projecting into the path of an article being advanced to the wrapping mechanism and engageable therewith to control the operation of said feeding mechanism, and means for adjusting the article-engaging means longitudinally with respect to said article path to regulate the overlap of the ends of the wrapping material under the article, said adjusting means being regulatable by an operator without interrupting continuous operation of the machine.

6. In a wrapping machine, wrapping material feeding means, a pair of spaced parallel horizontal members reciprocable in arcuate paths and arranged to engage the under side of wrapping material independently advanced by said wrapping material feeding means and to carry the wrapping material upwardly and suspend it in the path of an article to be wrapped thereby, a supplementary horizontal member arranged to cooperate with one member of said pair to grip the wrapping material with sufficient friction to yieldingly hold the wrapping material but with insufficient friction to advance said wrapping material independently of said wrapping material feeding mechanism, and means for moving said supplementary member away from the reciprocable member engaged thereby after said wrapping material carrying movement, said last named means including a cam driven in timed relation with the horizontal reciprocable members and an element having operative association with the supplementary member in engagement with said cam.

7. In a wrapping machine, a member movable to engage and carry wrapping material to a suspended position in the path of an article to be wrapped thereby, a clamping member movable toward the carrying member and on the opposite side of the wrapping material to hold the wrapping material against the carrying member, and means for moving the clamping member away from the carrying member to release the grip of the clamping member on the wrapping material substantially while the wrapping material is in suspended position, said moving means including a cam rotated in timed relation with the wrapping mechanism and a pivoted member oscillated by the cam.

8. In a wrapping machine, a member movable to engage and carry wrapping material to a suspended position in the path of an article to be wrapped thereby, a clamping member movable toward the carrying member and on the opposite side of the wrapping material to hold the wrapping material against the carrying member during the carrying of the wrapping material, a resilient member for yieldingly holding the suspended wrapping material against the carrying member, and means for moving the clamping member away from the carrying member after the resilient holding member engages the wrapping material, said moving means including a cam rotated in timed relation with the wrapping mechanism.

9. In a wrapping machine, a carrier for an article being wrapped, said carrier reciprocable between an infeed station and an outfeed station, an article supporting member at one of the stations having an edge over which an article is moved, an edge on the carrier over which an article is moved, flat sided guide rods extending in the direction of carrier movement, means on the carrier having sliding engagement with the rods to guide the carrier edge to a position adjacent said other edge and to control the movement of the carrier, said flat sided guide rods and sliding means arranged to position the carrier edge closely adjacent the edge of the article supporting member and adjustable wear compensating means associated with the sliding means to maintain a close fit between the flat sided guide rods and the sliding means.

10. In a wrapping machine, a carrier for an article being wrapped, said carrier reciprocable between an infeed station and an outfeed station, a member arranged to bear against an article on the carrier during the movement of the carrier from the infeed to the outfeed, flat sided guide rods for the carrier having one face of each substantially parallel to a portion of the article surface pressed by said member, means on the carrier having sliding engagement with the flat sided guide rods and including replaceable bearing elements secured to said sliding means and bearing against said rods.

11. In a wrapping machine, a member for carrying wrapping material across the path of an article to be wrapped, a deformable and resilient member for yieldingly holding the wrapping material against the carrying member, means for relatively advancing the article to be wrapped into the wrapping material, and means for moving the holding member relatively away from the carrying member to release the wrapping material as the latter engages the article.

12. In a wrapping machine, a member for carrying wrapping material across the path of an article to be wrapped, a deformable and resilient member to engage the wrapping material substantially across its entire width to yieldingly hold the wrapping material against the carrying member, means for relatively advancing the article to be wrapped into the wrapping material, and means for moving the holding member relatively away from the carrying member to release the wrapping material as the latter engages the article.

13. In a wrapping machine having a carrier to receive an article at an infeed station and advance it in the wrapping mechanism, means to feed wrapping material across the path of an article advancing to the carrier at the infeed station, means to advance the article onto the carrier, the movement of the article onto the carrier effecting a partial wrapping of the wrapping material about the article, an abutment along one edge of the carrier over which one end of the wrapping material is drawn during the movement of the article onto the carrier, a member movably mounted adjacent the infeed station, and means for moving said member to a position in parallel relation to and closely adjacent the abutment to guide the wrapping material during the movement of said end thereof over the abutment.

14. In a wrapping machine having a carrier to receive an article at an infeed station and advance it in the wrapping mechanism, means to feed wrapping material across the path of an article advancing to the carrier at the infeed station, means to advance the article onto the carrier, the movement of the article onto the carrier effecting a partial wrapping of the wrapping material about the article, an abutment along one edge of the carrier over which one end of the wrapping material is drawn during the movement of the article onto the carrier, a member movably mounted adjacent the infeed station, and means for moving said member to a position in parallel relation to and closely adjacent the abutment to guide the wrapping material during the movement of said end thereof over the abutment, said member extending across substantially the entire width of the wrapping material to hold substantially all portions thereof in frictional contact with the abutment.

15. In a wrapping machine of the character in which an article is advanced into a suspended sheet of wrapping material to wrap the sheet about the article, means guiding opposite end portions of the sheet during said wrapping, said means including a pair of members on opposite sides of the sheet at one end thereof and another pair of members on opposite sides of the sheet at the other end thereof, the members of each pair being separated from one another a distance slightly greater than the thickness of the wrapping material to afford a free running fit for the wrapping material as the latter wraps about the article.

16. In a wrapping machine, an outfeed station, a carrier for advancing an article to the outfeed station, a member reciprocated in timed relation with the carrier to move the article off the carrier at the outfeed station, and a pusher on the reciprocated member for engagement with the side of an article being moved off the carrier, said pusher having portions extending about and below the article and in the direction of movement to engage the article and prevent the article from rolling.

17. In a wrapping machine, a top end folder for folding a portion of wrapping material projecting from the top of an article against the end thereof and having a planar surface to hold the folded wrapping material against said end, a lateral extension on the folder, and a finger carried by the extension and having a free end directed toward the plane of said surface.

18. In a wrapping machine, a carrier for moving an article having wrapping material extending over the top and down one side thereof to a discharge station, portions of said wrapping material extending beyond the end of the article from said top and side, a member for folding said top projecting portion against said end prior to the folding of said side projecting portion against said end, and a finger carried by said member for engaging a portion of the wrapping material extending between said top and side projecting portions during the folding of said top projecting portion against said end.

19. In a wrapping machine, means for folding a wrapping material flap projecting beyond an end of an article against the article, comprising a member having a heated surface for sliding engagement with the portion of the article against which the flap is to be folded, a slot in the member opening through said surface to receive and guide said flap and progressively lay it against the article, the walls of the slot being relatively close together and of sufficient area to substantially embrace the entire flap and means for heating the slot walls.

20. In a wrapping machine, a folding and sealing channel comprising a pair of spaced substantially parallel members for performing end flap folding operations on an article, said folding operations completing the wrapping of the article, means for heating said folding members, a second pair of spaced substantially parallel members each extending as a continuation of one of said folding members, and independent means for heating said second pair of members, said last named heating means being operable independently of said first mentioned heating means and said first mentioned heating means being operable independently of said second named heating means.

21. In a wrapping machine, a folding and sealing channel having heated members for melting wax on overlapped portions of article wrappers, a discharge conveyor extending as a continuation of the channel, said conveyor having endless belts engageable with wrapped articles discharged from the channel to retain said overlapped wrapper portions in correct relative position, a refrigerated channel extending as a continuation of the conveyor to receive articles discharged therefrom and to chill the wax on said overlapped wrapper portions, said discharge conveyor having an effective article-conducting length at least about twice the effective length of the refrigerated channel, means for actuating the conveyor to move wrapped articles at a rate to permit substantial setting of the said melted wax prior to discharge of the articles into the refrigerated channel, and means for circulating a fluid refrigerant through the walls of the refrigerated channel to substantially maintain a thin coating of ice on the article-contacting surfaces thereof.

22. In a wrapping machine, a folding and sealing channel having heated members for melting wax on overlapped portions of article wrappers, a discharge conveyor extending as a continuation of the channel, said conveyor having endless belts engageable with wrapped articles discharged from the channel to retain said overlapped wrapper portions in correct relative position, a pair of article-contacting members mounted on opposite sides of the channel and arranged to rest by gravity on the tops of articles moving through the channel and onto the discharge conveyor, brackets extending above the normal level of articles in the channel and conveyor, and arms pivoted to the brackets and members, the arms and brackets arranged to impart parallel motion to the members and the members extending above both the channel and conveyor to retain contact with articles while the melting of the wax on the wrappers thereof is completed and until the setting of said wax is initiated on the discharge conveyor.

23. In a wrapping machine, movable means for receiving a partially wrapped article at an infeed station and advancing the article to an outfeed station, a member disposed to engage the partially wrapped article during the advancement thereof and to smooth the wrapping material over the article, means for driving said movable means, means for controlling the drive means including an electric circiut having a switch, and a connection between said member and the switch, said member being arranged to actuate the switch to arrest the drive upon the pressure of an article against said member exceeding a predetermined amount.

24. In a wrapping machine, a carrier for receiving a partially wrapped article at an infeed station and advancing the article to an outfeed station, a member pivotally mounted at one side of the normal path of an article being advanced by the carrier and extending into said path to engage and smooth the wrapper of an advancing article, said member being shiftable in the direction of article movement upon being engaged by an article incompletely received on the carrier, drive means for the carrier, and control means having connection with said member and arranged to stop the drive means upon the shifting of the member.

25. In a wrapping machine, a supporting structure, a discharge conveyor comprising framing members supported on said structure and pivoted thereto, and heating members arranged to contact wrapped articles to heat the same as the articles are advanced to the conveyor, one of said heating members being secured to and supported by said structure and another of said heating members being supported by said framing members and arranged for pivotal movement relative to the heating member carried by the supporting structure.

26. In a wrapping machine, a supporting structure, a discharge conveyor having an article contacting element and framing members supported on the structure and pivoted thereto, a heating member supported by the framing members for pivotal movement therewith and aligned with said element to contact and heat wrapped articles advancing to the conveyor, and a heating member supported by the structure and in end to end relation with said first named heating member to contact and heat wrapped articles prior to the heating of the articles by said first named heating member.

27. In a wrapping machine, a supporting structure, a discharge conveyor having framing members supported on the structure and pivoted thereto, and article contacting members forming a folding channel aligned with the conveyor and arranged to complete the folding of wrapping material about an article prior to the movement of an article to the conveyor, said contacting members including a pair of side members carried by the framing members for pivotal movement therewith and arranged to engage the ends of wrapped articles, and a pair of folding members aligned with the side members, said folding members being pivotally mounted with respect to the side members and having pivots which are supported by the framing members.

28. In a wrapping machine, a supporting structure, a discharge conveyor having framing members supported on the structure and pivoted thereto, and article contacting members forming a folding channel aligned with the conveyor and arranged to complete the folding of wrapping material about an article prior to the movement of an article to the conveyor, said contacting members including bottom members and side members in pairs, one of the bottom members being mounted on the supporting structure and a second bottom member being mounted on the framing members and arranged for pivotal movement with respect to the first named bottom member, one pair of the side members being mounted on the framing members for pivotal movement therewith, and a second pair of side members being pivotally carried by the framing members, and said second pair of side members being formed to assist in folding wrapping material about articles moving toward the conveyor.

29. In a wrapping machine having infeed and outfeed stations, a carrier and drive means for moving the same between the stations, a smoothing member having spaced edges, and means for supporting said member for pivotal movement about an axis adjacent the path of the carrier and between said edges so that one of the edges is disposed in the article path and a portion of the member adjacent such edge is engaged by an article on the carrier as the latter moves to the outfeed station to rotate the member about said axis and to cause the member to move over the top and down one side of the article, a portion of the member adjacent the other edge thereof being normally disposed outside of the path of the carrier and being moved upon said rotation of the member into engagement with one side of the article.

30. In a wrapping machine having infeed and outfeed stations, a carrier and drive means for moving the same between the stations, a smoothing member having spaced edges, means for supporting said member for pivotal movement about an axis adjacent the path of the carrier and between said edges so that one of the edges is disposed in the article path and a portion of the member adjacent such edge is engaged by an article on the carrier as the latter moves to the outfeed station to rotate the member about said axis and to cause the member to move over the top and down one side of the article, a portion of the member adjacent the other edge thereof being normally disposed outside of the path of the carrier and being moved upon said rotation of the member into engagement with one side of the article, means for supporting said member for shifting movement in the direction of carrier movement, and control means responsive to said shifting movement and having connection with the drive means to arrest the same and stop the carrier upon said shifting of the smoothing member.

31. In a wrapping machine having infeed and outfeed stations, a carrier and drive means for moving the same over a path between the stations, a smoothing member having an article contacting surface, means for supporting the smoothing member for pivotal movement about an axis adjacent the path of the carrier and for bodily shifting movement, means for advancing an article onto the carrier at the infeed station a sufficient distance so that normally the path of the article moving to the outfeed station on the carrier is wholly to one side of said axis and the article engages the smoothing member to rotate the same for progressive sliding engagement over the top and down one side of the article, an article insufficiently advanced onto the carrier being moved over a path intersected by said axis so that the smoothing member is bodily shifted by such article, and control means responsive to said shifting of the smoothing member, said control means having connection with the carrier drive to stop the same upon said shifting.

32. In a wrapping machine, an outfeed station, a carrier for advancing an article to the outfeed station, a member reciprocated in timed relation with the carrier to move the article off the carrier at the outfeed station, and a pusher on the reciprocated member for engagement with the side of an article being moved off the carrier, said pusher having portions extending above and below the article during the moving to prevent the article from rolling as it moves onto the outfeed station.

33. In a wrapping machine, a top end folding member and means supporting the same for relative movement with respect to an article being wrapped to engage the fold a projecting portion of wrapping material against an end of the article, said relative movement of the folding member being in a plane closely adjacent said end of the article and the relative movement of the article being substantially parallel to said plane, and a top end fold starter disposed along the bottom edge of said member and extending laterally therefrom oblique to said plane to engage said portion of wrapping material projecting from the top of the end of the article being wrapped and commence to fold said portion downwardly against the end of the article prior to the engagement of the wrapper by said member.

34. In a wrapping machine, a carrier for supporting an article during a wrapping operation with a portion of the wrapping material projecting from underneath one end of the article, means for performing a first end folding operation to fold a portion of wrapping material projecting from one side of the article against said end, and a top end folder for performing a folding operation to hold a portion of the wrapping material projecting from the top of the article against said end, said top folder having a laterally extending element for engagement with a connecting portion of the wrapping material which extends between the portion projecting from underneath the article and the portion forming the first end fold, said element being movable with the top folder to fold said connecting portion of wrapping material against the portion of wrapping material projecting from underneath the article after the top end fold is completed.

35. In a wrapping machine a top end folding member to move over an end of an article being wrapped from the top to the bottom thereof to fold a projecting portion of wrapping material against an end of article, said member being yieldably mounted for movement in the plane of the end of the article and having a portion along the bottom edge thereof extending at an acute angle to said plane, to initially engage the projecting wrapping material and to commence the top end folding operation.

36. In a wrapping machine, a folding and sealing channel comprising a first pair of spaced substantially parallel side members having means for performing end flap folding operations on an article, said folding operations completing the wrapping of the article, means for heating said folding side members, a second pair of spaced substantially parallel side members to receive therebetween the wrapped articles from the first pair, the members of said second pair each extending as a continuation of one of the folding side members and being spaced therefrom by an air gap, and means for heating said second pair of members, said last named heating means being optionally operable independently of said first mentioned heating means to provide for complete wrapping of an article before the application of heat thereto and to initially heat a completely wrapped article after the latter moves beyond the air gap.

37. In a wrapping machine, a folding and sealing channel comprising a pair of spaced substantially parallel side members having means for performing end flap folding operations on an article, a bottom member extending between the side members for supporting an article advancing therebetween, said folding operations completing the wrapping of the article, a second pair of spaced substantially parallel side members to receive therebetween wrapped articles from the folding members, the members of said second pair each extending as a continuation of one of the folding members and spaced therefrom by an air gap, a second bottom member extending between the second pair of side members and as a continuation of the first named bottom member to receive and support an article moving from the first bottom member, each of said second pair of side members being shorter in the direction of article movement than the first side members and the second named bottom member being shorter in the direction of article movement than the first named bottom member, means for heating the folding side members, and means for heating said second pair of side members and said second bottom member, said last named heating means being optionally operable independently of the heating means for the side folding members to provide for complete wrapping of an article moving through the channel before the application of heat thereto and to initially heat the wrapper of an article only after the completion of the wrapping and over only a relatively short length of the article path.

ARTHUR A. KOTTMANN.